(12) United States Patent
Motomura

(10) Patent No.: US 6,338,108 B1
(45) Date of Patent: Jan. 8, 2002

(54) COPROCESSOR-INTEGRATED PACKET-TYPE MEMORY LSI, PACKET-TYPE MEMORY/COPROCESSOR BUS, AND CONTROL METHOD THEREOF

(75) Inventor: Masato Motomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/059,377

(22) Filed: Apr. 14, 1998

(30) Foreign Application Priority Data

Apr. 15, 1997 (JP) ............................................. 9-097587

(51) Int. Cl.⁷ ............................................. G06F 13/00
(52) U.S. Cl. ...................... 710/110; 710/129; 710/126; 711/105
(58) Field of Search ................................ 710/110, 113, 710/119, 126, 129; 365/233, 230.02, 230.03, 221; 712/6, 10, 11, 17; 711/105–106, 5, 104, 111, 147

(56) References Cited

U.S. PATENT DOCUMENTS

| | | | |
|---|---|---|---|
| 5,440,718 A | * 8/1995 | Kumagai et al. | 711/181 |
| 5,546,343 A | 8/1996 | Elliot et al. | |
| 5,630,106 A | * 5/1997 | Ishibashi | 395/521 |
| 5,701,270 A | 12/1997 | Rao | |
| 5,870,350 A | * 2/1999 | Bertin et al. | 365/233 |
| 5,877,780 A | * 3/1999 | Lu et al. | 345/519 |
| 6,044,429 A | * 3/2000 | Ryan et al. | 710/131 |

FOREIGN PATENT DOCUMENTS

| | | |
|---|---|---|
| JP | 58-192154 | 11/1983 |
| JP | 63-41934 | 2/1988 |
| JP | 2-148188 | 6/1990 |
| JP | 3-154919 | 7/1991 |
| JP | 4-96840 | 3/1992 |
| JP | 5-507374 | 10/1993 |
| JP | 6-95956 | 4/1994 |
| JP | 6-215160 | 8/1994 |
| JP | 8-227394 | 9/1996 |
| JP | 10-143489 | 5/1998 |
| JP | 10-222459 | 8/1998 |

OTHER PUBLICATIONS

Japanese Office Action dated Feb. 7, 2001 with partial English translation.
Tim Robinson, et al., "Multi–Gigabyte/see DRAM with the MicroUnity Media Channel Interface", COMPCON 96, Feb. 25–29, 1996, pp. 1–5.

(List continued on next page.)

Primary Examiner—Robert Beausoleil
Assistant Examiner—Raymond N Phan
(74) Attorney, Agent, or Firm—McGinn & Gibb, PLLC

(57) ABSTRACT

A memory section and coprocessor sections in a coprocessor-integrated packet-type DRAM are provided with unique memory device ID and coprocessor device IDs respectively. The coprocessor-integrated packet-type DRAMs are connected to a single bus master type packet-type memory/coprocessor bus via external I/O terminals. A request packet is transmitted by the bus master to the packet-type memory/coprocessor bus, and each of the coprocessor-integrated packet-type DRAMs which received the request packet verifies a device ID field in the request packet against the memory device ID and the coprocessor device IDs stored in the coprocessor-integrated packet-type DRAM. If the device ID field matched, the request packet is decoded and memory access to the memory section or coprocessor access to the coprocessor section requested by the request packet is executed. By the access to the coprocessor sections, control of arithmetic logic operation functions of the coprocessor sections including 'operation parameter writing', 'operation start request', 'operation status reading', 'operation result request', etc. can be executed by the bus master. High speed calculation is executed by the on-chip coprocessor sections taking advantage of wide data bandwidth internal data transmission against the memory section.

102 Claims, 27 Drawing Sheets

OTHER PUBLICATIONS

Peter Gillingham, "SLDRAM: High–Performance, Open –Standard Memory", IEEE Micro Nov./Dec. 1997, pp. 29–39.

Nitin Sarangdhar, et al., "An Overview of the Pentium Pro Processor Bus", Proc. of COMPCON '96 (spring), pp. 383–387.

Steven A. Przybylski, et al., "New DRAM Technologies", MicroDesign Resources, pp. 259–336.

Draft Standard for A High–Speed Memroy Interface (SLDRAM), Draft 099 P1596.7–199x (http://www.sldram.com/Documents/SyncLink D0_99.pdf).

Japanese Office Action, dated Jul. 9, 2000, with partial English translation.

Japanese Office Action dated Nov. 21, 2000, with partial English translation.

Murakami et al., Memory multi–chip processor unitized taype ASSP "PRAM" Standard signal interface "PPRAM –Link Standard" Draft 0.0 Summary: Information Processing Association Reseach Report; Corporation; Information Processing Association: August,1996; vol. 96; No. 80 (96–ARC–119); pp. 155–160.

* cited by examiner

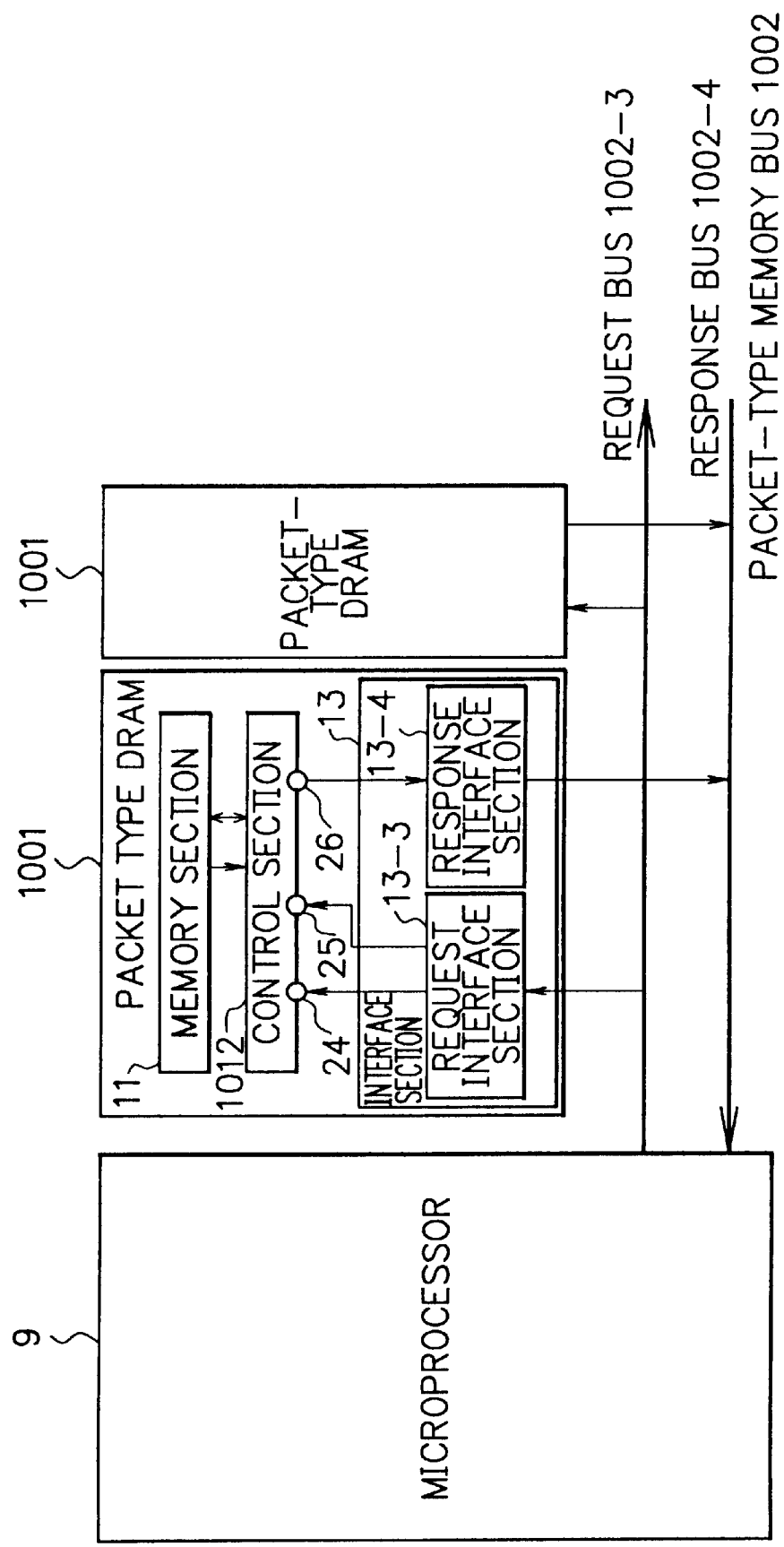

FIG. 3 PRIOR ART

| PROCESS TYPE | REQUESTER | DESTINATION | COMMAND | DATA LENGTH |
|---|---|---|---|---|
| MEMORY ACCESS | BUS MASTER | DRAM CORE SECTION | WRITE | 8B~256B |
| | | | READ | 8B~256B |
| | BUS MASTER | MEMORY CONTROL REGISTER SECTION | WRITE | 8B |
| | | | READ | 8B |
| INITIALIZATION | BUS MASTER | MEMORY CONTROL REGISTER SECTION | | — |
| REFRESH | BUS MASTER | DRAM CORE SECTION | | |

FIG. 4A  PRIOR ART
REQUEST PACKET
WRITE DATA PACKET
FIG. 4B  PRIOR ART
READ DATA PACKET
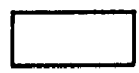
ACKNOWLEDGE PACKET

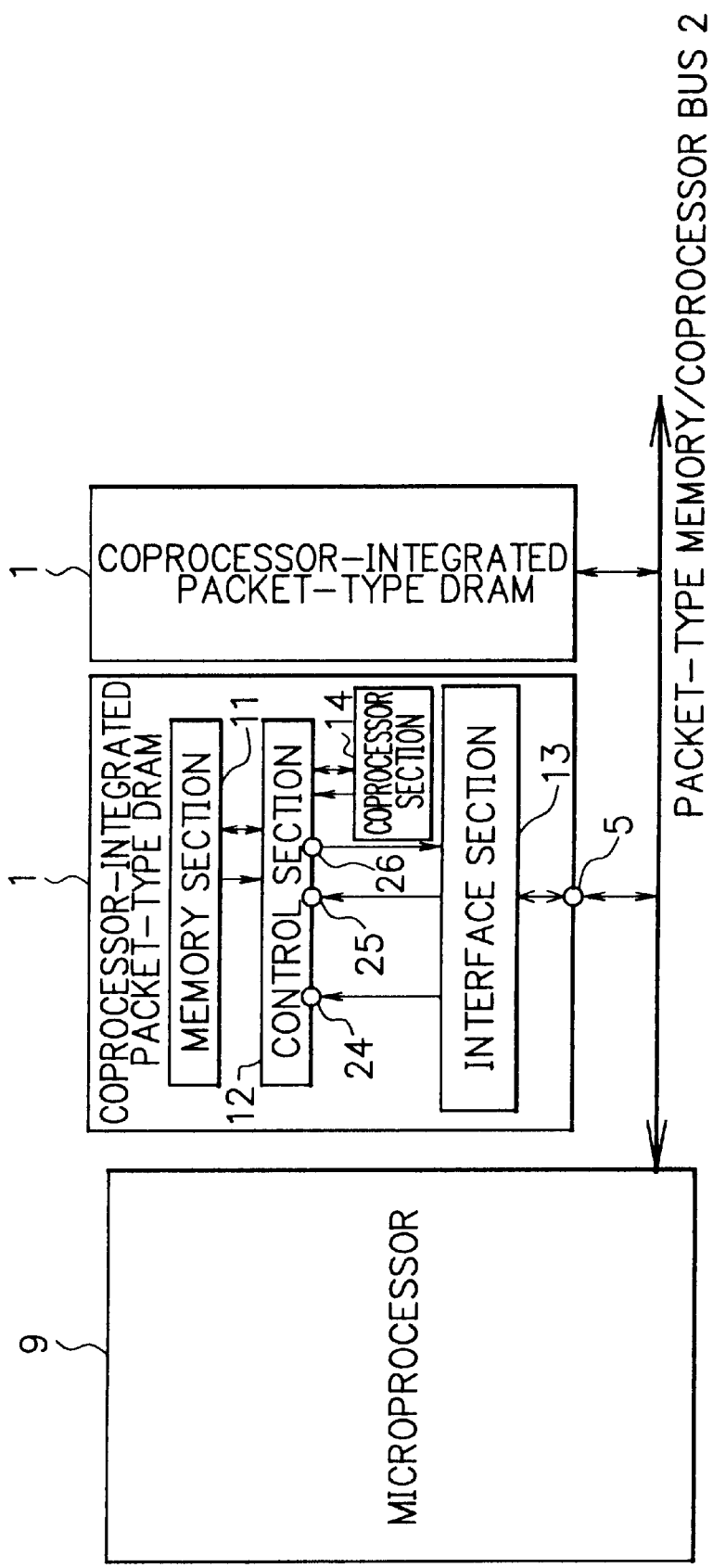

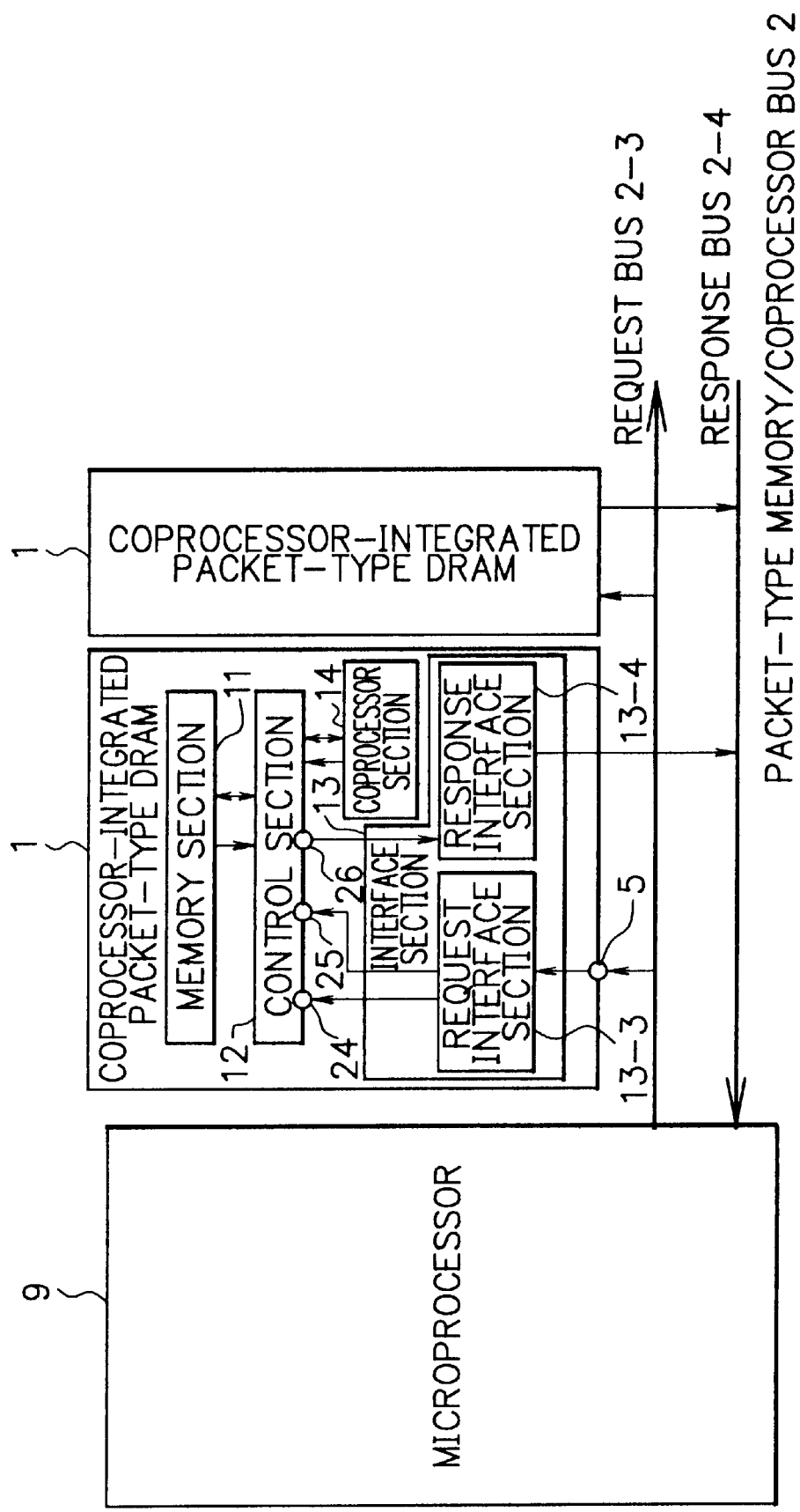

FIG. 10A
REQUEST PACKET
WRITE DATA PACKET
FIG. 10B
READ DATA PACKET
ACKNOWLEDGE PACKET

FIG. 12

| PROCESS TYPE | REQUESTER | DESTINATION | COMMAND |
|---|---|---|---|
| MEMORY ACCESS | BUS MASTER | DRAM CORE SECTION | WRITE |
| MEMORY ACCESS | BUS MASTER | DRAM CORE SECTION | READ |
| MEMORY ACCESS | BUS MASTER | MEMORY CONTROL REGISTER SECTION | WRITE |
| MEMORY ACCESS | BUS MASTER | MEMORY CONTROL REGISTER SECTION | READ |
| COPROCESSOR ACCESS | BUS MASTER | OPERATION CONTROL REGISTER SECTION | WRITE |
| COPROCESSOR ACCESS | BUS MASTER | OPERATION CONTROL REGISTER SECTION | READ |
| INITIALIZATION | BUS MASTER | MEMORY CONTROL REGISTER SECTION OPERATION CONTROL REGISTER SECTION | — |
| REFRESH | BUS MASTER | DRAM CORE SECTION | |

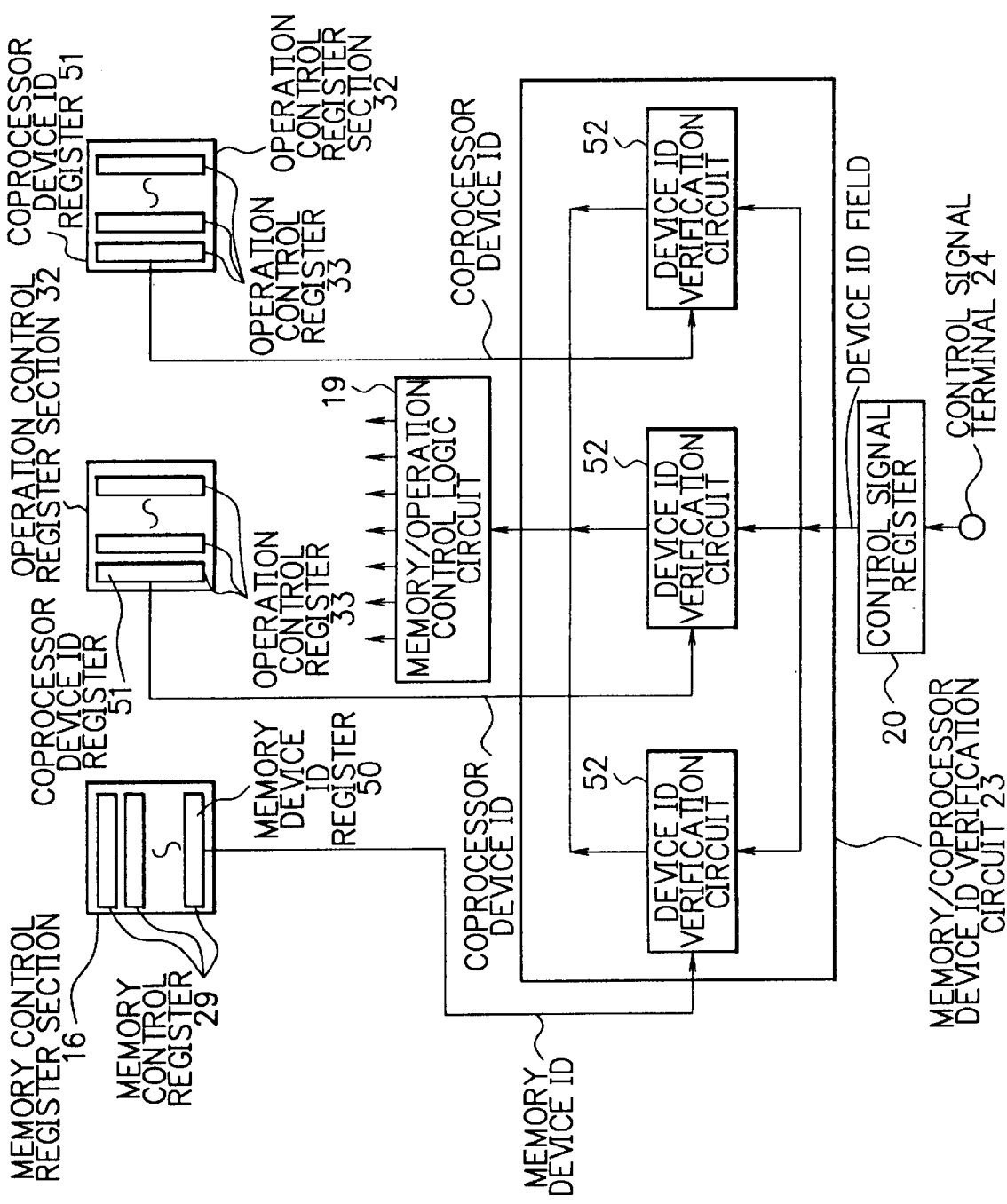
F I G. 14

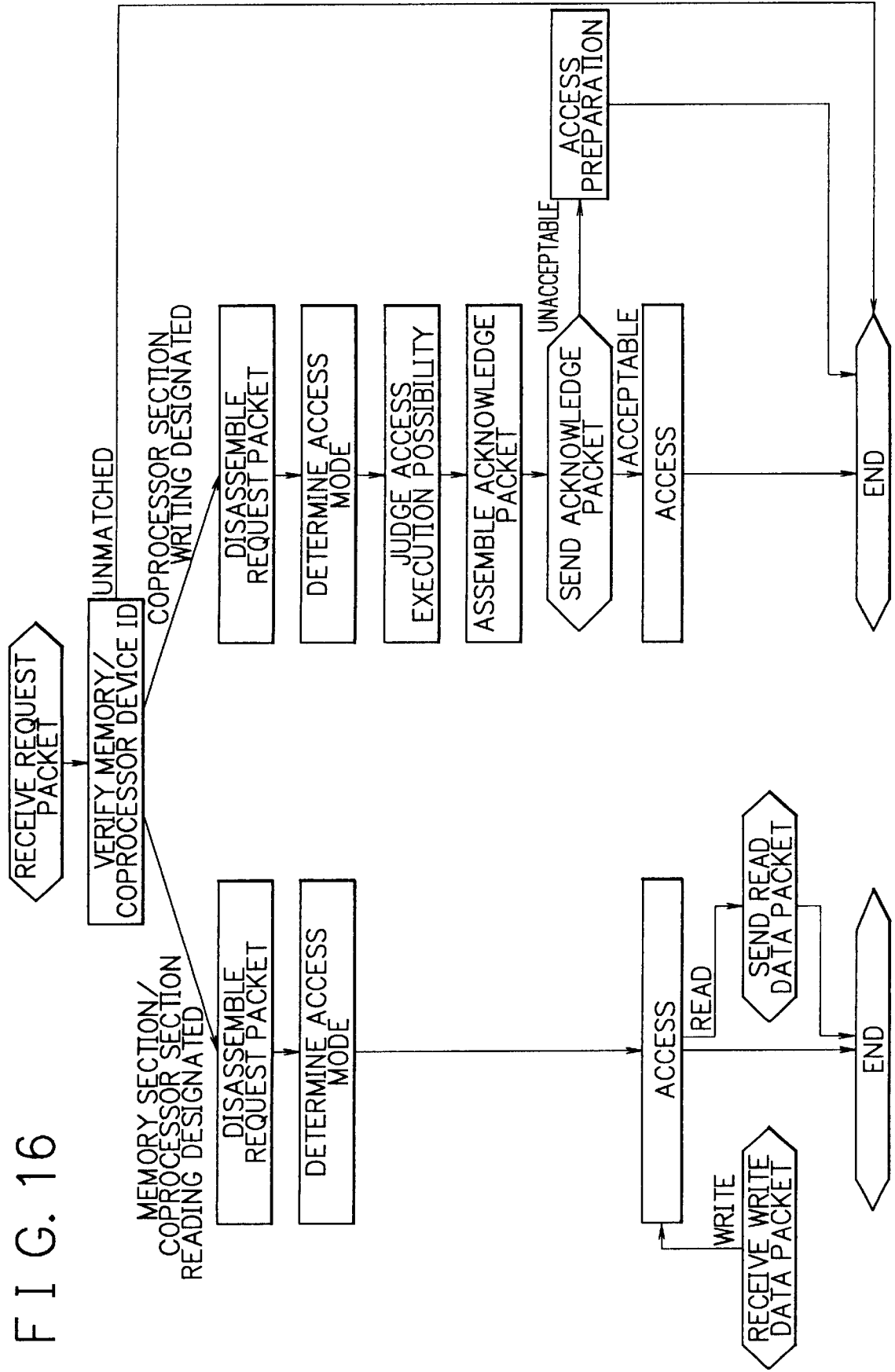
F I G. 16

FIG. 17

| COMMAND | SUB COMMAND |
|---|---|
| WRITING ACCESS | OPERATION PARAMETER WRITING |
| | OPERATION START REQUEST |
| READING ACCESS | OPERATION RESULT REQUEST |
| | OPERATION STATUS READING |

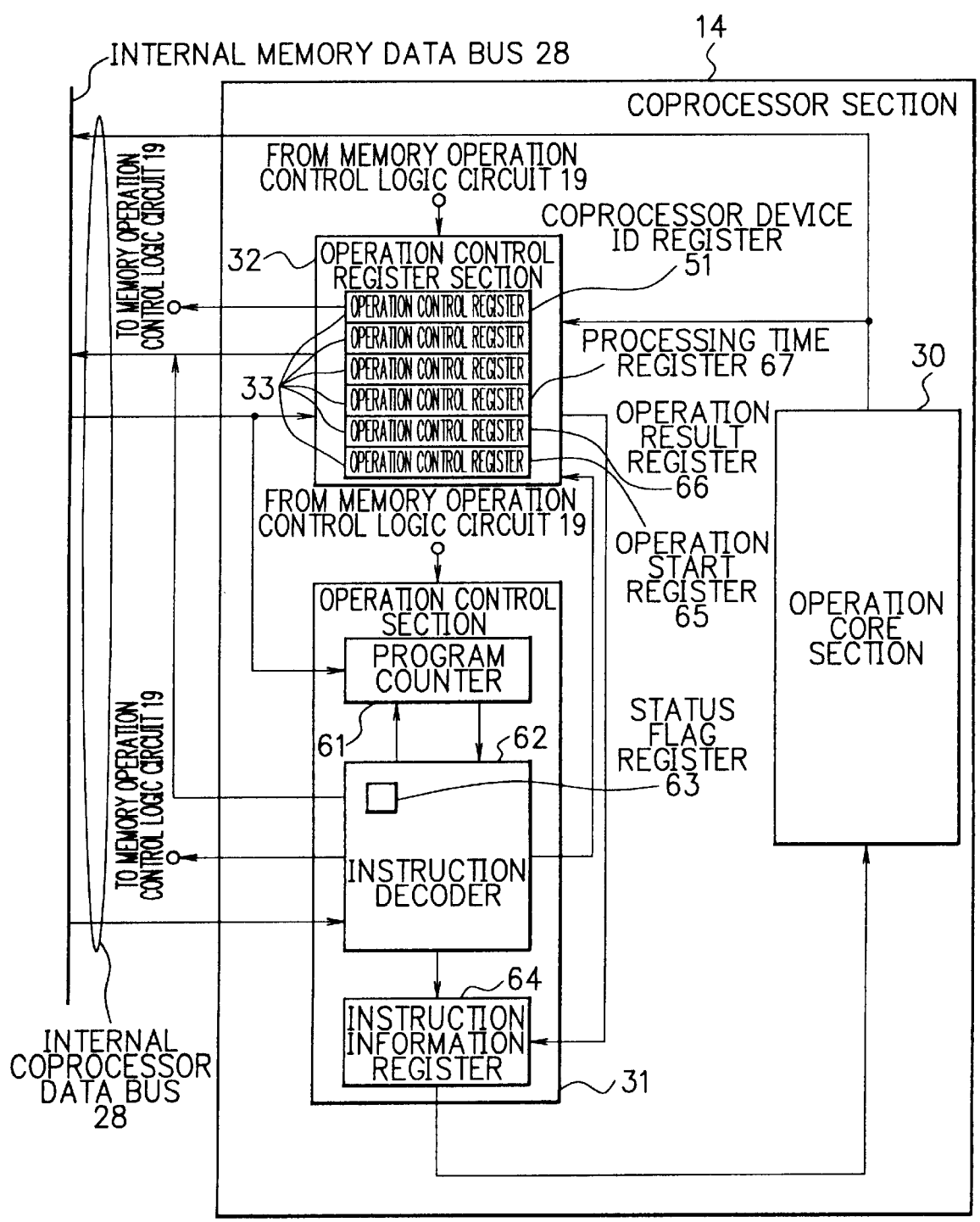
F I G. 18

COPROCESSOR-INTEGRATED PACKET-TYPE MEMORY LSI, PACKET-TYPE MEMORY/COPROCESSOR BUS, AND CONTROL METHOD THEREOF

BACKGROUND OF THE INVENTION

The present invention relates to a packet-type memory LSI which is provided with one or more built-in on-chip coprocessors (i.e. a coprocessor-integrated packet-type memory LSI), and a packet-type memory/coprocessor bus for connecting the coprocessor-integrated packet-type memory LSIs with the bus master.

DESCRIPTION OF THE PRIOR ART

Generally, memory LSIs are increasingly required accessibility with wider data bandwidth if storage capacities of the memory LSIs become larger. This will be easily understood by analogy with a bag in which a lot of articles are stored. Suppose the size of a bag is made larger and larger, and meanwhile the size of its opening remains the same, the bag is necessitated to become more and more inconvenient for storing and taking out the articles. Similarly, suppose the storage capacity of a memory LSI is made larger and its data bandwidth remains the same, the memory LSI will become very unusable for writing and reading data. Therefore, it is very important to keep the balance between the storage capacity and the data bandwidth in order to realize a memory LSI which is usable in a system, and thus development for extending the data bandwidth is growingly promoted mainly on DRUMs which are memory LSIs having the largest storage capacity.

In order to extend the data bandwidth, the operating frequency of the interface between the memory LSI and external devices has to be increased as high as possible, in which simultaneous operation of external I/O signal terminals becomes an obstacle. In the case where a plurality of signal terminals are operating simultaneously at high speed, power consumption of the memory LSI chip becomes high and intense switching noise occurs, and thereby operation errors are caused. Further, when the number of external I/O signal terminals is large, timing skews between the external I/O signal terminals tend to occur and timing adjustment becomes difficult, and thus the high speed operation of becomes difficult.

For such reasons, there have been developed some techniques in order to realize the wider data bandwidth of DRAMs. In such techniques, the number of signal lines in a memory bus to which a DRAM is connected is reduced, and the number of terminals in the external I/O signal terminal of a DRAM is reduced, and the operation frequency of the memory bus is increased. Typical examples of such DRAMs are Rambus DRAMs, SLDRAMs (formerly known as SyncLink DRAMs), Mediachannel DRAMs, etc. Detailed description of the Rambus DRAMs are given in a variety of manuals published by Rambus Inc. The SLDRAMs are now on construction of their specifications as standardized techniques in the IEEE by the SLDRAM Consortium (former SyncLink Consortium), and tentative specifications are shown in "SLDRAM: High-Performance, Open-Standard Memory", IEEE Micro November/December 1997, pp.29–39=1 , or "Draft Standard for A High-Speed Memory Interface (SLDRAM)", Draft 099 P1596.7-199x (http://www.sldram.com/Documents/SyncLinkD0_99.pdf). And with regard to the Mediachannel DRAMs, detailed description is given in a paper which has been presented in a well-known international conference COMPCON'96 (Spring): Tim Robinson et al. "Multi-Gigabyte/sec DRAM with the MicroUnity Mediachannel Interface", Proc. of COMPCON'96 (Spring), pp.378 (1996).

In DRAMs employing such techniques, memory bus techniques or DRAM interface techniques called 'packet-type' or 'protocol-type' are adopted in order to realize effective DRAM access as well as realizing the small number of the signal lines and the small number of terminals in the external I/O signal terminal. Therefore, DRAMs and memory buses according to such conventional techniques will be hereafter referred to as 'packet-type DRAMs' and 'packet-type memory buses', respectively.

In the following, description will be given on the packet-type DRAM and the packet-type memory bus.

FIG. 1 is a block diagram showing an example of composition of a conventional packet-type DRAM 1001. In FIG. 1, the packet-type DRAM 1001 comprises a memory section 11, a control section 1012, and an interface section 13.

The memory section 11 consists of a DRAM core section 15 and a memory control register section 16. The DRAM core section 15 is composed of a plurality of DRAM banks 17 and a plurality of sense amplifiers 18 which are provided corresponding to each of the DRAM banks 17, and the memory control register section 16 includes a plurality of memory control registers 29.

The control section 1012 includes a memory control logic circuit 1019, a control signal register 20, a write data register 21, a read data register 22, and a memory device ID verification circuit 1023. The control section 1012 is provided with three I/O signal terminals to be connected with the interface section 13. The I/O signal terminals of the control section 1012 include a control signal terminal 24 and a write data terminal 25 (input terminals) and a read data terminal 26 (output terminal).

The interface section 13 is connected with an external I/O terminal 5. The memory section 11 and the control section 1012 are connected together by an internal memory data bus 27 which is a bidirectional bus.

FIG. 2A through FIG. 2C are block diagrams showing examples of connections between the conventional packet-type DRAM 1001 and a microprocessor 9 via a packet-type memory bus 1002. Three types of connections are shown in FIG. 2A through FIG. 2C. The packet-type memory bus 1002 is a single bus master type bus and only one bus master is allowed to exist on the packet-type memory bus 1002. All of the packet-type DRAMs 1001 connected to the packet-type memory bus 1002 operate as slave devices. Here, the word 'bus master' generally means a device which can exclusively control a bus and send requests to the bus, and the word 'slave device' generally means a device which does not spontaneously send requests to the packet-type memory bus 1002 but only responds to the request from the bus master. As will be explained, by allowing only one bus master on the bus, the bus master can send a request without arbitration for the bus exclusive ownership of the packet-type memory bus 1002, thereby the protocols for the packet-type memory bus 1002 can be simplified. Incidentally, although the microprocessor 9 is provided as the bus master of the packet-type memory bus 1002 in FIG. 2A through FIG. 2C, other type of a bus master can be provided to the packet-type memory bus 1002, such as a memory controller, a signal processor, a graphics accelerator, an ASIC of other type, etc.

In the composition of FIG. 2A, in the same way as the packet-type DRAM 1001 of FIG. 1, the packet-type DRAM 1001 of FIG. 2A is composed of a memory section 11, a control section 1012, and an interface section 13. All of the I/O terminals of the control section 1012, i.e. the control signal terminal 24, the write data terminal 25 and the read data terminal 26, are connected to the interface section 13. The interface section 13 is connected to the packet-type memory bus 1002 via the external I/O terminal 5. The packet-type memory bus 1002 connects the microprocessor 9 and the packet-type DRAMs 1001. The packet-type memory bus 1002 in FIG. 2A is a bidirectional bus.

In the composition of FIG. 2B, the interface section 13 is composed of a control interface section 13-1 and a data interface section 13-2. The control signal terminal 24 of the control section 1012 is connected to the control interface section 13-1, and the write data terminal 25 and the read data terminal 26 of the control section 1012 are connected to the data interface section 13-2. The packet-type memory bus 1002 of FIG. 2B is composed of a control bus 1002-1 and a data bus 1002-2. The control interface section 13-1 is connected to the control bus 1002-1, and the data interface section 13-2 is connected to the data bus 1002-2. In FIG. 2B, the control bus 1002-1 is a unidirectional bus from the microprocessor 9 to the packet-type DRAMs 1001, and the data bus 1002-2 is a bidirectional bus.

In the composition of FIG. 2C, the interface section 13 is composed of a request interface section 13-3 and a response interface section 13-4. The control signal terminal 24 and the write data terminal 25 of the control section 1012 are connected to the request interface section 13-3, and the read data terminal 26 of the control section 1012 is connected to the response interface section 13-4. The packet-type memory bus 1002 of FIG. 2C is composed of a request bus 1002-3 and a response bus 1002-4. The request interface section 13-3 is connected to the request bus 1002-3, and the response interface section 13-4 is connected to the response bus 1002-4. In FIG. 2C, the request bus 1002-3 is a unidirectional bus from the microprocessor 9 to the packet-type DRAMs 1001, and the response bus 1002-4 is a unidirectional bus in the reverse direction.

FIG. 3 is a classification table showing process requests which are requested to the packet-type DRAM 1001. Process types include 'memory access', 'initialization' and 'refresh'. Each of the processes is requested by the bus master of the packet-type memory bus 1002, i.e. the microprocessor 9 in FIG. 2A through FIG. 2C. The 'memory access' process is classified into two types with regard to destinations, i.e. a memory access to the DRAM core section 15 in the memory section 11 and a memory access to the memory control register section 16 in the memory section 11. Each of the memory access to the DRAM core section 15 and the memory access to the memory control register section 16 includes two types of operations (commands), i.e. read and write. Further, in the case of the access to the DRAM core section 15, data length of the read or write data is designated. Generally, the data length is approximately 8 bytes to 256 bytes, for example. In the case of the access to the memory control register section 16, data of a fixed data length is generally read or written, in which the data length is set at the data length of the memory control register 29 of the memory control register section 16 (for example, 8 bytes) or at a shorter fixed data length. The 'initialization' includes operations of resetting the internal states of the memory control logic circuit 1019, storing specific device information of the packet-type DRAM 1001 into the memory control register section 16, etc. The 'refresh' generally means periodic rewriting to DRAM cells, for keeping memory of the DRAM cells which is necessary for the operation of the DRAM.

In the following, DRAM access operations to the packet-type DRAM 1001 will be explained first, referring to FIG. 1 and FIG.3. In any type of DRAM access, the 'process type', the 'destination', the 'operation', and the 'data length' which are shown in FIG. 3 are designated by the microprocessor 9 (i.e. the bus master) and the designated information is transmitted to the control signal terminal 24 of the control section 1012 of the packet-type DRAM 1001, via the external I/O terminal 5 and the interface section 13. The designated information further includes a memory address for designating one of the DRAM banks 17 and a position therein to be made access, or a memory control register number for designating a specific memory control register 29 in the memory control register section 16. Such information supplied via the control signal terminal 24 will hereafter be referred to as 'control signal information'.

The control signal information further includes a memory device ID for selecting one or more packet-type DRAMs 1001 out of a plurality of packet-type DRAMs 1001 which are connected to the packet-type memory bus 1002. Each packet-type DRAM 1001 is provided with a specific memory device ID and the memory device ID is stored in specific one of the memory control registers 29 in the memory control register section 16, and the memory device ID verification circuit 1023 in each packet-type DRAM 1001 verifies the device ID included in the control signal information against the memory device ID of the packet-type DRAM 1001 itself. By the verification, it is judged whether the destination of the request (such as DRAM access) which has been supplied via the external I/O terminal 5 is the packet-type DRAM 1001 itself or not. If the destination of the DRAM access request is not the packet-type DRAM 1001 itself, the following operations will not be executed. Incidentally, there are cases where the device ID included in the control signal information designates memory device IDs of two or more packet-type DRAMs 1001.

In the control section 1012, data which has been read out is outputted from the read data terminal 26 in the case of reading access, and data which should be written is supplied to the write data terminal in the case of writing access. The control signal register 20, the write data register 21, and the read data register 22 operate as I/O latches (or I/O registers) for the control signal terminal 24, the write data terminal 25, and the read data terminal 26, respectively. The memory control logic circuit 1019 determines subsequent operation according to the control signal information which is supplied via the control signal terminal 24 and controls the DRAM access. In the control of the DRAM access, the memory control logic circuit 1019 refers to memory in the memory control registers 29 in the memory control register section 16 when necessary. In the case of DRAM access to the DRAM core section 15, a desired DRAM bank 17 is selected by the designation of the memory address, and data in the DRAM bank 17 is made access via a corresponding sense amplifier 18. Here, the sense amplifier 18 operates also as a cache memory or a high-speed buffer for the corresponding DRAM bank 17. Therefore, when the range of the addresses for the DRAM access is within the data which has already been temporarily stored in the sense amplifier 18, the sense amplifiers 18 instead of the DRAM bank 17 is made access with a high speed, thereby high speed DRAM access is made possible.

In the case of DRAM access to the DRAM core section 15, access to the DRAM bank 17 is executed depending on whether the desired data has already been temporarily stored in the sense amplifier 18 or not, and thus access time widely varies. In the case where the subsequent access is addressed to data which is not temporarily stored in the sense amplifier 18, it is often advantageous for high speed access if the data temporarily stored in the sense amplifier 18 is written back to the DRAM bank 17 before the subsequent access. Therefore, in the case of DRAM access to the DRAM core section 15, the control signal information usually includes information with regard to control of the DRAM core section 15, such as whether access to the DRAM bank 17 should be executed or not, whether data in the sense amplifier 18 should be written back to the DRAM bank 17 or not, etc.

As mentioned above, in the conventional composition of the packet-type memory buses 1002 which have been explained referring to FIG. 2A through FIG. 2C, it is characteristic of the packet-type memory bus 1002 to be composed of a very small number of signal lines. Concretely, the number of the signal lines is approximately 10 to 30. In the conventional techniques, Rambus employs the composition of FIG. 2A, the SLDRAM Consortium employs the composition of FIG. 2B, and Mediachannel employs the composition of FIG. 2C. As mentioned above, in order to send the control signal information, which is necessary for the DRAM access, from the microprocessor 9 to the packet-type DRAMs 1001 via a small number of signal lines, or in order to execute data transmission between the microprocessor 9 and the packet-type DRAMs 1001 using a small number of signal lines, a system for assembling the control signal information and the data into packets and sending/receiving the packets during some cycles is needed to be provided. Further, for assembling and disassembling such packets, some fixed protocols have to be established.

FIGS. 4A and 4B are schematic diagrams showing classification of packets transmitted on the packet-type memory bus 1002. Two kinds of packets shown in FIG. 4A, i.e. the request packet and the write data packet, are transmitted from the microprocessor 9 to the packet-type DRAMs 1001. The request packet is a variable length packet which is generated by encoding the aforementioned control signal information according to predetermined protocols. The write data packet includes write data whose size is variable. Meanwhile, two kinds of packets shown in FIG. 4B, i.e. the read data packet and the acknowledge packet, are transmitted from the packet-type DRAMs 1001. The read data packet includes read data whose size is variable. The acknowledge packet is generally a fixed length packet. The acknowledge packet is necessary in some cases and unnecessary in other cases, as will be explained below.

The acknowledge packet is necessary in the case where the microprocessor 9 (i.e. the bus master), which is making a request for a DRAM access to the packet-type DRAM 1001, can not judge whether or not the packet-type DRAM 1001 can accept the DRAM access request, or whether or not the packet-type DRAM 1001 can immediately respond to the request, for example, in the case where access to the DRAM core section 15 should be requested during the refresh of the packet-type DRAM 1001 and the microprocessor 9 does not know whether or not the refresh is in process. Further, the acknowledge packet is necessary in the case where the microprocessor 9 does not know whether or not data to be made access has already been temporarily stored in the sense amplifier 18. In such cases, the acknowledge packet includes information indicating whether the requested access can be accepted or not, and information instructing the microprocessor 9 how to operate in the case where the requested access can not be accepted. The instruction can be, for example, an instruction to request for access again after a predetermined time, or an instruction to wait for a predetermined time till the access is completed. On the other hand, the acknowledge packet is unnecessary in the case where the microprocessor 9 fully manages and grasps the internal states of the packet-type DRAM 1001 and thus the access is guaranteed to be accepted when the microprocessor 9 makes the access request. Rambus employs a method which needs the acknowledge packet, and the SLDRAM Consortium employs a method which does not need the acknowledge packet.

FIG. 5A through FIG. 5C are schematic diagrams showing transmission of packets on the packet-type memory bus 1002 in each composition of FIG. 2A through FIG. 2C. In FIG. 5A through FIG. 5C, the microprocessor 9 (the bus master) is placed on the left-hand side, and the packet-type DRAMs 1001 (the slave devices) are placed on the right-hand side, in the same way as FIG. 2A through FIG. 2C.

In the composition of FIG. 2A, every type of packets are transmitted on one bidirectional packet-type memory bus 1002. Therefore, the packet transmission in FIG. 5A is shown classified with respect to two operations: writing and reading. In the writing operation, the microprocessor 9 sends a request packet first, and then sends a write data packet. To this, the packet-type DRAM 1001 sends an acknowledge packet, and then the write data is correctly written if accepted. In the reading operation, the microprocessor 9 sends a request packet and the packet-type DRAM 1001 sends an acknowledge packet. If accepted, the packet-type DRAM 1001 subsequently sends a read data packet. Incidentally, as mentioned above, above operations without using the acknowledge packets are also possible, in which transmission of other kinds of packets are the same as FIG. 5A.

FIG. 5B is showing which packet is transmitted on the control bus 1002-1 or the data bus 1002-2 in the composition of FIG. 2B. The request packet is transmitted on the control bus 1002-1, and the write data packet, the read data packet and the acknowledge packet are transmitted on the data bus 1002-2. As mentioned above, there are cases where the acknowledge packet is not used, and the SLDRAM Consortium which adopts this type of composition does not actually use the acknowledge packet.

FIG. 5C is showing which packet is transmitted on the request bus 1002-3 or the response bus 1002-4 in the composition of FIG. 2C. The request packet and the write data packet are transmitted on the request bus 1002-3, and the read data packet and the acknowledge packet are transmitted on the response bus 1002-4. As mentioned above, there are cases where the acknowledge packet is not used.

FIG. 6A and FIG. 6B are flow charts showing the operation of the packet-type DRAM 1001 when a request packet is received. FIG. 6A is showing the case where the acknowledge packet is necessary, and FIG. 6B is showing the case where the acknowledge packet is unnecessary. Referring to FIG. 6A, when the request packet is received, the packet-type DRAM 1001 verifies the memory device ID and judges whether it has to respond to the request or not. If the memory device ID was not the memory device ID of the packet-type DRAM 1001 itself, the process is ended. If the memory device ID matched, the packet-type DRAM 1001 disassembles the request packet and determines access mode. Subsequently, the packet-type DRAM 1001 judges whether or not the packet-type DRAM 1001 can correctly respond to the request for the access to the DRAM core section 15 or the memory control register section 16 according to the determined access mode. Subsequently, the packet-type DRAM 1001 assembles an acknowledge packet according to the result of the judgment etc. and sends the acknowledge packet. The acknowledge packet includes information indicating whether the packet-type DRAM 1001 accepts the request or not. When the request is accepted, the access is executed. In the case of reading access, the packet-type DRAM 1001 sends a read data packet and the process is ended. In the case of writing access, the packet-type DRAM 1001 receives a write data packet and the write data is written in the DRAM core section 15 or the memory control register section 16, and the process is ended. When the request is not accepted, the packet-type DRAM 1001 executes access preparation. Here, the access preparation includes waiting for completion of a refresh if during the refresh, or transferring data from the DRAM bank 17 to the sense amplifier 18 if the address of the requested data does not correspond to the address of the data which has been temporarily stored in the sense amplifier 18. After the access preparation, the packet-type DRAM 1001 shifts into access operation and operates in the same way as the case where the request is accepted, or finishes the operation with regard to the particular request packet and waits for another reception of a request packet.

In FIG. 6B, the operation of the packet-type DRAM 1001 is rather simpler since the acknowledge packet is not used. After the verification of the memory device ID, the request packet is disassembled and access mode is determined, the reading or writing access is executed, and the operation with regard to the request packet is ended.

FIG. 7A through FIG. 7E are schematic diagrams showing typical packet formats of each packet, taking the technique of the SLDRAM Consortium as an example. FIG. 7A through FIG. 7C are showing examples of request packets, and FIG. 7D is showing an example of an acknowledge packet, and FIG. 7E is showing an example of a read data packet or a write data packet. Incidentally, in the technique of the SLDRAM Consortium, the control bus 1002-1 is composed of 10-bit memory bus signal lines and the data bus 1002-2 is composed of 16-bit memory bus signal lines.

FIG. 7A is showing a request packet for requesting writing access or reading access to the DRAM core section 15. The request packet of FIG. 22A occupies the 10-bit control bus 1002-1 during four cycles. In the first cycle, the first 7 bits are used as a device ID field for designating the device ID, and the remaining 3 bits are used as a command field for designating a command No.0. In the second cycle, the first 3 bits are used as a command field for designating a command No.1, and the remaining 7 bits are used as a parameter field for designating a parameter No.0. The remaining two cycles are used as parameter fields for designating parameters No.1 and No.2 respectively. The control signal information which has been explained referring to FIG. 3, including the process type, the destination, the operation, the data length, the information about the control of the DRAM core section 15, etc., is designated in the command fields for the command No.0 and the command No.1. Addresses of data in the DRAM core section 15 are designated in the parameter fields for the parameter No.0, the parameter No.1 and the parameter No.2.

FIG. 7B is showing a request packet for requesting reading access to the memory control register section 16. One of the memory control registers 29 in the memory control register section 16 to be made access is designated in the parameter No.0 field in the latter 7 bits of the second cycle.

FIG. 7C is showing a request packet for requesting writing access to the memory control register section 16. One of the memory control registers 29 in the memory control register section 16 to be made access is designated in the parameter No.0 field in the latter 7 bits of the second cycle. The write data is designated in the parameter No.1 field in the third cycle and the parameter No.2 field in the fourth cycle.

As shown in FIG. 7A through FIG. 7C, the device ID field is included in every request packet, and which of the packet-type DRAMs 1001 has to respond to the request is uniquely determined by the verification against the device ID field. Similarly, the fields for the command No.0 and the command No.1 are common to every request packet, and the access operation to be executed in the packet-type DRAM 1001 is uniquely determined by decoding the fields. The parameter fields are used for designation of the address of data in the DRAM core section 15, the memory control register 29, the write data, etc., depending on the type of the requested access. Incidentally, the designation by the device ID field is not limited to one packet-type DRAM 1001, and there are cases where a plurality of packet-type DRAMs 1001 are designated at once (referred to as 'multicast'), or cases where all the packet-type DRAMs 1001 connected to the packet-type memory bus 1002 are designated at once (referred to as 'broadcast').

FIG. 7D is showing an example of a packet format of an acknowledge packet. Actually, the acknowledge packet does not exist in the technique of the SLDRAM Consortium, and thus FIG. 7D is showing a format of an acknowledge packet of Rambus which is realized on the SLDRAM data bus 1002-2. The acknowledge packet of FIG. 7D occupies the data bus 1002-2 during one cycle, in which the first 2 bits are used to indicate whether the request can be accepted or not (i.e. whether response to the request can be executed or not), or whether some system error exists or not.

FIG. 7E is showing an example of a format of a write data packet or a read data packet. Each of the write data packet and the read data packet transmits variable length data, occupying the data bus 1002-2 during a necessary number of cycles.

As described above, the packet-type DRAM 1001 and the packet-type memory bus 1002 in the conventional techniques realize functions for transmitting packets between the bus master and the packet-type DRAMs 1001 based on predetermined protocols. Meanwhile, in the fields of parallel processing systems and distributed processing systems, conventional techniques for communicating between a plurality of devices have long been used. In such systems, a plurality of devices (or nodes) are connected via buses or a network, and packet transmission or other kinds of communication means are used in order to execute mutual process request between the devices (nodes) or in order to synchronize parallelly executed processes.

A variety of such conventional techniques exist, in which the 'processor bus' for the Pentium Pro microprocessor of Intel can be taken as an example. Description of the processor bus is given in a paper which has been presented in the international conference COMPCON'96 (Spring): Nitin Sarangdhar et al. "An Overview of the Pentium Pro Processor Bus", Proc. of COMPCON'96 (Spring), pp.383 (1996). The Pentium Pro processor bus has been designed on the assumption of connecting a plurality of Pentium Pro microprocessors, memory controllers, I/O controllers, etc., and methods for physical and electrical connection of the devices and driving protocols for the processor bus have been established. Further, standard method for maintaining cache coherency between a plurality of Pentium Pro microprocessors has been established for the Pentium Pro processor bus. Here, the 'cache coherency' means a state in which copies, which have been respectively stored in cache memories of each node by copying from the same data, have the same value.

As mentioned above, the conventional techniques using the packet-type DRAM 1001 and the packet-type memory bus 1002 realize functions for transmitting packets according to predetermined protocols. In such conventional techniques, the functions for packet transmission are utilized only for the DRAM access to the packet-type DRAMs 1001, i.e. for the reading access or the writing access to the DRAM core section or the memory control register section 16 and for the control of the initialization or the refresh of the packet-type DRAM 1001. However, the original applicability of such functions realizing communication by packet transmission does not have to be limited to such DRAM access. In other words, such functions can be utilized as communication means which can meet various types of purposes.

As an example of such purposes, one or more coprocessors provided with functions for some arithmetic logic operation may be built in the packet-type DRAM 1001, and the arithmetic logic operation of the coprocessors may be controlled by the bus master by sending some type of packet from the bus master via the packet-type memory bus 1002. In such a packet-type DRAM provided with built-in coprocessors (i.e. a coprocessor-integrated packet-type DRAM), internal access with wide bandwidth and low latency can be executed to the on-chip DRAM, and thus the built-in coprocessors can execute effective arithmetic logic operation by the internal access to data stored in the bulk storage on-chip DRAM with wide bandwidth and low latency. As explained above, no consideration has been given to the other purposes (than the DRAM access) of the packet transmission functions of the conventional techniques using the packet-type DRAM 1001, and thus the conventional techniques is not sufficient as a memory bus technique for controlling the aforementioned coprocessor-integrated packet-type DRAM.

Meanwhile, it seems that such external control of the arithmetic logic operation of the coprocessor which is built in the DRAM (i.e. external control of the on-chip coprocessor) can be easily realized by applying the aforementioned other techniques such as the processor buses in parallel processing systems etc. However, such problem solving involves the following drawbacks.

The protocols for the processor bus etc. in parallel processing systems are rather more complex than the protocols for the packet-type memory bus 1002 for some reasons. First, the processor bus has been designed on the assumption of a plurality of bus masters. There are cases where a plurality of bus masters make requests to the processor bus at once, and thus the arbitration for the bus exclusive ownership of the processor bus has to be executed between the bus masters. Further, flow control is necessary on the processor bus in order to avoid deadlock or livelock. Further, the protocols have to provide support for a variety of communication formats (packet formats) on many kinds of buses and a variety of communication patterns (i.e. between which devices communication should be executed, with what timing transmission should be executed, etc.) on many kinds of buses. Furthermore, specifications for guaranteeing data consistency such as the cache coherency between a plurality of processors may have to be included in the protocols. In this way, the protocols for the processor bus are very complex, therefore communication in such systems via processor buses takes much longer time.

On the other hand, the protocols for the packet-type memory bus 1002 can be rather similar, since the bus master to make requests to the packet-type memory bus 1002 is only one and the arbitration for the bus exclusive ownership is not necessary, and since the protocols are not needed to provide support for many kinds of packet formats. Further, if the bus master such as a microprocessor, a memory controller, etc. of the packet-type memory bus 1002 is designed to manage and grasp the internal states of the packet-type DRAMs 1001, protocols can be constructed without the use of the acknowledge packet as mentioned above, therefore very simple protocols can be realized. Therefore, the conventional systems with simple protocols using the packet-type DRAM 1001 and the packet-type memory bus 1002 have strong points in that assembling, transmission and disassembling of packets can be executed with higher speed, and communication via the packet-type memory bus 1002 can be executed in a short time. Reduction of the DRAM access time along with the extension of data bandwidth is a main challenge in designing of DRAMs. Therefore, the above characteristics are very advantageous for memory buses which are used for constructing DRAM systems.

To sum up, if a system with the packet-type DRAM 1001 and the packet-type memory bus 1002 is tried to be constructed employing the conventional techniques in the fields of parallel processing systems or distributed processing systems, processing of protocols requires much time and the DRAM access time is necessitated to be considerably increased. When it is attempted to realize the aforementioned coprocessor-integrated packet-type DRAM which can be made external reading access and writing access as a general packet-type DRAM 1001, it is not allowed if the access time of the packet-type DRAM 1001 itself increases in order to realize the external control of the arithmetic logic operation functions of the built-in coprocessor. On the other hand, the external control of the arithmetic logic operation functions of the on-chip built-in coprocessor can not be realized by the conventional packet-type DRAM 1001 and the packet-type memory bus 1002.

SUMMARY OF THE INVENTION

It is therefore the primary object of the present invention to provide a flexible and high-performance packet-type DRAM with built-in coprocessors (i.e. a coprocessor-integrated packet-type DRAM), with which external control of the arithmetic logic operation functions of the on-chip built-in coprocessor can be realized.

Another object of the present invention is to provide such a coprocessor-integrated packet-type DRAM, needing no spatial/temporal overhead with respect to both the number of terminals in the external I/O signal terminal and the DRAM access time to the on-chip packet-type DRAM itself, in comparison with the conventional packet-type DRAM.

Another object of the present invention is to provide a packet-type memory/coprocessor bus which can realize external control of the coprocessor-integrated packet-type DRAM, with which both the external control of the arithmetic logic operation functions of the on-chip built-in coprocessor and the DRAM access to the packet-type DRAM on the same chip are realized.

Another object of the present invention is to provide such a packet-type memory/coprocessor bus, needing no spatial/temporal overhead with respect to both the number of the signal lines composing the bus and bus timing on the DRAM access, in comparison with the conventional packet-type memory bus.

Another object of the present invention is to provide a coprocessor-integrated packet-type DRAM and a packet-type memory/coprocessor bus, by which an arbitrary number of the packet-type DRAMs and an arbitrary number of the coprocessor-integrated packet-type DRAMs can be connected in a mixed arrangement to the same packet-type memory/coprocessor bus, in which the DRAM access to the packet-type DRAMs, the DRAM access to the coprocessor-integrated packet-type DRAMs, and the control of the arithmetic logic operation functions of the on-chip built-in coprocessors in the coprocessor-integrated packet-type DRAMs can be executed via the packet-type memory/coprocessor bus.

In accordance with a 1st aspect of the present invention, there is provided a coprocessor-integrated packet-type memory LSI to be connected to a packet-type memory/coprocessor bus out of the coprocessor-integrated packet-type memory LSI via an external I/O terminal having a desired number of signal terminals, comprising a memory section, a control section, an interface section, and a desired number of coprocessor sections. In the coprocessor-integrated packet-type memory LSI, a memory device ID and coprocessor device IDs are assigned to the memory section and the coprocessor sections respectively and are stored in the coprocessor-integrated packet-type memory LSI, in which the memory device ID and the coprocessor device IDs are assigned so that each of them can uniquely designate one memory section or one coprocessor section out of all of the memory sections and the coprocessor sections in all of the coprocessor-integrated packet-type memory LSIs which are connected to the packet-type memory/coprocessor bus.

In accordance with a 2nd aspect of the present invention, in the 1st aspect, the memory section includes a memory core section and a memory control register section including a desired number of memory control registers. The coprocessor section includes an operation core section, an operation control section, and an operation control register section including a desired number of operation control registers. The control section and the memory section are connected by an internal memory data bus, and the control section and the coprocessor sections are connected by internal coprocessor data buses.

In accordance with a 3rd aspect of the present invention, in the 2nd aspect, the memory core section is composed of dynamic random access memory.

In accordance with a 4th aspect of the present invention, there is provided a packet-type memory/coprocessor bus for connecting a bus master and a desired number of coprocessor-integrated packet-type memory LSIs of the 1st, 2nd or 3rd aspect. The packet-type memory/coprocessor bus is a single bus master type bus needing no arbitration for its bus exclusive ownership to be executed by the bus master when the bus master transmits a packet to the packet-type memory/coprocessor bus, in which two types of packets including a request packet and a write data packet can be transmitted by the bus master to the packet-type memory/coprocessor bus, and a read data packet can be transmitted by the coprocessor-integrated packet-type memory LSI to the packet-type memory/coprocessor bus.

In accordance with a 5th aspect of the present invention, there is provided a packet-type memory/coprocessor bus for connecting a bus master and a desired number of coprocessor-integrated packet-type memory LSIs of the 1st, 2nd or 3rd aspect. The packet-type memory/coprocessor bus is a single bus master type bus needing no arbitration for its bus exclusive ownership to be executed by the bus master when the bus master transmits a packet to the packet-type memory/coprocessor bus, in which two types of packets including a request packet and a write data packet can be transmitted by the bus master to the packet-type memory/coprocessor bus, and two types of packets including a read data packet and an acknowledge packet can be transmitted by the coprocessor-integrated packet-type memory LSI to the packet-type memory/coprocessor bus.

In accordance with 6th and 7th aspects of the present invention, in the 4th and 5th aspects, the request packet includes a device ID field for designating the destination of the request packet out of all of the memory sections and the coprocessor sections in all of the coprocessor-integrated packet-type memory LSIs which are connected to the packet-type memory/coprocessor bus, a command field for designating a process which the request packet requests, and a parameter filed for designating parameters which are necessary for the execution of the process which is requested by the request packet.

In accordance with 8th and 9th aspects of the present invention, in the 6th and 7th aspects, the device ID field has a fixed field length regardless of whether the device ID field designates a memory section or a coprocessor section, and the command field also has a fixed field length regardless of whether the device ID field designates a memory section or a coprocessor section.

In accordance with 10th and 11th aspects of the present invention, in the 6th and 7th aspects, the device ID field has a fixed field length regardless of whether the device ID field designates a memory section or a coprocessor section, and the field length of the command field varies depending on whether the device ID field designates a memory section or a coprocessor section.

In accordance with 12th, 13th, 14th and 15th aspects of the present invention, in the 8th, 9th, 10th and 11th aspects, the packet-type memory/coprocessor bus includes a control bus which is a unidirectional bus from the bus master to the coprocessor-integrated packet-type memory LSI, and a data bus which is a bidirectional bus between the bus master and the coprocessor-integrated packet-type memory LSI.

In accordance with 16th, 17th, 18th and 19th aspects of the present invention, in the 8th, 9th, 10th and 11th aspects, the packet-type memory/coprocessor bus includes a request bus which is a unidirectional bus from the bus master to the coprocessor-integrated packet-type memory LSI, and a response bus which is a unidirectional bus from the coprocessor-integrated packet-type memory LSI to the bus master.

In accordance with a 20th aspect of the present invention, there is provided a method for controlling the coprocessor-integrated packet-type memory LSI of the 1st, 2nd or 3rd aspect. The method comprises a reception step, a verification step, a decoding step, and an instruction step. In the reception step, the interface section receives the request packet from the packet-type memory/coprocessor bus of the 6th or 7th aspect via the external I/O terminal. In the verification step, the control section verifies the device ID field in the request packet against the memory device ID and the coprocessor device IDs stored in the coprocessor-integrated packet-type memory LSI. In the decoding step, the control section decodes the command field in the request packet, only in the case where the device ID field designates any of the memory device ID and the coprocessor device IDs stored in the coprocessor-integrated packet-type memory LSI. And in the instruction step, the control section instructs the memory section or the coprocessor section designated by the device ID field to execute the process which is requested by the request packet.

In accordance with 21st, 22nd and 23rd aspects of the present invention, in the 1st, 2nd and 3rd aspects, the coprocessor-integrated packet-type memory LSI is controlled by the method of the 20th aspect, and the coprocessor-integrated packet-type memory LSI further comprises a memory device ID register, one or more coprocessor device ID registers, and a memory/coprocessor device ID verification circuit. The memory device ID register stores the memory device ID of the memory section. The coprocessor device ID registers store the coprocessor device IDs of the coprocessor sections respectively. The memory/coprocessor device ID verification circuit is connected with the memory device ID register and the coprocessor device ID registers, and parallelly executes the verification of the device ID field in the request packet against the memory device ID stored in the memory device ID register and the verification of the device ID field in the request packet against the coprocessor device IDs stored in the coprocessor device ID registers respectively, and thereby judges whether or not the device ID field designates each of the memory section and the coprocessor sections in the coprocessor-integrated packet-type memory LSI.

In accordance with a 24th aspect of the present invention, in the 22nd aspect, the memory device ID register is provided as one of the memory control registers in the memory control register section of the memory section, and the coprocessor device ID register is provided as one of the operation control registers in the operation control register section of the coprocessor section.

In accordance with a 25th aspect of the present invention, in the 20th aspect, in the decoding step, the control section employs different decoding methods for decoding the command field depending on whether the device ID field of the request packet designates a memory section or a coprocessor section. Therefore, a command field with a particular bit pattern can designate different process requests depending on whether the device ID field designates a memory section or a coprocessor section.

In accordance with a 26th aspect of the present invention, in the 20th aspect, in the case where the device ID field in the request packet designated the memory section, the control section decodes the command field of the request packet, and instructs the memory section to execute writing access or reading access to the memory core section or the memory control register section in the memory section according to the result of the decoding.

In accordance with a 27th aspect of the present invention, in the 20th aspect, in the case where the device ID field in the request packet designated the memory section, the control section decodes the command field of the request packet, judges whether the memory section can execute writing access or reading access requested by the request packet or not according to the result of the decoding, transmits the judgment result to the packet-type memory/coprocessor bus as the acknowledge packet, and instructs the memory section to execute the writing access or the reading access to the memory core section or the memory control register section in the memory section if the memory section has been judged to be able to execute the access.

In accordance with a 28th aspect of the present invention, in the 20th aspect, in the case where the device ID field in the request packet designated one of the coprocessor sections, the control section decodes the command field of the request packet, and instructs the designated coprocessor section to execute writing access or reading access to the operation control register section in the coprocessor section according to the result of the decoding.

In accordance with a 29th aspect of the present invention, in the 20th aspect, in the case where the device ID field in the request packet designated one of the coprocessor sections, the control section decodes the command field of the request packet, judges whether the designated coprocessor section can execute writing access or reading access requested by the request packet or not according to the result of the decoding, transmits the judgment result to the packet-type memory/coprocessor bus as the acknowledge packet, and instructs the designated coprocessor section to execute the writing access or the reading access to the operation control register section in the coprocessor section if the coprocessor section has been judged to be able to execute the access.

In accordance with a 30th aspect of the present invention, in the 20th aspect, in the case where the device ID field in the request packet designated the memory section, the control section decodes the command field of the request packet, and instructs the memory section to execute writing access or reading access to the memory core section or the memory control register section in the memory section according to the result of the decoding. In the case where the device ID field in the request packet designated one of the coprocessor sections, the control section decodes the command field of the request packet, judges whether the designated coprocessor section can execute writing access or reading access requested by the request packet or not according to the result of the decoding, transmits the judgment result to the packet-type memory/coprocessor bus as the acknowledge packet, and instructs the designated coprocessor section to execute the writing access or the reading access to the operation control register section in the coprocessor section if the coprocessor section has been judged to be able to execute the access.

In accordance with a 31st aspect of the present invention, in the 20th aspect, in the case where the device ID field in the request packet designated the memory section, the control section decodes the command field of the request packet, and instructs the memory section to execute writing access or reading access to the memory core section or the memory control register section in the memory section according to the result of the decoding. In the case where the device ID field in the request packet designated one of the coprocessor sections, the control section decodes the command field of the request packet. Then, if the decoded command field instructed writing access to the operation control register section, the control section judges whether the designated coprocessor section can execute the writing access or not, transmits the judgment result to the packet-type memory/coprocessor bus as the acknowledge packet, and instructs the designated coprocessor section to execute the writing access to the operation control register section in the coprocessor section if the coprocessor section has been judged to be able to execute the access. If the decoded command field instructed reading access to the operation control register section, the control section instructs the designated coprocessor section to execute the reading access to the operation control register section in the coprocessor section.

In accordance with 32nd, 33rd, 34th and 35th aspects of the present invention, in the 26th, 27th, 30th and 31st aspects, in the execution of the writing access to the memory core section, the memory section receives write data which has been included in the write data packet which the control section received from the packet-type memory/coprocessor bus via the interface section, and writes the write data into the memory core section using a memory address which is designated by the parameter field of the request packet.

In accordance with 36th, 37th, 38th and 39th aspects of the present invention, in the 26th, 27th, 30th and 31st aspects, in the execution of the writing access to the memory control register section, the memory section receives write data which has been included in the write data packet which the control section received from the packet-type memory/ coprocessor bus via the interface section, and writes the write data into the memory control register which is designated by the parameter field of the request packet.

In accordance with 40th, 41st, 42nd and 43rd aspects of the present invention, in the 26th, 27th, 30th and 31st aspects, in the execution of the writing access to the memory control register section, the memory section receives write data which has been included in part of the parameter field of the request packet from the control section, and writes the write data into the memory control register which is designated by part of the parameter field of the request packet.

In accordance with 44th, 45th, 46th and 47th aspects of the present invention, in the 26th, 27th, 30th and 31st aspects, in the execution of the reading access to the memory core section or the memory control register section, the memory section reads data out of the memory core section or the memory control register section according to the designation by the parameter field in the request packet and supplies the data to the control section, and the control section assembles the read data packet including the data, and the interface section transmits the read data packet to the packet-type memory/coprocessor bus via the external I/O terminal.

In accordance with 48th, 49th, 50th and 51st aspects of the present invention, in the 28th, 29th, 30th and 31st aspects, in the execution of the writing access to the operation control register section, the coprocessor section receives write data which has been included in the write data packet which the control section received from the packet-type memory/ coprocessor bus via the interface section, and writes the write data into the operation control register which is designated by the parameter field of the request packet.

In accordance with 52nd, 53rd, 54th and 55th aspects of the present invention, in the 28th, 29th, 30th and 31st aspects, in the execution of the writing access to the operation control register section, the coprocessor section receives write data which has been included in part of the parameter field of the request packet from the control section, and writes the write data into the operation control register which is designated by part of the parameter field of the request packet.

In accordance with 56th, 57th, 58th and 59th aspects of the present invention, in the 28th, 29th, 30th and 31st aspects, in the execution of the reading access to the operation control register section, the coprocessor section reads data out of the operation control register which is designated by the parameter field of the request packet and supplies the data to the control section, and the control section assembles the read data packet including the data, and the interface section transmits the read data packet to the packet-type memory/coprocessor bus via the external I/O terminal.

In accordance with a 60th aspect of the present invention, in the 31st aspect, in the reading access to the memory core section, the memory control register section or the operation control register section, the coprocessor-integrated packet-type memory LSI transmits the read data packet to the packet-type memory/coprocessor bus with predetermined bus timing after the reception of the request packet, and in the writing access to the operation control register section, the coprocessor-integrated packet-type memory LSI transmits the acknowledge packet to the packet-type memory/ coprocessor bus with the same predetermined bus timing after the reception of the request packet.

In accordance with 61st, 62nd, 63rd and 64th aspects of the present invention, in the 28th, 29th, 30th and 31st aspects, an operation start register is provided in the operation control register section so that the coprocessor section can refer to the operation start register when the coprocessor section starts execution of an arithmetic logic operation. In the case where writing access to the operation start register is designated by the command field and the parameter field in the request packet, write data included in the parameter field of the request packet or write data included in the write data packet is used as a program pointer indicating an address of the first instruction in an arithmetic logic operation program to be executed, and the coprocessor section starts the execution of the arithmetic logic operation using the program pointer when the program pointer is written into the operation start register.

In accordance with 65th, 66th, 67th and 68th aspects of the present invention, in the 61st, 62nd, 63rd and 64th aspects, in the case where writing access to the operation start register is designated by the request packet, information indicating whether the coprocessor section can execute the designated arithmetic logic operation or not is transmitted as the acknowledge packet to the packet-type memory/ coprocessor bus and the arithmetic logic operation is executed by the coprocessor section only when the execution of the designated arithmetic logic operation by the coprocessor section is possible.

In accordance with 69th, 70th, 71st and 72nd aspects of the present invention, in the 56th, 57th, 58th and 59th aspects, an operation result register is provided as one of the operation control registers so that the coprocessor section can write the result of an arithmetic logic operation into the operation result register. In the case where reading access to the operation result register is designated by the command field and the parameter field in the request packet, data stored in the operation result register is read out and assembled as the read data packet and the read data packet is transmitted to the packet-type memory/coprocessor bus.

In accordance with 73rd, 74th, 75th and 76th aspects of the present invention, in the 69th, 70th, 71st and 72nd aspects, in the case where reading access to the operation result register is designated by the request packet, information indicating whether the result of the arithmetic logic operation has already been written in the designated operation result register or not is transmitted as the acknowledge packet to the packet-type memory/coprocessor bus and the reading access to the operation result register is executed only when the result of the arithmetic logic operation has already been written in the operation result register.

In accordance with 77th, 78th, 79th and 80th aspects of the present invention, in the 69th, 70th, 71st and 72nd aspects, in the case where reading access to the operation result register is designated by the request packet, information indicating whether the result of the arithmetic logic operation has already been written in the designated operation result register or not is transmitted included in the read data packet to the packet-type memory/coprocessor bus.

In accordance with 81st, 82nd, 83rd and 84th aspects of the present invention, in the 61st, 62nd, 63rd and 64th aspects, the coprocessor section starts the execution of the arithmetic logic operation according to the writing access to the operation start register, after parameters which are needed by the coprocessor section for executing the arithmetic logic operation have been written into a desired number of the operation control registers by means of the writing access to the operation control registers. Then, the coprocessor section carries out the arithmetic logic operation referring to the parameters stored in the operation control registers.

In accordance with 85th, 86th, 87th and 88th aspects of the present invention, in the 69th, 70th, 71st and 72nd aspects, a desired number of the operation control registers are also used for storing part of the result of the arithmetic logic operation when the result can not be accommodated in the operation result register. The result of the arithmetic logic operation is read out from the coprocessor section by means of reading access to the operation control registers after part of the result is successfully read out by means of the reading access to the operation result register.

In accordance with 89th, 90th, 91st and 92nd aspects of the present invention, in the 56th, 57th, 58th and 59th aspects, a desired number of the operation control registers are used for storing intermediate data which are generated during execution of an arithmetic logic operation by the coprocessor section. In the case where reading access to one of the operation control registers storing the intermediate data is designated by the command field and the parameter field in the request packet, the intermediate data stored in the operation control register is read out and assembled as the read data packet and the read data packet is transmitted to the packet-type memory/coprocessor bus.

In accordance with a 93rd aspect of the present invention, in the 21st aspect, the coprocessor-integrated packet-type memory LSI is provided with an external select-in terminal and an external select-out terminal and each of the memory section and the coprocessor sections is provided with an internal select-in terminal and an internal select-out terminal. A memory section/coprocessor section chain is formed by connecting the internal select-out terminals with corresponding internal select-in terminals and connecting all of the memory section and the coprocessor sections into a chain. The external select-in terminal of the coprocessor-integrated packet-type memory LSI is connected to the internal select-in terminal of the first block of the memory section/coprocessor section chain. And the internal select-out terminal of the final block of the memory section/coprocessor section chain is connected to the external select-out terminal of the coprocessor-integrated packet-type memory LSI.

In accordance with a 94th aspect of the present invention, there is provided a method for controlling the coprocessor-integrated packet-type memory LSI of the 93rd aspect. In the method, as an initialization process, the memory device ID and the coprocessor device IDs of the memory section and the coprocessor sections in the coprocessor-integrated packet-type memory LSI are set at a predetermined initial value and all of the internal select-out terminals of the memory section and the coprocessor sections are set at the logical value '0'. After the initialization process, each of the memory section and the coprocessor sections whose memory device ID and the coprocessor device IDs have been set at the initial value ignores writing access thereto and keeps on outputting the logical value '0' from its internal select-out terminal as long as the logical values '0' is supplied to its internal select-in terminal. Each of the memory section and the coprocessor sections accepts the writing access thereto and outputs the logical value '1' from its internal select-out terminal as long as the logical value '1' is supplied to its internal select-in terminal, and thereby the memory device ID or the coprocessor device ID designated by the parameter field of the request packet is written into the memory device ID register or the coprocessor device ID register thereof according to the writing access thereto.

In accordance with 95th and 96th aspects of the present invention, in the 4th and 5th aspects, a coprocessor-integrated packet-type memory LSI chain is formed by connecting a desired number of the coprocessor-integrated packet-type memory LSIs of the 93rd aspect into a chain by connecting the external select-out terminals and corresponding external select-in terminals. The bus master is provided with an external select-in terminal and an external select-out terminal. The external select-out terminal of the bus master is connected to the external select-in terminal of the first coprocessor-integrated packet-type memory LSI in the coprocessor-integrated packet-type memory LSI chain, and the external select-out terminal of the final coprocessor-integrated packet-type memory LSI in the coprocessor-integrated packet-type memory LSI chain is connected to the external select-in terminal of the bus master.

In accordance with a 97th aspect of the present invention, there is provided a method for controlling the packet-type memory/coprocessor bus of the 95th or 96th aspect. In the method, as an initialization process, the memory device IDs and the coprocessor device IDs of all of the memory sections and the coprocessor sections in all of the coprocessor-integrated packet-type memory LSI connected to the packet-type memory/coprocessor bus are set at a predetermined initial value and all of the internal select-out terminals of the memory sections and the coprocessor sections are set at the logical value '0'. After the initialization process, the bus master varies the logical value of its external select-out terminal from '0' to '1' and transmits a request packet designating the initial value in the device ID field of the request packet and designating a new memory device ID or a new coprocessor device ID in the parameter field of the request packet, thereby the new memory device ID or the new coprocessor device ID is assigned to the first block in the memory section/coprocessor section chain in the first coprocessor-integrated packet-type memory LSI in the coprocessor-integrated packet-type memory LSI chain. After this, the bus master repeats transmitting request packets designating the initial value in the device ID field of the request packet and designating a new memory device ID or a new coprocessor device ID in the parameter field of the request packet, thereby specific and unique memory device IDs and coprocessor device IDs are assigned to the memory sections and the coprocessor sections in the coprocessor-integrated packet-type memory LSI chain one after another according to the transmission of the logical value '1' through the blocks in the coprocessor-integrated packet-type memory LSI chain.

In accordance with a 98th aspect of the present invention, in the 2nd aspect, the memory section includes a device definition register as one of the memory control registers, for prestoring device definition information to be used for discriminating between a memory section and a coprocessor section, and each of the coprocessor sections includes a device definition register as one of the operation control registers, for prestoring device definition information to be used for discriminating between a memory section and a coprocessor section.

In accordance with a 99th aspect of the present invention, there is provided a method for controlling the coprocessor-integrated packet-type memory LSI of the 98th aspect. In the method, the bus master checks whether a particular device ID has been assigned to a memory section or a coprocessor section, by obtaining the device definition information by executing reading access designating the particular device ID to the device definition register in the memory control register section or the operation control register section.

In accordance with a 100th aspect of the present invention, in the 99th aspect, request packets which are the same except for designation of the device ID field are used by the bus master for the reading accesses to the device definition registers, regardless of whether the destination of the reading access is in a memory section or in a coprocessor section.

In accordance with a 101st aspect of the present invention, in the 2nd aspect, the operation control register section includes a function definition register as one of the operation control registers. The function definition register prestores function definition code which classifies the arithmetic logic operation functions of the coprocessor section.

In accordance with a 102nd aspect of the present invention, there is provided a method for controlling the coprocessor-integrated packet-type memory LSI of the 101st aspect. In the method, the bus master checks arithmetic logic operation functions of a coprocessor section which corresponds to a particular device ID, by obtaining the function definition code by executing reading access designating the particular device ID to the function definition register in the operation control register section.

BRIEF DESCRIPTION OF THE DRAWINGS

The objects and features of the present invention will become more apparent from the consideration of the following detailed description taken in conjunction with the accompanying drawings, in which:

FIG. 2A through FIG. 2C are block diagrams showing examples of connections between the conventional packet-type DRAM of FIG. 1 and a microprocessor via a conventional packet-type memory bus;

FIG. 3 is a classification table showing process requests which are requested to the packet-type DRAM of FIG. 1;

FIG. 4A and FIG. 4B are schematic diagrams showing classification of packets transmitted on the conventional packet-type memory bus;

FIG. 9A through FIG. 9C are block diagrams showing examples of connections between the coprocessor-integrated packet-type DRAM of FIG. 8 and a microprocessor 9 via a packet-type memory/coprocessor bus according to the present invention;

FIGS. 10A and 10B are schematic diagrams showing classification of packets transmitted on the packet-type memory/coprocessor bus according to the present invention;

FIG. 12 is a classification table showing process requests which are requested by the request packets to the coprocessor-integrated packet-type DRAM according to the present invention;

FIG. 14 is a block diagram showing composition of a memory/coprocessor device ID verification circuit according to an embodiment of the present invention;

FIG. 16 is a flow chart showing another example of access request operation of the coprocessor-integrated packet-type DRAM;

FIG. 17 is a classification table showing concrete functions of the coprocessor access to the coprocessor section in the coprocessor-integrated packet-type DRAM according to the present invention;

FIG. 18 is a block diagram showing an example of composition of a coprocessor section according to the present invention;

DESCRIPTION OF THE PREFERRED EMBODIMENTS

Figure 1:
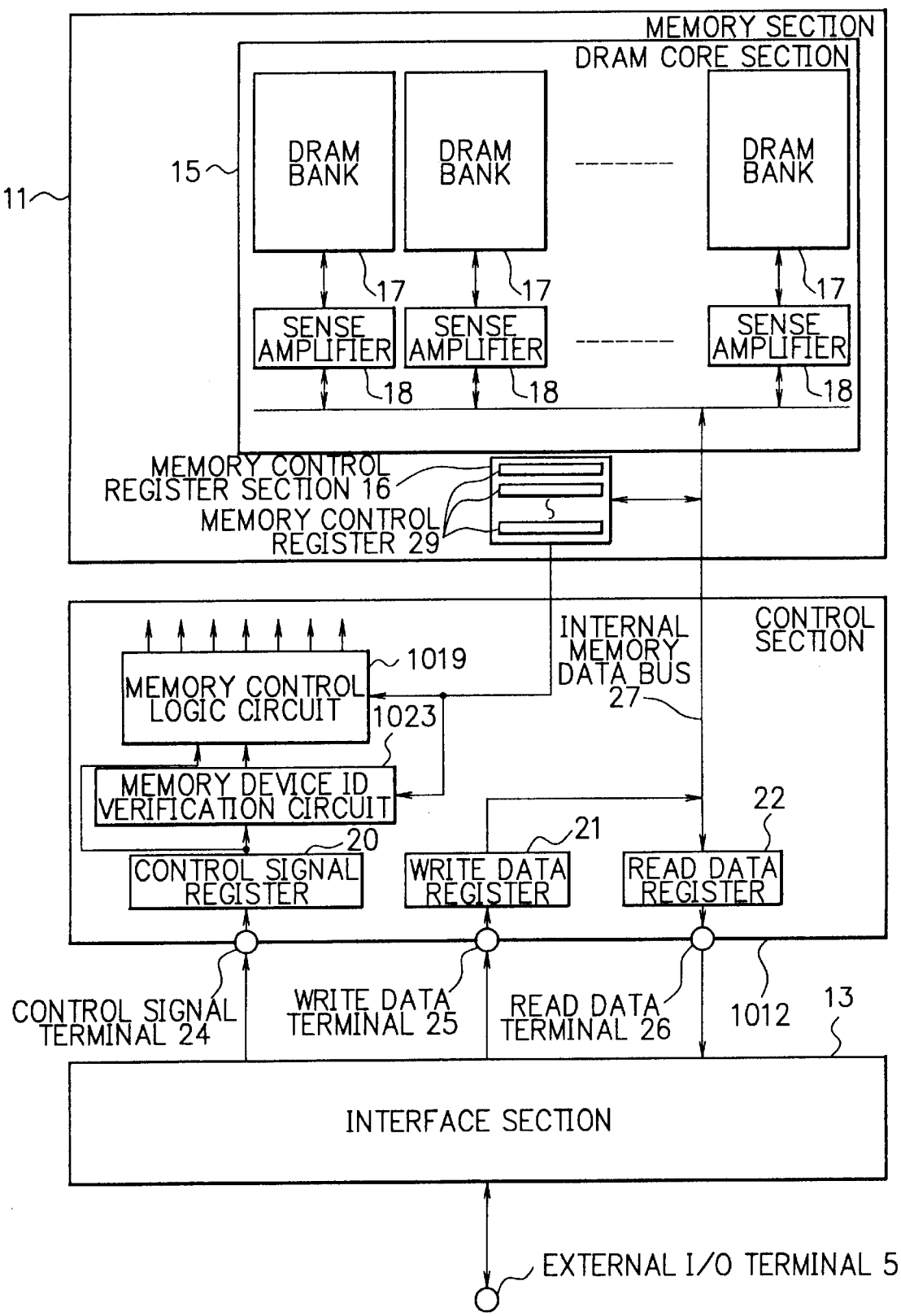
FIG. 1 is a block diagram showing an example of composition of a conventional packet-type DRAM.
Figure 2A:
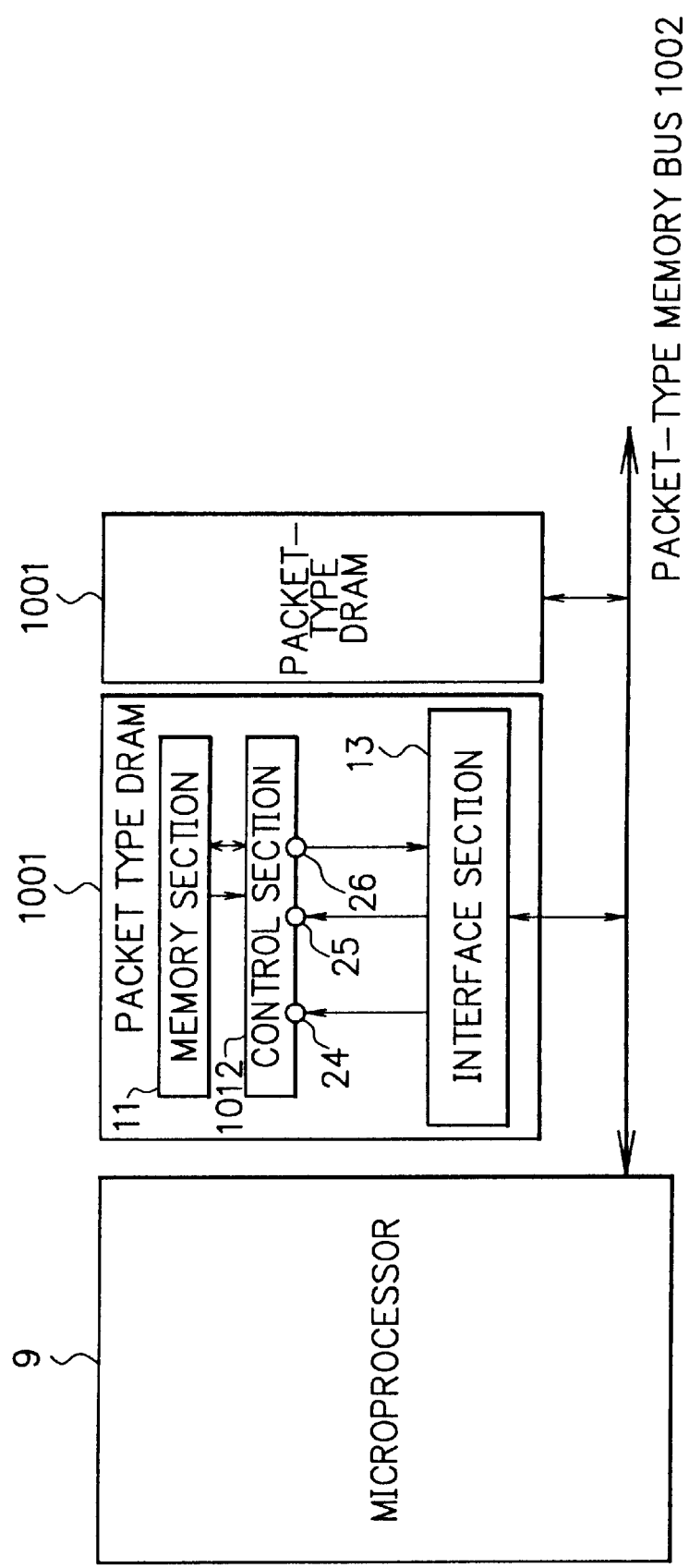
Figure 2B:
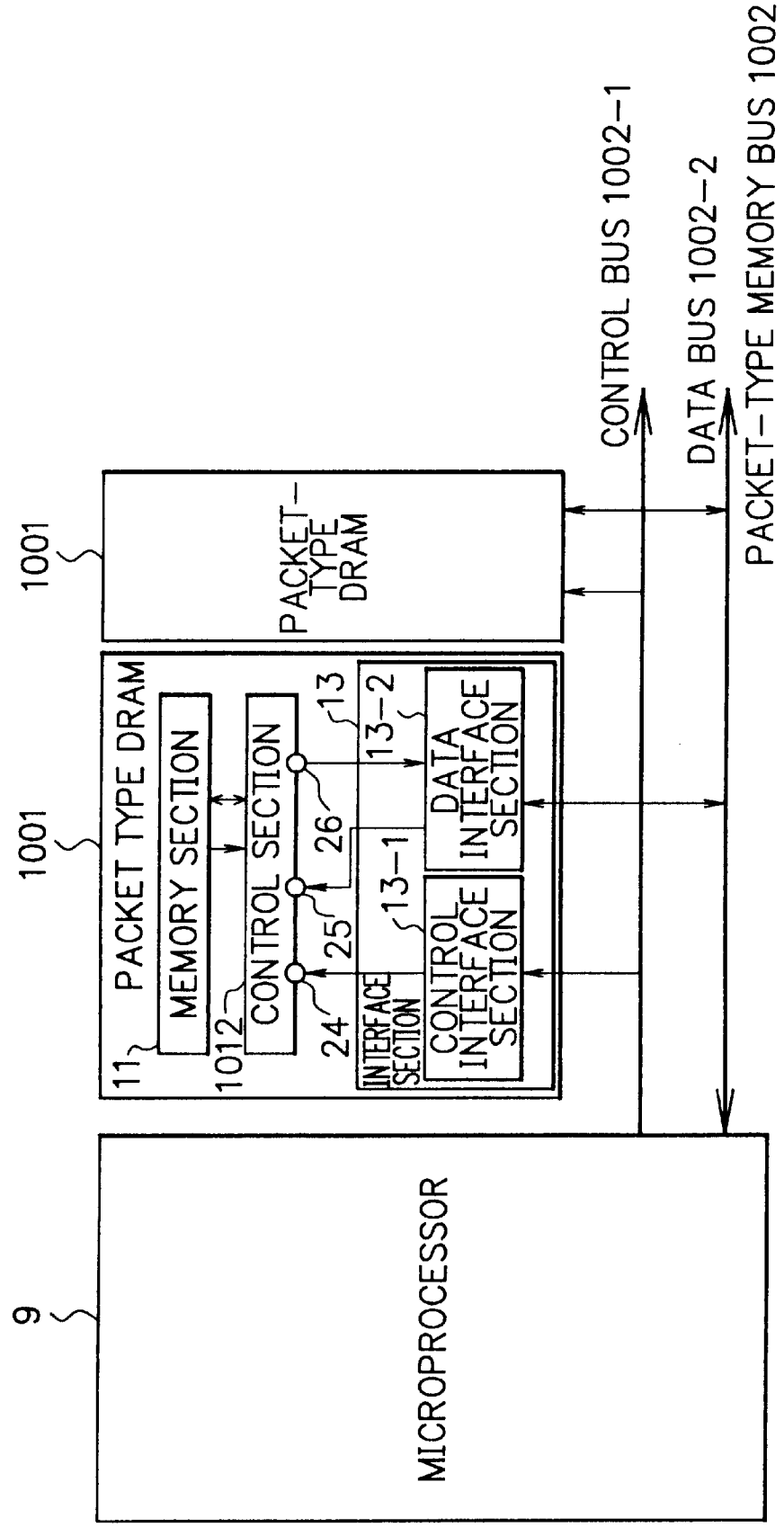
Figure 5A:
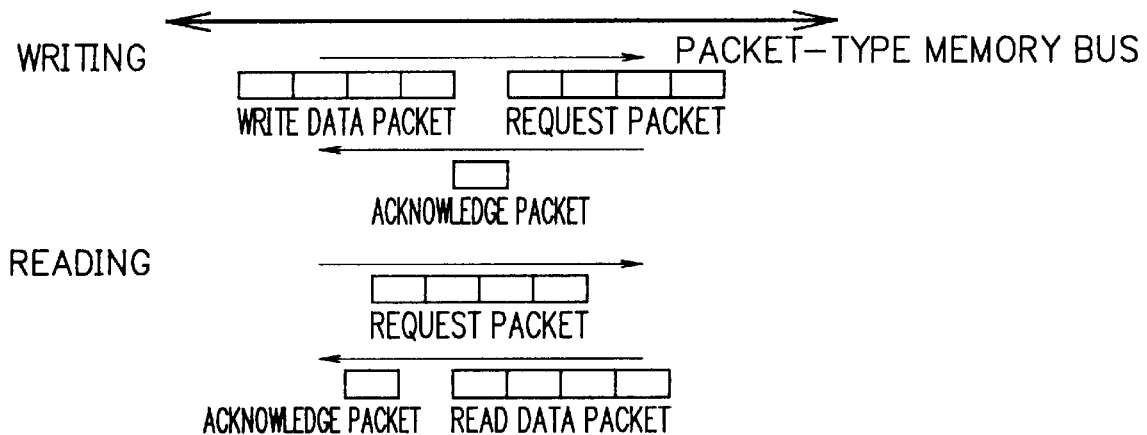
FIG. 5A through FIG. 5C are schematic diagrams showing transmission of packets on the packet-type memory bus in each composition of FIG. 2A through FIG. 2C.
Figure 5B:
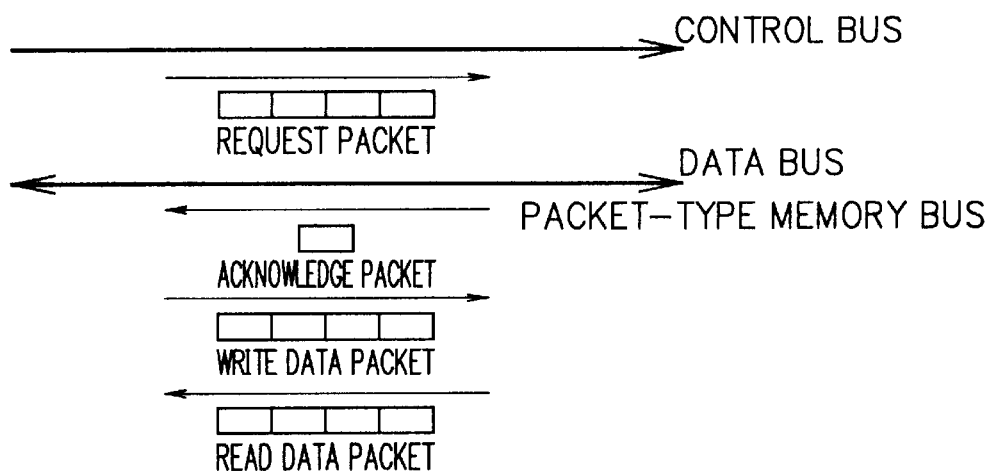
Figure 5C:
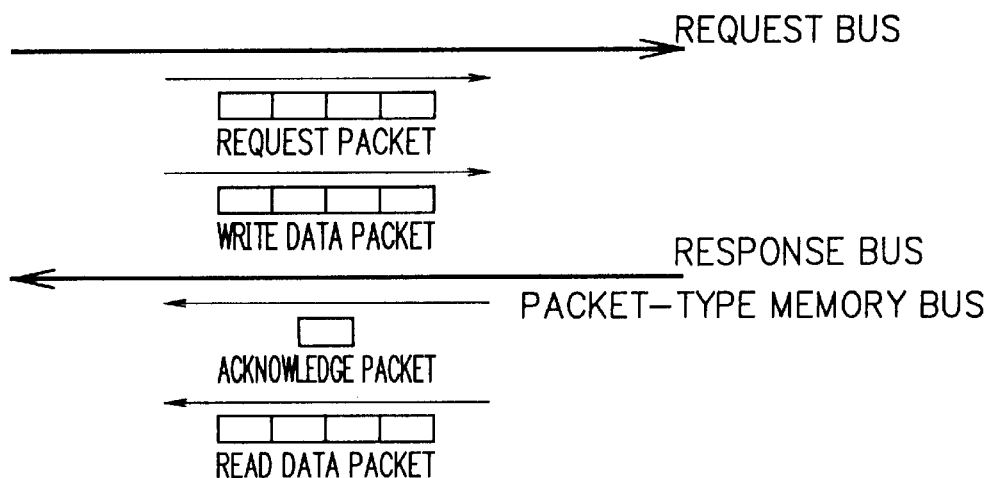
Figure 6A:
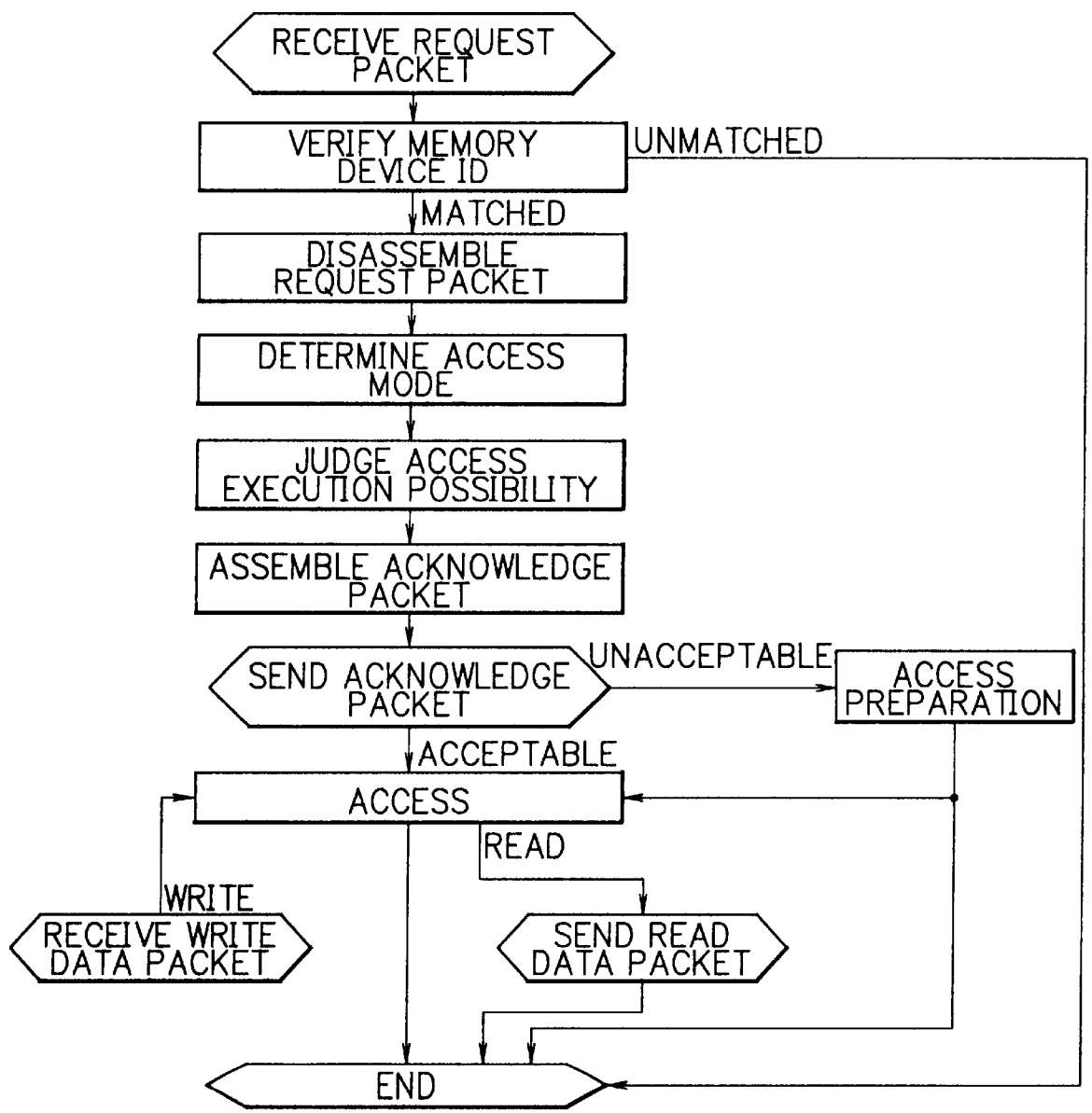
FIG. 6A and FIG. 6B are flow charts showing the operation of the packet-type DRAM when a request packet is received.
Figure 6B:
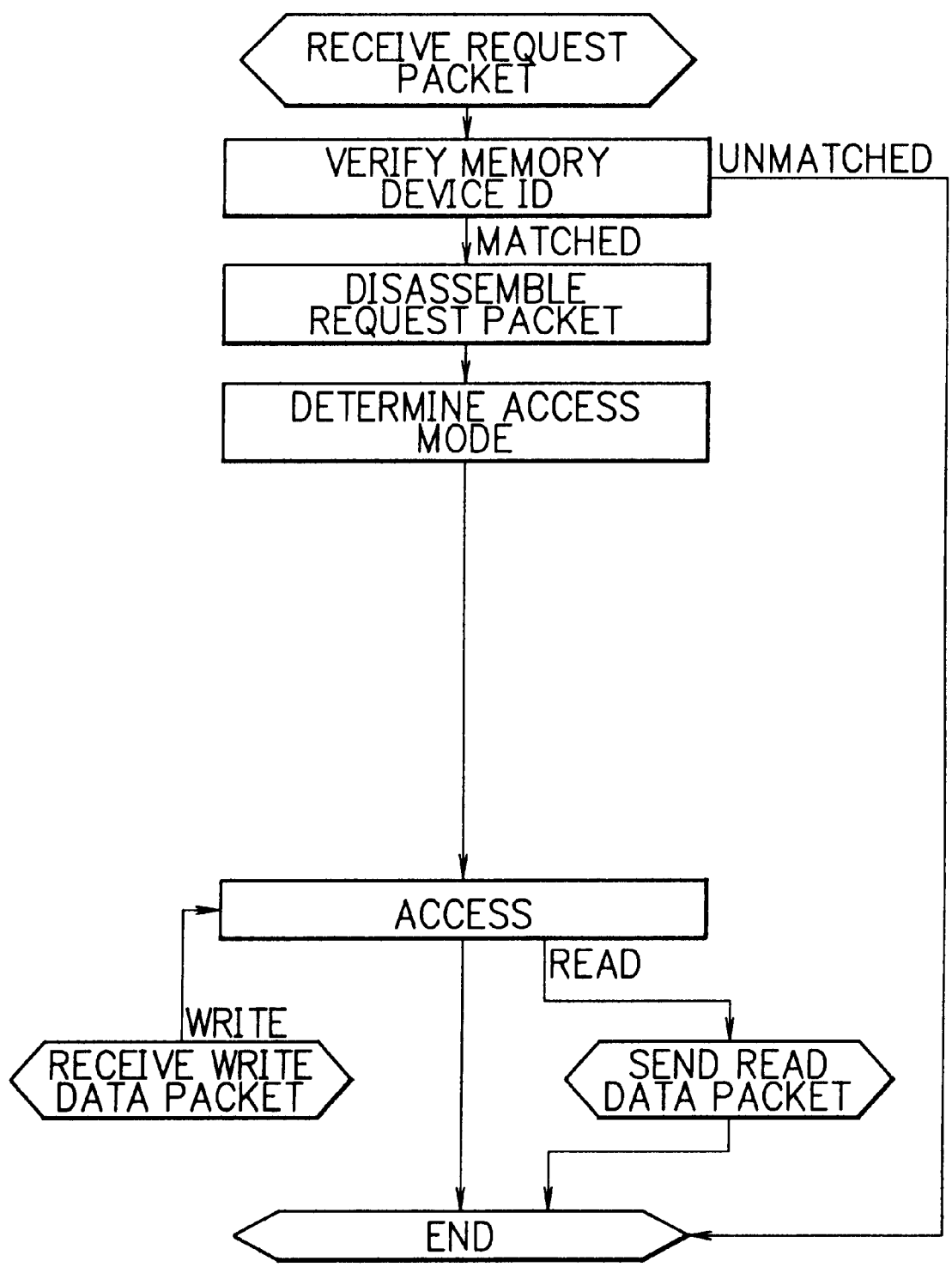
Figure 7A:
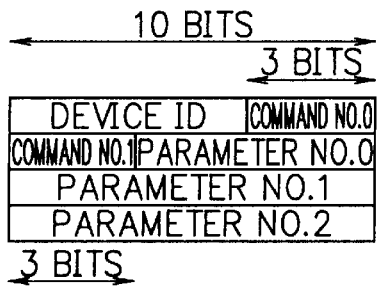
FIG. 7A through FIG. 7E are schematic diagrams showing typical packet formats of each packet, taking the technique of the SLDRAM Consortium as an example.
Figure 7B:
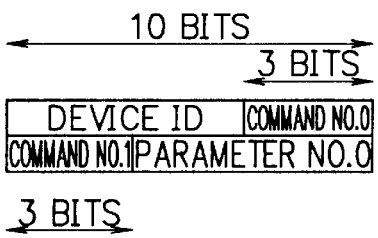
Figure 7C:
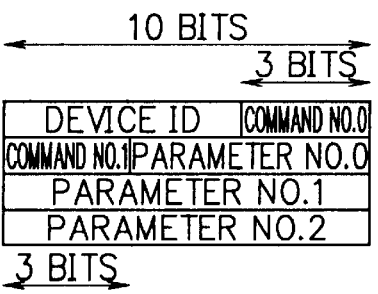
Figure 7D:
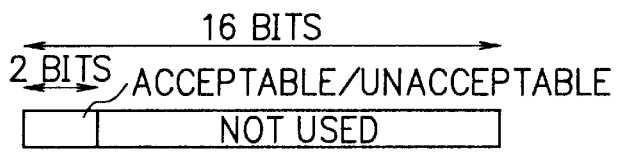
Figure 7E:
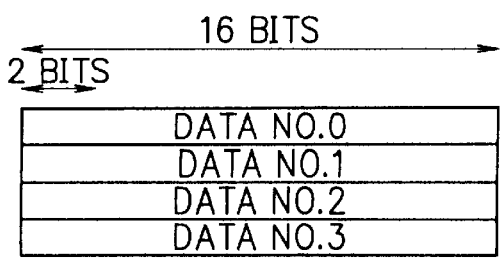

Referring now to the drawings, a description will be given in detail of preferred embodiments in accordance with the present invention.

COPROCESSOR-INTEGRATED PACKET-TYPE DRAM

Figure 8:
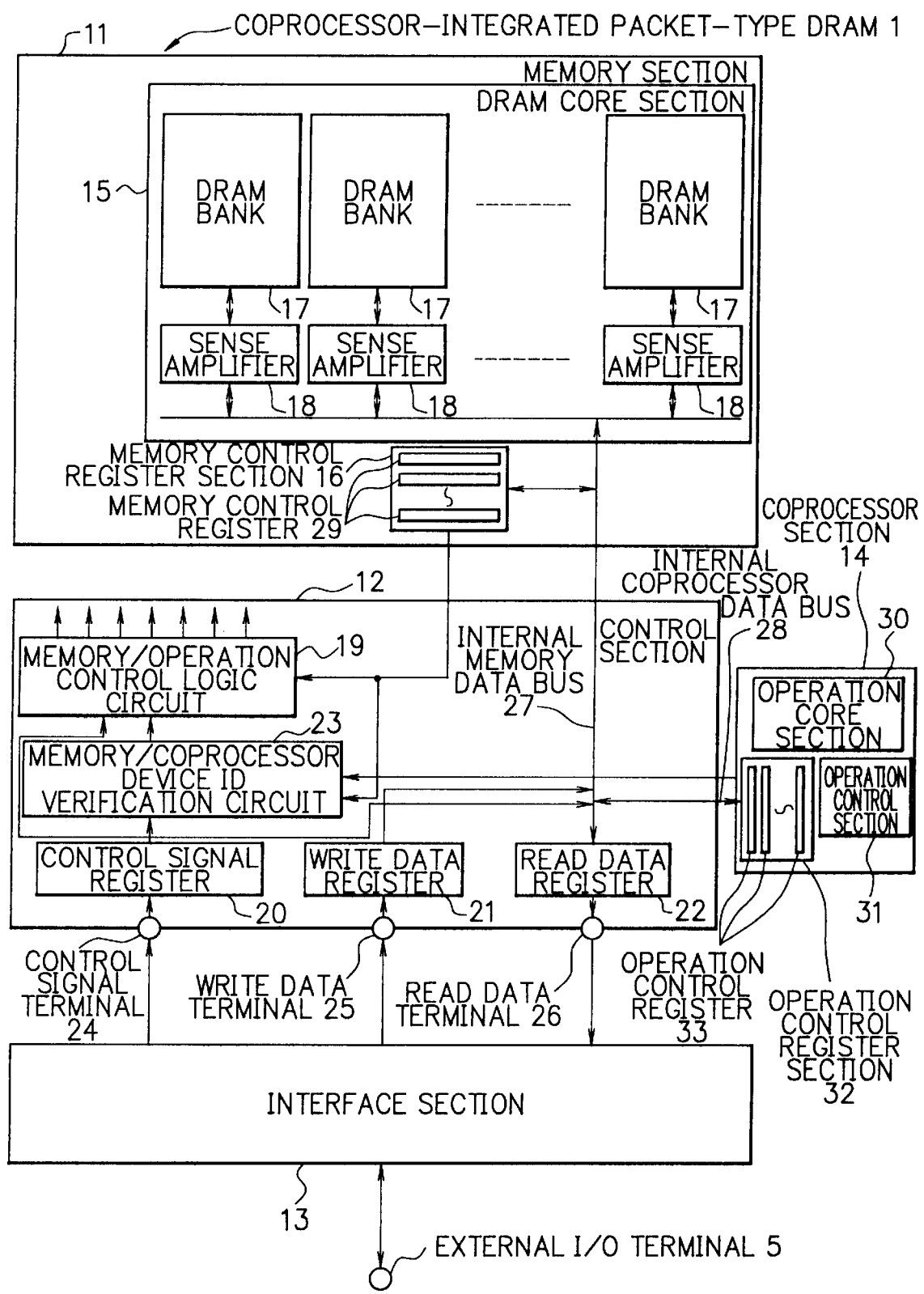
FIG. 8 is a block diagram showing a coprocessor-integrated packet-type DRAM according to an embodiment of the present invention.

FIG. 8 is a block diagram showing a coprocessor-integrated packet-type DRAM 1 according to an embodiment of the present invention.

The coprocessor-integrated packet-type DRAM 1 of FIG. 8 comprises a memory section 11, a control section 12, an interface section 13, and a coprocessor section 14.

The memory section 11 includes a DRAM core section 15 and a memory control register section 16. The DRAM core section 15 includes a plurality of DRAM banks 17 and a plurality of sense amplifiers 18 which are provided corresponding to each of the DRAM banks 17, and the memory control register section 16 includes a plurality of memory control registers 29.

The control section 12 includes a memory/operation control logic circuit 19, a control signal register 20, a write data register 21, a read data register 22, and a memory/coprocessor device ID verification circuit 23. The control section 12 is provided with three I/O signal terminals to be connected with the interface section 13. The I/O signal terminals of the control section 12 include a control signal terminal 24 and a write data terminal 25 (input terminals) and a read data terminal 26 (output terminal).

The interface section 13 is connected with an external I/O terminal 5 which is composed of a plurality of signal terminals. The memory section 11 and the control section 12 are connected together by an internal memory data bus 27 which is a bidirectional bus.

The coprocessor section 14 includes an operation core section 30, an operation control section 31, and an operation control register section 32. The operation control register section 32 includes a plurality of operation control registers 33. The coprocessor section 14 is connected with the control section 12 via an internal coprocessor data bus 28 which is a bidirectional bus.

Incidentally, the number of the coprocessor sections 14 which are built in the coprocessor-integrated packet-type DRAM 1 is not limited to one, and can be any desired number including 0 in the present invention. However, FIG. 8 is showing a case where one coprocessor section 14 is built in the coprocessor-integrated packet-type DRAM 1 for brevity.

In FIG. 8, the memory control register section 16 in the memory section 11 and the operation control register section 32 in the coprocessor section 14 are connected to the memory/coprocessor device ID verification circuit 23 in the control section 12, for judging whether a process request which the external I/O terminal 5 received is a request sent to the memory section 11 or a request sent to the coprocessor section 14, as will be described below. The memory section 11 is provided with a specific memory device ID, and the coprocessor section 14 is provided with a specific coprocessor device ID. The memory device ID of the memory section 11 is stored in specific one of the memory control registers 29 in the memory control register section 16, and the coprocessor device ID of the coprocessor section 14 is stored in specific one of the operation control registers 33 in the operation control register section 32. The above judgment is executed by the memory/coprocessor device ID verification circuit 23 by verifying a designated device ID which has been supplied via the external I/O terminal 5 and the control signal register 20 against the memory device ID of the memory section 11 which is stored in the memory control register section 16 and the coprocessor device ID of the coprocessor section 14 which is stored in the operation control register section 32.

PACKET-TYPE MEMORY/COPROCESSOR BUS

Figure 9B:
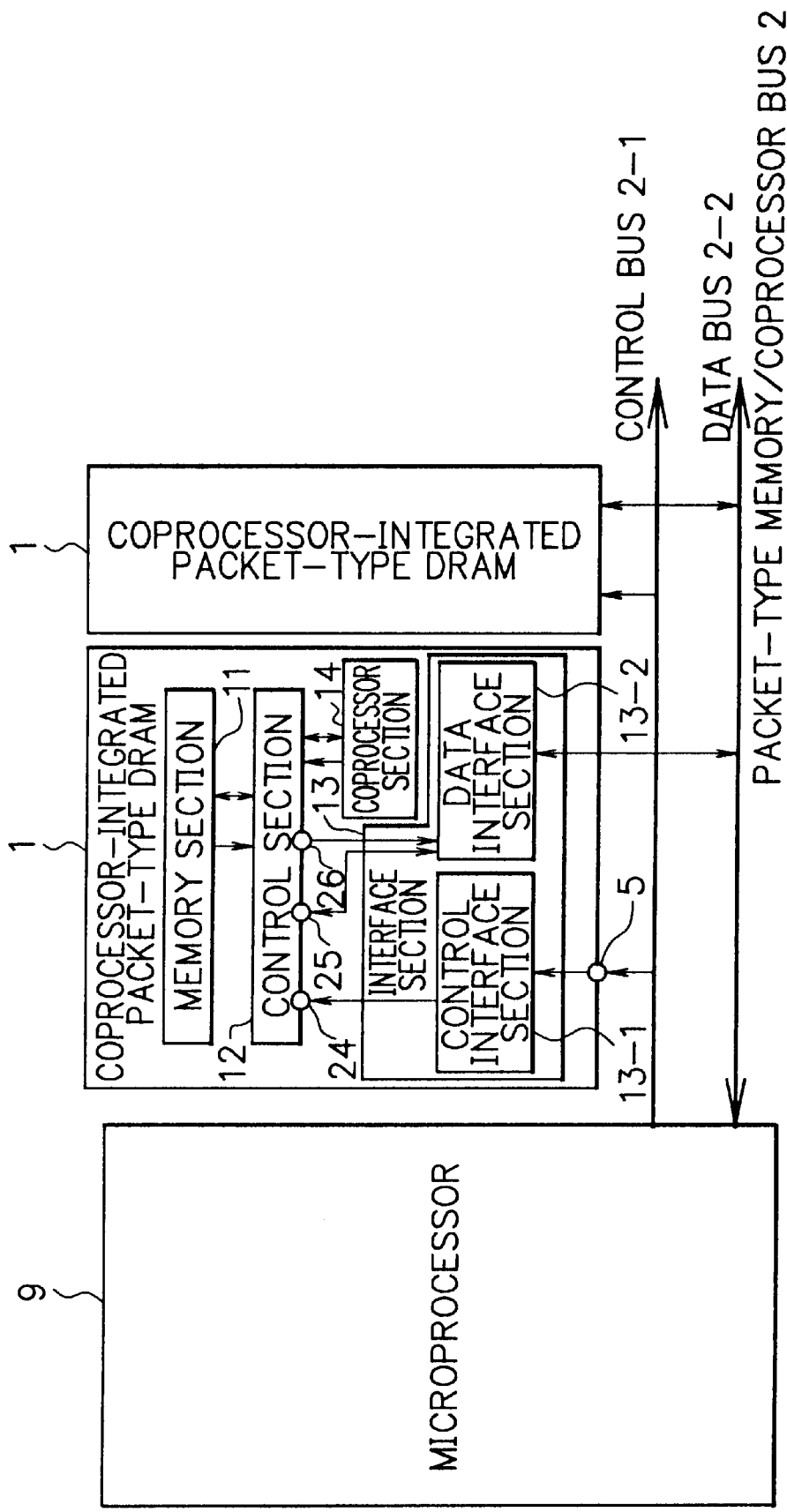

FIG. 9A through FIG. 9C are block diagrams showing examples of connections between the coprocessor-integrated packet-type DRAM 1 and a microprocessor 9 via a packet-type memory/coprocessor bus 2 according to the present invention. In FIG. 9A through FIG. 9C, three embodiments with three types of interface sections 13 in the coprocessor-integrated packet-type DRAM 1 and corresponding three types of packet-type memory/coprocessor buses 2 are shown. Incidentally, the packet-type memory/coprocessor bus 2 according to the present invention is a single bus master type bus and only one bus master is allowed to exist on the packet-type memory/coprocessor bus 2, and all of the coprocessor-integrated packet-type DRAMs 1 connected to the packet-type memory/coprocessor bus 2 operate as slave devices. As mentioned before, the word 'bus master' generally means a device which can exclusively control a bus and send requests to the bus, and the word 'slave device' generally means a device which does not spontaneously send requests to the bus but only responds to the request from the bus master. By allowing only one bus master on the bus and providing other devices on the bus as slave devices, the bus master can send a request without the arbitration for the bus exclusive ownership of the packet-type memory/coprocessor bus 2, thereby the protocols for the packet-type memory/coprocessor bus 2 can be simplified. Incidentally, although the microprocessor 9 is provided as the bus master of the packet-type memory/coprocessor bus 2 in FIG. 9A through FIG. 9C, other type of a bus master can be provided to the packet-type memory/coprocessor bus 2, such as a memory controller, a signal processor, a graphics accelerator, an ASIC of other type, etc.

In the composition of FIG. 9A, in the same way as FIG. 8, the coprocessor-integrated packet-type DRAM 1 of FIG. 9A is composed of a memory section 11, a control section 12, an interface section 13 and a coprocessor section 14. All of the I/O terminals of the control section 12, i.e. the control signal terminal 24, the write data terminal 25 and the read data terminal 26, are connected to the interface section 13. The interface section 13 is connected to the packet-type memory/coprocessor bus 2 via the external I/O terminal 5. The packet-type memory/coprocessor bus 2 connects the microprocessor 9 and a plurality of coprocessor-integrated packet-type DRAMs 1. The packet-type memory/coprocessor bus 2 in FIG. 9A is a bidirectional bus which includes a desired number of signal lines.

In the composition of FIG. 9B, the interface section 13 is composed of a control interface section 13-1 and a data interface section 13-2. The control signal terminal 24 of the control section 12 is connected to the control interface section 13-1, and the write data terminal 25 and the read data terminal 26 of the control section 12 are connected to the data interface section 13-2. The packet-type memory/coprocessor bus 2 of FIG. 9B is composed of a control bus 2-1 and a data bus 2-2 each of which including a desired number of signal lines. The control interface section 13-1 is connected to the control bus 2-1, and the data interface section 13-2 is connected to the data bus 2-2, via external I/O terminals 5. In FIG. 9B, the control bus 2-1 is a unidirectional bus from the microprocessor 9 to the coprocessor-integrated packet-type DRAMs 1, and the data bus 2-2 is a bidirectional bus.

In the composition of FIG. 9C, the interface section 13 is composed of a request interface section 13-3 and a response interface section 13-4. The control signal terminal 24 and the write data terminal 25 of the control section 12 are connected to the request interface section 13-3, and the read data terminal 26 of the control section 12 is connected to the response interface section 13-4. The packet-type memory/coprocessor bus 2 of FIG. 9C is composed of a request bus 2-3 and a response bus 2-4. The request interface section 13-3 is connected to the request bus 2-3, and the response interface section 13-4 is connected to the response bus 2-4, via external I/O terminals 5. In FIG. 9C, the request bus 2-3 is a unidirectional bus from the microprocessor 9 to the coprocessor-integrated packet-type DRAMs 1, and the response bus 2-4 is a unidirectional bus in the reverse direction.

MEMORY DEVICE ID & COPROCESSOR DEVICE ID

In every coprocessor-integrated packet-type DRAM 1 which is connected to the packet-type memory/coprocessor bus 2 according to the present invention, every memory section 11 is provided with a specific memory device ID, and every coprocessor section 14 is provided with a specific coprocessor device ID. In embodiments according to the present invention, the memory device IDs and the coprocessor device IDs are assigned to the memory sections 11 and the coprocessor sections 14 so that each ID will be specific to the device and unique in the packet-type memory/coprocessor bus 2, by assigning different numbers etc. Due to such assignment, one memory section 11 (or one coprocessor section 14) can be determined out of a plurality of memory sections 11 and coprocessor sections 14 in all the coprocessor-integrated packet-type DRAM 1 which are connected to the packet-type memory/coprocessor bus 2, by designating a memory device ID (or a coprocessor device ID).

One of the objects of the packet-type memory/coprocessor bus 2 of the present invention was to reduce the number of signal lines composing the packet-type memory/coprocessor bus 2, to the extent of the number of signal lines composing the conventional packet-type memory bus 1002. Therefore, the packet-type memory/coprocessor bus 2 according to the present invention is characterized by the small number of the signal lines composing the packet-type memory/coprocessor bus 2. Concretely, the number of the signal lines in the packet-type memory/coprocessor bus 2 is approximately 10 to 30. As mentioned before, in order to transmit necessary information between the microprocessor 9 (the bus master) and the coprocessor-integrated packet-type DRAMs 1 via such a small number of signal lines, a system for assembling the information into packets and sending and receiving the packets during some cycles is needed to be provided, and for assembling and disassembling such packets, some fixed protocols have to be established.

PACKET TYPES

FIGS. 10A and 10B are schematic diagrams showing classification of packets transmitted on the packet-type memory/coprocessor bus 2 according to the present invention. Two kinds of packets shown in FIG. 10A, i.e. the request packet and the write data packet, are transmitted from the microprocessor 9 to the coprocessor-integrated packet-type DRAM 1. The request packet is a variable length packet which is generated by encoding an instruction concerning a process request to one of the coprocessor-integrated packet-type DRAMs 1 according to predetermined protocols. The write data packet includes write data whose size is variable. Meanwhile, two kinds of packets shown in FIG. 10B, i.e. the read data packet and the acknowledge packet, are transmitted from the coprocessor-integrated packet-type DRAM 1. The read data packet includes read data whose size is variable. The acknowledge packet is generally a fixed length packet. The acknowledge packet is necessary in some embodiments and unnecessary in other embodiments, as will be described later.

PACKET TRANSMISSION

Figure 11A:
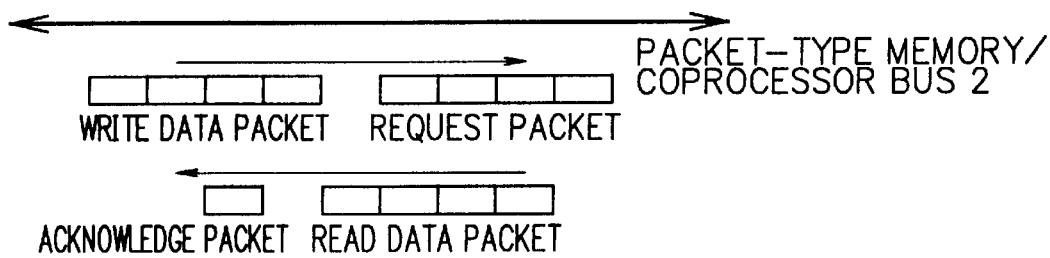
FIG. 11A through FIG. 11C are schematic diagrams showing transmission of packets on the packet-type memory/coprocessor bus in each embodiment of FIG. 9A through FIG. 9C.
Figure 11B:
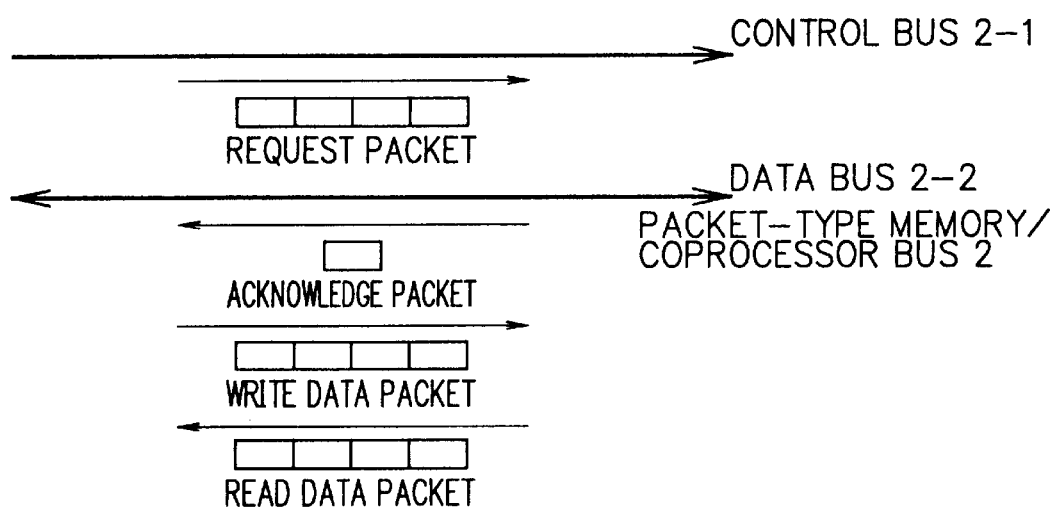
Figure 11C:
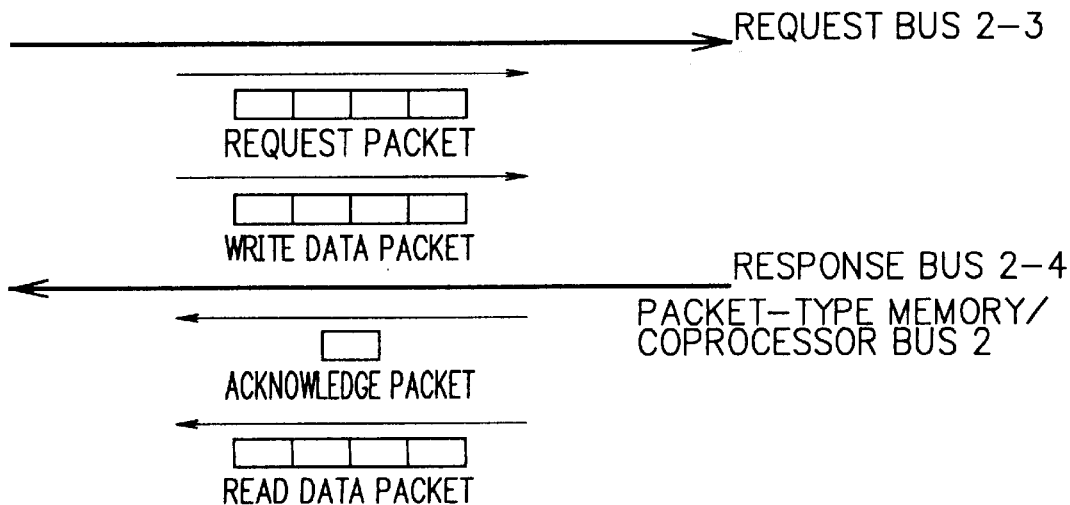

FIG. 11A through FIG. 11C are schematic diagrams showing transmission of packets on the packet-type memory/coprocessor bus 2 in each embodiment of FIG. 9A through FIG. 9C. In FIG. 11A through FIG. 11C, the microprocessor 9 (the bus master) is placed on the left-hand side and the coprocessor-integrated packet-type DRAMs 1 (the slave devices) are placed on the right-hand side in the same way as FIG. 9A through FIG. 9C. FIG. 11A through FIG. 11C correspond to FIG. 9A through FIG. 9C, respectively.

As shown in FIG. 11A, every kind of packets are transmitted on the bidirectional packet-type memory/coprocessor bus 2 in the embodiment of FIG. 9A.

As shown in FIG. 11B, the request packet is transmitted on the control bus 2-1, and the write data packet, the read data packet and the acknowledge packet are transmitted on the data bus 2-2, in the embodiment of FIG. 9B.

As shown in FIG. 11C, the request packet and the write data packet are transmitted on the request bus 2-3, and the read data packet and the acknowledge packet are transmitted on the response bus 2-4, in the embodiment of FIG. 9C.

REQUESTED PROCESSES

FIG. 12 is a classification table showing process requests which are requested by the request packets to the coprocessor-integrated packet-type DRAM 1 according to the present invention. Process types include 'memory access' to the memory section 11, 'coprocessor access' to the coprocessor section 14, 'initialization' and 'refresh'. Each of the processes is requested by the bus master of the packet-type memory/coprocessor bus 2, i.e. the microprocessor 9 in FIG. 9A through FIG. 9C. The 'memory access' process is classified into two types with regard to destinations, ie. a memory access to the DRAM core section 15 in the memory section 11 and a memory access to the memory control register section 16 in the memory section 11. Each of the memory access to the DRAM core section 15 and the memory access to the memory control register section 16 includes two types of operations (commands), i.e. read and write. In the case of the 'coprocessor access', the destination of a request is the operation control register section 32 in the coprocessor section 14, and there are two types of operations (commands), read and write. The 'initialization' includes operations of resetting the internal states of the memory control logic circuit 19, storing specific device information of the coprocessor-integrated packet-type DRAM 1 into the memory control register section 16 and the operation control register section 32, etc. The 'refresh' generally means periodic rewriting to DRAM cells in the DRAM core section 15, for keeping memory in the DRAM cells which is necessary for the operation of the DRAM core section 15. A procedure for a particular initialization will be explained later. Explanation of a concrete procedure for the refresh is omitted since it has little bearing on the purpose of the present invention. The 'initialization' is requested to the memory control register section 16 in the memory section 11 and the operation control register section 32 in the coprocessor section 14, and the 'refresh' is requested to the DRAM core section 15 in the memory section 11. In any cases, the microprocessor 9 (the bus master) is the requester.

PACKET FORMATS

Figure 13A:
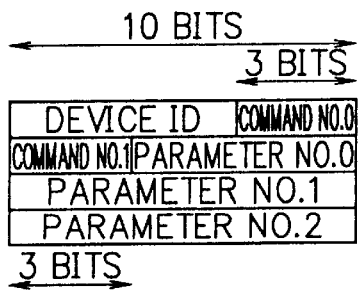
FIG. 13A through FIG. 13F are schematic diagrams showing packet formats of each packet transmitted on the packet-type memory/coprocessor bus according to the present invention.
Figure 13B:
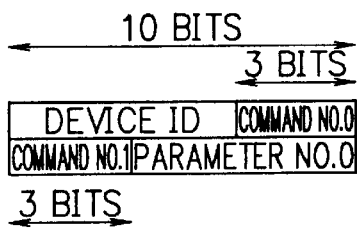
Figure 13C:
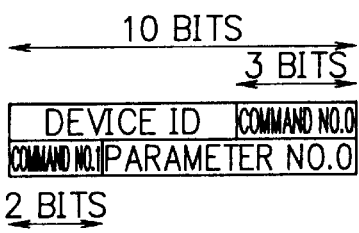
Figure 13D:
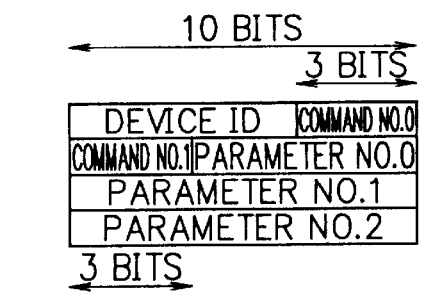
Figure 13E:
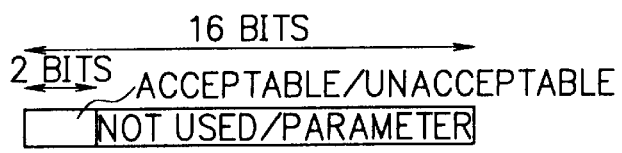
Figure 13F:
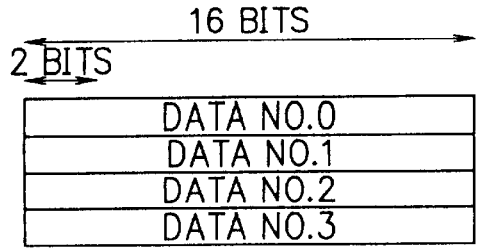

FIG. 13A through FIG. 13F are schematic diagrams showing packet formats of each packet transmitted on the packet-type memory/coprocessor bus 2 according to the present invention. In FIG. 13A through FIG. 13F, cases where the packet-type memory/coprocessor bus 2 of FIG. 9B including the control bus 2-1 and the data bus 2-2 is used are shown. However, such packets can basically be transmitted also on the packet-type memory/coprocessor buses 2 of FIG. 9A and FIG. 9C. Concretely, FIG. 13A through FIG. 13F are showing cases where the numbers of signal lines in the control bus 2-1 and the data bus 2-2 are 10 and 16 respectively. FIG. 13A through FIG. 13D are showing examples of request packets, and FIG. 13E is showing an example of an acknowledge packet, and FIG. 13F is showing an example of a read data packet or a write data packet.

FIG. 13A is showing an example of a packet format of a request packet for requesting writing access or reading access to the DRAM core section 15. The request packet of FIG. 13A occupies the 10-bit control bus 2-1 during four cycles. In the first cycle, the first 7 bits are used as a device ID field for designating the device ID, and the remaining 3 bits are used as a command field for designating a command No.0. In the second cycle, the first 3 bits are used as a command field for designating a command No.1, and the remaining 7 bits are used as a parameter field for designating a parameter No.0. The remaining two cycles are used as parameter fields for designating parameters No.1 and No.2 respectively. Control signal information including the process type, the destination, the operation (command) shown in FIG. 12, the information about the control of the DRAM core section 15, etc., is designated in the command fields for the command No.0 and the command No.1. Addresses of data in the DRAM core section 15 are designated in the parameter fields for the parameter No.0, the parameter No.1 and the parameter No.2.

FIG. 13B is showing an example of a packet format of a request packet for requesting writing access or reading access to the memory control register section 16. The request packet of FIG. 13B occupies the 10-bit control bus 2-1 during two cycles. In the first cycle, the first 7 bits are used as a device ID field for designating the device ID, and the remaining 3 bits are used as a command field for designating a command No.0. In the second cycle, the first 3 bits are used as a command field for designating a command No.1, and the remaining 7 bits are used as a parameter field for designating a parameter No.0.

When writing access or reading access to the operation control register section 32 is requested, the same packet format as FIG. 13B or a packet format in which the field lengths of the command fields (for the commands No.0 and No.1) are different from FIG. 13B can be used. FIG. 13C is showing an example of a packet format of a request packet for requesting writing access or reading access to the operation control register section 32, in the latter case. The request packet of FIG. 13C occupies the 10-bit control bus 2-1 during two cycles. In the first cycle, the first 7 bits are used as a device ID field for designating the device ID, and the remaining 3 bits are used as a command field for designating a command No.0. In the second cycle, the first 2 (not 3) bits are used as a command field for designating a command No.1, and the remaining 8 bits are used as a parameter field for designating a parameter No.0.

FIG. 13D is showing another example of a packet format of a request packet for requesting writing access or reading access to the memory control register section 16 or the operation control register section 32. The request packet of FIG. 13D occupies the 10-bit control bus 2-1 during four cycles. In the first cycle, the first 7 bits are used as a device ID field for designating the device ID, and the remaining 3 bits are used as a command field for designating a command No.0. In the second cycle, the first 3 bits are used as a command field for designating a command No.1, and the remaining 7 bits are used as a parameter field for designating a parameter No.0. The remaining two cycles are used as parameter fields for designating parameters No.1 and No.2 respectively.

In the packet formats shown in FIG. 13A through FIG. 13D, the device ID field is provided to be used for designating one or more memory sections 11 or coprocessor sections 14 out of all the memory sections 11 and the coprocessor sections 14 in all the coprocessor-integrated packet-type DRAMs 1 which are connected to the packet-type memory/coprocessor bus 2, as the destination of the request. The device ID may designate one memory section 11 or coprocessor section 14, or a plurality of memory sections 11 or coprocessor sections 14 at once (multicast), or all of the memory sections 11 and the coprocessor sections 14 at once (broadcast), as the destination of a process request. The command fields (for the commands No.1 and No.2) are used to indicate a concrete process which is requested by the request packet. The processes requested by the request packets will be described in detail later. The parameter fields (for the parameters No.0, No.1 and No.2) are used for designating parameters necessary for the execution of the process which is requested by the request packet.

As shown in FIG. 13A through FIG. 13D, the device ID field is common to every request packet format of the packet-type memory/coprocessor bus 2 according to the present invention, and memory sections 11 or coprocessor sections 14 which have to respond to the request are uniquely determined by the verification of the device ID field. The device ID field in FIG. 13A through FIG. 13D is a 7-bit device ID field, and thus 128 pieces of different numbers (0–127) can be designated by the device ID field. For example, 64 numbers of 0 to 63 may be used for designating one memory sections 11 or one coprocessor section 14, and 64 numbers of 64 to 127 may be used for the multicast or the broadcast. In this embodiment, the memory/coprocessor device ID may be one of the numbers from 0 to 63, therefore the number of the memory sections 11 and the coprocessor sections 14 in the coprocessor-integrated packet-type DRAMs 1 which can be connected to the packet-type memory/coprocessor bus 2 is 64 or less.

As for the command fields (for the commands No.0 and No.1), field lengths of the command fields in the request packet may be different between the case where the destination of the request packet is a memory section 11 and the case where the destination of the request packet is a coprocessor section 14, or may be the same, as mentioned above referring to FIG. 13B and FIG. 13C.

FIG. 13E is showing an example of a packet format of an acknowledge packet. The acknowledge packet of FIG. 13E occupies the 16-bit data bus 2-2 during one cycle, in which the first 2 bits are used as an acceptable/unacceptable filed, and the remaining 14 bits are used as a parameter field or not used. The acceptable/unacceptable filed is used to indicate whether the request can be accepted or not (i.e. whether response to the request can be executed or not) or whether some system error exists or not. In the case where the remaining 14 bits are used as a parameter field, the parameter field is used for indicating parameters which are necessary for the microprocessor 9 (the bus master) to handle the acknowledge packet.

FIG. 13F is showing an example of a packet format of a write data packet or a read data packet. Each of the write data packet and the read data packet transmits variable length data, occupying the data bus 2-2 during a necessary number of cycles.

MEMORY/COPROCESSOR DEVICE ID VERIFICATION CIRCUIT

FIG. 14 is a block diagram showing composition of the memory/coprocessor device ID verification circuit 23 according to an embodiment of the present invention for verifying the device ID included in the device ID field of the request packet against the memory device ID and the coprocessor device IDs which are stored in the coprocessor-integrated packet-type DRAM 1. The memory/coprocessor device ID verification circuit 23 of FIG. 14 includes a plurality of device ID verification circuits 52. The device ID verification circuit 52 is a circuit for verifying inputted device ID field in the request packet against an inputted memory device ID or coprocessor device ID, and thereby judging whether or not the device ID field is designating the memory device ID or the coprocessor device ID. FIG. 14 is showing an embodiment in which the coprocessor-integrated packet-type DRAM 1 comprises one memory section 11 and two coprocessor sections 14, and thus the memory/coprocessor device ID verification circuit 23 of FIG. 14 includes three device ID verification circuits 52. In FIG. 14, the device ID field is supplied from the control signal register 20 to each of the device ID verification circuits 52, and the memory device ID and the coprocessor device IDs are supplied to corresponding device ID verification circuits 52 from a memory device ID register 50 and coprocessor device ID registers 51, respectively. Incidentally, as mentioned above, the memory device ID register 50 is provided as one of the memory control registers 29 in the memory control register section 16, and the coprocessor device ID register 51 is provided as one of the operation control registers 33 in the operation control register section 32 in this embodiment. Each device ID verification circuit 52 outputs the result of the verification into the memory/operation control logic circuit 19. Here, the device ID verification circuit 52 may be composed of the same circuit as a general memory device ID verification circuit which is used in the prior art.

DEVICE ID FIELD VERIFICATION AND COMMAND FIELD DECODING

In the following, the control method or the operation of the coprocessor-integrated packet-type DRAM 1 when a request packet is supplied, i.e. verification of the device ID field and decoding of the command fields, will be explained referring to FIG. 8 and FIG. 14. The request packet sent from the bus master is inputted to the coprocessor-integrated packet-type DRAM 1 via the external I/O terminal 5, and supplied to the control signal terminal 24 of the control section 12 via the interface section 13, and then latched by the control signal register 20. Subsequently, out of the control signal register 20, only the device ID field in the request packet is inputted to the memory/coprocessor device ID verification circuit 23, and the other fields of the request packet are directly supplied to the memory/operation control logic circuit 19. Then, the memory/coprocessor device ID verification circuit 23 parallelly verifies the device ID field against all of the memory device ID and the coprocessor device IDs corresponding to all of the memory section 11 and the coprocessor sections 14 in the coprocessor-integrated packet-type DRAM 1, and sends the result of the verification, i.e. whether the device ID field matched each of the memory section 11 and the coprocessor sections 14 or not, to the memory/operation control logic circuit 19.

The memory/operation control logic circuit 19 receives the result of the verification, i.e. whether the request packet requesting a process has been addressed to the memory section 11 in the coprocessor-integrated packet-type DRAM 1 or not and whether the request packet has been addressed to each of the coprocessor sections 14 in the coprocessor-integrated packet-type DRAM 1 or not, from the memory/coprocessor device ID verification circuit 23 as mentioned above. Then, only in the case where any of the memory section 11 or the coprocessor sections 14 in the coprocessor-integrated packet-type DRAM 1 has been designated in the device ID field of the request packet, the memory/operation control logic circuit 19 decodes the command fields of the request packet and determines which process has been requested, and instructs the designated memory section 11 or coprocessor section 14 to execute the process.

As explained above, in the coprocessor-integrated packet-type DRAM 1 according to the present invention, it can be judged whether the request packet including the command fields has been addressed to a memory section 11 or has been addressed to a coprocessor section 14, before the command field decoding is executed. Therefore, the coprocessor-integrated packet-type DRAM 1 according to the present invention can switch decoding methods and use different command field decoding methods depending on whether the request packet is addressed to a memory sections 11 or a coprocessor sections 14, and thereby use of different request packet formats with different command field lengths as shown in FIG. 13B and FIG. 13C depending on the destination of the request packet is made possible. On the other hand, it is also possible to use the same command fields with the same field lengths and bit patterns as different requests for absolutely different processes depending on the destination of the request packet. For example, a command field with a specific bit pattern may be used for absolutely different process requests depending on the destination, such as for reading access to a memory control register section 16 in a memory section 11 and for writing access to an operation control register section 32 in a coprocessor section 14.

When the request packet is judged by the device ID field verification and the command field decoding to be requesting memory access or coprocessor access to a memory section 11 or a coprocessor section 14 in the coprocessor-integrated packet-type DRAM 1, the coprocessor-integrated packet-type DRAM 1 executes access request operation to the memory section 11 or the coprocessor section 14, as follows.

ACCESS REQUEST OPERATION

The access request operation of the coprocessor-integrated packet-type DRAM 1 can be executed in various ways. As the first example of the access request operation, the control section 12 may execute instruction of writing access or reading access to the memory section 11 or the coprocessor section 14 right after the device ID field verification and the command field decoding. This example can be employed only if the process which is requested by the bus master such as the microprocessor 9 is limited to processes which can be executed by the coprocessor-integrated packet-type DRAM 1. In order that the execution possibility of the requested process may be guaranteed, the bus master is needed to grasp the internal states of the memory sections 11 and the coprocessor sections 14 in the coprocessor-integrated packet-type DRAM 1. The acknowledge packet shown in FIG. 10B is not necessary in the first example.

As the second example of the access request operation of the coprocessor-integrated packet-type DRAM 1, after the device ID field verification and the command field decoding, the control section 12 may judge first whether or not the execution of the writing access or the reading access to the memory section 11 or the coprocessor section 14 is possible, and send the judgment result to the packet-type memory/coprocessor bus 2 in the form of an acknowledge packet. As has been explained referring to FIG. 13E, the acknowledge packet includes the acceptable/unacceptable field indicating whether the execution of the requested process is possible or not, and the judgment result of the execution possibility is transmitted to the bus master by the acknowledge packet. In the case where the execution of the requested process is possible, the control section 12 executes instruction of writing access or reading access to the memory section 11 or the coprocessor section 14 after the device ID field verification and the command field decoding, similarly to the first example. The operation of the control section 12 in the case where the execution of the requested process is impossible will be described later. The second example can be employed even if the process requested by the bus master such as the microprocessor 9 is not limited to processes which can be executed by the coprocessor-integrated packet-type DRAM 1.

The above first and second examples of the access request operation of the coprocessor-integrated packet-type DRAM 1 may be utilized in combination, depending on access destinations, commands, etc.

Figure 15:
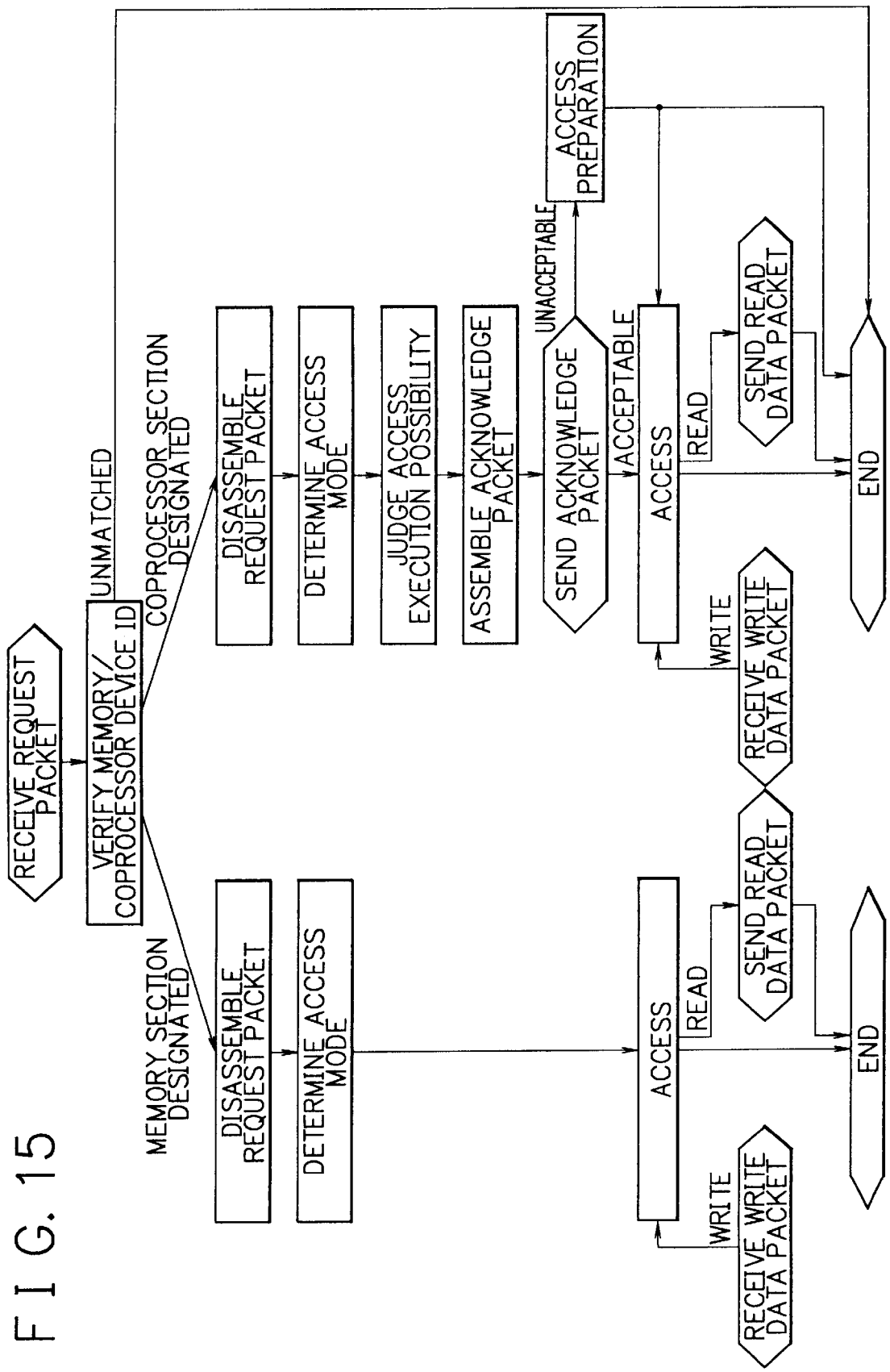
FIG. 15 is a flow chart showing an example of access request operation of the coprocessor-integrated packet-type DRAM.

FIG. 15 is a flow chart showing the third example of the access request operation of the coprocessor-integrated packet-type DRAM 1 in which the above first and second examples are utilized in combination. In the third example of FIG. 15, the first example which does not need the acknowledge packet is employed when access to a memory section 11 is requested, and the second example which needs the acknowledge packet is employed when access to a coprocessor section 14 is requested.

FIG. 16 is a flow chart showing the fourth example of the access request operation of the coprocessor-integrated packet-type DRAM 1 in which the above first and second examples are utilized in combination. In the fourth example of FIG. 16, the first example which does not need the acknowledge packet is employed when access to a memory section 11 or reading access to a coprocessor section 14 is requested, and the second example which needs the acknowledge packet is employed when writing access to a coprocessor section 14 is requested.

In memory access to the memory section 11, the acknowledge packet is necessary, for example, in the case where access to the DRAM core section 15 should be requested during the refresh of the DRAM core section 15 and the bus master microprocessor 9 does not know whether or not the refresh is in process, or in the case where the microprocessor 9 does not know whether or not data to be made access has already been temporarily stored in the sense amplifier 18. In such cases, the acknowledge packet includes information indicating whether the requested access can be accepted or not, and information instructing the microprocessor 9 how to operate in the case where the requested access can not be accepted. The instruction can be, for example, an instruction to request for access again after a predetermined time, an instruction to wait for a predetermined time till the access is completed, etc.

In coprocessor access to the coprocessor section 14, the acknowledge packet is necessary in the case where the bus master microprocessor 9 makes writing access or reading access to the operation control register section 32 not knowing whether the access to the operation control register section 32 can be executed or not, for example, in the case where writing access to the operation control register section 32 should be executed when data which is necessary for the operation of the coprocessor section 14 is still remaining in operation control registers 33 in the operation control register section 32, or in the case where reading access to the operation control register section 32 should be executed when the coprocessor section 14 has not written data into operation control registers 33 in the operation control register section 32 yet. In such cases, the acknowledge packet includes information indicating whether the requested access can be accepted or not, and information instructing the microprocessor 9 how to operate in the case where the requested access can not be accepted. The instruction can be, for example, an instruction to request for access again after a predetermined time, an instruction to wait for a predetermined time till the access is completed, etc.

ACCESS OPERATION

In the following, access operation of the coprocessor-integrated packet-type DRAM 1 to the memory section 11 and the coprocessor section 14 will be explained referring to FIG. 8, FIG. 15 and FIG. 16. The coarse destination of access is designated in the device ID field and is determined out of the memory section 11 and the coprocessor sections 14 in the coprocessor-integrated packet-type DRAM 1 as mentioned above, and the details of requested access is designated in the command fields.

Memory Access to DRAM Core Section

In the case of memory access to the DRAM core section 15 in the memory section 11, a desired DRAM bank 17 is selected by an address which is designated in the parameter fields, and data in the selected DRAM bank 17 is made access via a corresponding sense amplifier 18. Here, the sense amplifier 18 operates also as a cache memory or a high-speed buffer for the corresponding DRAM bank 17. Therefore, when the range of the addresses to be made access is within the data which has already been temporarily stored in the sense amplifier 18, the sense amplifiers 18 instead of the DRAM bank 17 is made access with a high speed, thereby high speed memory access is made possible. Thus, access time widely varies since access to the DRAM bank 17 is executed depending on whether the desired data has already been temporarily stored in the sense amplifier 18 or not. In the case where the subsequent access is addressed to data which is not temporarily stored in the sense amplifier 18, it is often advantageous for high speed access if the data temporarily stored in the sense amplifier 18 is written back to the DRAM bank 17 before the subsequent access. Therefore, in the case of memory access to the DRAM core section 15, the command field according to an embodiment of the present invention may include information with regard to control of the DRAM core section 15, such as whether access to the DRAM bank 17 should be executed or not, whether data in the sense amplifier 18 should be written back to the DRAM bank 17 or not, etc.

As shown in FIG. 15 and FIG. 16, in the access operation of the coprocessor-integrated packet-type DRAM 1, writing access to the DRAM core section 15 is executed by receiving a write data packet from the bus master microprocessor 9, and writing the variable length writing data in the write data packet into the DRAM core section 15 using the control method and the addresses which are designated by the command fields and the parameter fields of the request packet. On the other hand, reading access to the DRAM core section 15 is executed by reading out variable length data from the DRAM core section 15 using the control method and the addresses which are designated by the command fields and the parameter fields of the request packet, and transmitting the data in the form of a read data packet. In the writing access, the control section 12 receives the write data packet via the write data terminal 25, and in the reading access, the control section 12 transmits the read data packet via the read data terminal 26. The write data register 21 operates as an input latch (or an input register) for the write data terminal 25, and the read data register 22 operates as an output latch (or an output register) for the read data terminal 26. The read data and the write data are transmitted between the control section 12 and the DRAM core section 15 via the internal memory data bus 27.

Memory Access to Memory Control Register Section

In the case of memory access to the memory control register section 16 in the memory section 11, the parameter field in the request packet designates a memory control register 29 to which writing access or reading access is executed. In writing access, the write data packet is received, and fixed length write data in the write data packet is written into the designated memory control register 29, and in the reading access, fixed length data is read out from the designated memory control register 29 and the data is transmitted in the form of a read data packet. Designation by the command fields in the memory access to the memory control register section 16 is rather simpler compared to the case of the memory access to the DRAM core section 15. In the writing access, the control section 12 receives the write data packet via the write data terminal 25, and in the reading access, the control section 12 transmits the read data packet via the read data terminal 26. The read data and the write data are transmitted between the control section 12 and the memory control register section 16 via the internal memory data bus 27.

As another method for the writing access to the memory control register section 16, it is also possible to include the write data in part of the request packet and thereby disuse the write data packet. For example, in the request packet format shown in FIG. 13D, the write data can be included in the parameter fields for parameters No.1 and No.2. The parameter field for parameters No.0 is used for designating a memory control register 29 as the destination of the writing access as mentioned above. In the writing access according to this method, the control section 12 receives the write data via the control signal terminal 24.

Coprocessor Access to Operation Control Register Section

In the case of coprocessor access to the operation control register section 32 in the coprocessor section 14, the parameter field in the request packet designates an operation control register 33 to which writing access or reading access is executed. In writing access, the write data packet is received, and write data in the write data packet is written into the designated operation control register 33, and in the reading address, data is read out from the designated operation control register 33 and the data is transmitted in the form of a read data packet. The read data and the write data are transmitted between the control section 12 and the operation control register section 32 via the internal coprocessor data bus 28. In the writing access, the control section 12 receives the write data packet via the write data terminal 25, and in the reading access, the control section 12 transmits the read data packet via the read data terminal 26. The aforementioned third example shown in FIG. 15 uses the write data packet in writing access in the coprocessor access, and thus the example shown in FIG. 15 corresponds to this method.

As another method for the writing access to the operation control register section 32, it is also possible to include the write data in part of the request packet and thereby disuse the write data packet. For example, in the request packet format shown in FIG. 13D, the write data can be included in the parameter fields for parameters No.1 and No.2. The parameter field for parameters No.0 is used for designating an operation control register 33 as the destination of the writing access as mentioned above. In the writing access according to this method, the control section 12 receives the write data via the control signal terminal 24. The aforementioned fourth example shown in FIG. 16 does not use the write data packet in writing access in the coprocessor access, and thus the example shown in FIG. 16 corresponds to this method.

TYPES OF COPROCESSOR ACCESS

FIG. 17 is a classification table showing more concrete functions of the coprocessor access to the coprocessor section 14 in the coprocessor-integrated packet-type DRAM 1 according to the present invention. In FIG. 17, the writing access to the coprocessor section 14 includes two subcommands: 'operation parameter writing' and 'operation start request', and the reading access to the coprocessor section 14 includes two subcommands: 'operation result request' and 'operation status reading'.

The operation parameter writing is writing access to the coprocessor section 14 in which operation parameters necessary for the arithmetic logic operation of the coprocessor section 14 is written into the operation control register section 32 by the bus master. Here, the operation parameters include addresses of data which are used for the arithmetic logic operation, for example.

The operation start request is writing access to the coprocessor section 14 in which the bus master requests the coprocessor section 14 to start some kind of arithmetic logic operation. According to the operation start request, the coprocessor section 14 starts executing the desired arithmetic logic operation using the operation parameters which have been written into the operation control register section 32.

The operation status reading is reading access to the coprocessor section 14 in which the bus master reads the operation status of the coprocessor section 14 from the operation control register section 32. Here, the operation status includes intermediate data which are generated in the arithmetic logic operation, and information concerning whether arithmetic logic operation is in process in the coprocessor section 14 or not, for example.

The operation result request is reading access to the coprocessor section 14 in which the bus master reads results of arithmetic logic operation after the completion of the arithmetic logic operation by the coprocessor section 14.

COPROCESSOR SECTION

FIG. 18 is a block diagram showing an example of composition of a coprocessor section 14 according to the present invention. In FIG. 18, the operation control section 31 of the coprocessor section 14 is composed of a program counter 61, an instruction decoder 62, and an instruction information register 64. The instruction decoder 62 is provided with a status flag register 63 therein. The operation control register section 32 is composed of a plurality of operation control registers 33 as mentioned above, and the operation control registers 33 include the coprocessor device ID register 51, an operation start register 65, an operation result register 66 and a processing time register 67.

COPROCESSOR ACCESS OPERATION

In the following, the operation of the coprocessor-integrated packet-type DRAM 1 in the coprocessor access to the coprocessor section 14 will be described in more detail referring to FIG. 17 and FIG. 18.

Operation Parameter Writing

In the operation parameter writing, the operation parameters are supplied to the operation control register section 32 via the internal memory data bus 27 and the internal coprocessor data bus 28. The operation control registers 33 into which the operation parameters will be written are designated by the memory/operation control logic circuit 19. Incidentally, the operation parameter writing can be executed according to two control methods concerning acceptable/unacceptable of the operation parameter writing access. In the first control method, the operation parameters are written into the operation control register section 32 without exception. In the second control method, it is judged whether the operation parameter writing access to the coprocessor section 14 is acceptable or unacceptable. In the second control method, the memory/operation control logic circuit 19 first informs the operation control section 31 of the operation parameter writing access, and the operation control section 31 judges whether the operation parameter writing access is acceptable or unacceptable by referring to the status flag register 63 in the instruction decoder 62 and informs the memory/operation control logic circuit 19 of the judgment result. Here, the status flag register 63 is a register for storing a status flag indicating whether or not the coprocessor section 14 is executing some arithmetic logic operation. If some arithmetic logic operation is in process in the coprocessor section 14, the operation parameter writing access is not accepted in the second control method.

Operation Start Request

In the operation start request, a program pointer indicating an address of the first instruction in an arithmetic logic operation program to be executed is supplied to the operation control register section 32 via the internal memory data bus 27 and the internal coprocessor data bus 28, and the operation control register section 32 is instructed by the memory/operation control logic circuit 19 to write the value of the program pointer into the operation start register 65. Incidentally, the operation start request can be executed according to two control methods concerning acceptable/ unacceptable of writing access in the operation start request. In the first control method, the operation start request is accepted without exception, and in the second control method, it is judged whether the operation start request can be accepted or not. In the second control method, the memory/operation control logic circuit 19 first informs the operation control section 31 of the operation start request, and the operation control section 31 judges whether the writing of the program pointer is possible or not by referring to the status flag register 63 in the instruction decoder 62 and informs the memory/operation control logic circuit 19 of the judgment result. If some arithmetic logic operation is in process in the coprocessor section 14, the operation start request is not accepted in the second control method. In both control methods, along with writing the program pointer value into the operation start register 65 on the acceptance of the operation start request, the program pointer value is also written into the program counter 61 directly. According to the writing, the instruction decoder 62 starts the execution of the arithmetic logic operation. At the start of the arithmetic logic operation process, the status flag in the status flag register 63 is set ON for indicating that some arithmetic logic operation is in process in the coprocessor section 14.

The arithmetic logic operation process is carried out by executing a sequence of instructions included in the arithmetic logic operation program in the order of the indication of the program counter 61. The arithmetic logic operation process is started by the operation start request of the bus master, and thereafter executed by the coprocessor section 14 autonomously. Each instruction in the arithmetic logic operation program is executed as follows. The value of the program counter 61 is read out by the instruction decoder 62 and the program counter value is updated to the next value by the instruction decoder 62. The program counter value read out by the instruction decoder 62 is sent to the memory/ operation control logic circuit 19, thereby an instruction is read out from the DRAM core section 15 and is transmitted to the instruction decoder 62 via the internal memory data bus 27 and the internal coprocessor data bus 28. The instruction decoder 62 decodes the instruction which has been read out from the DRAM core section 15, and requests reading of register data which is necessary for the execution of the decoded instruction from the operation control register section 32. The instruction information register 64 is a register for storing the register data read out from the operation control register section 32 and instruction decode information indicating what kind of arithmetic logic operation should be executed by the operation core section 30. The register data and the instruction decode information are transferred to the operation core section 30, and thereby the instruction is executed by the operation core section 30. The result of the execution of the instruction is written in the operation control register section 32 or written into the DRAM core section 15 via the internal memory data bus 27 and the internal coprocessor data bus 28. Incidentally, necessary data may be read out from the DRAM core section 15 via the internal memory data bus 27 and the internal coprocessor data bus 28, according to execution of instructions.

Operation Status Reading

In the operation status reading, the operation status is read out from the operation control register section 32 via the internal coprocessor data bus 28 and the internal memory data bus 27. The operation control register 33 from which the operation status will be read out are designated by the memory/operation control logic circuit 19. The operation status reading can be executed even when some arithmetic logic operation is in process. The operation status reading may be used, for example, when the bus master needs to be synchronized with some arithmetic logic operation which is being executed by the coprocessor section 14. For instance, the arithmetic logic operation can be programmed so that a particular operation control register 33 may be set at a specific value when execution of a specific instruction is finished. In such a case, the bus master can judge whether the execution of the instruction has already been finished or not by reading the value of the operation control register 33 by means of the operation status reading. Further, the operation status reading may also be used, for example, when the bus master needs to know whether the coprocessor section 14 is executing no arithmetic logic operation or not. For instance, the values of the status flag stored in the status flag register 63 can be mapped to a particular operation control register 33. In such a case, the bus master can judge whether the coprocessor section 14 is executing no arithmetic logic operation or not by reading the value of the operation control register 33 by means of the operation status reading.

Operation Result Request

In the operation result request, the result of the arithmetic logic operation (i.e. operation result) is read out from the operation result register 66 via the internal coprocessor data bus 28 and the internal memory data bus 27, in which the operation control section 31 is instructed by the memory/ operation control logic circuit 19 to read out the operation result. Incidentally, the operation result request can be executed according to two control methods concerning acceptable/unacceptable of reading access in the operation result request. In the first control method, the reading of the operation result is executed without exception, and in the second control method, it is judged whether the reading of the operation result is possible or not. In the second control method, the operation control section 31 first judges whether the arithmetic logic operation has already been completed or not by referring to the status flag register 63 in the instruction decoder 62 and informs the memory/operation control logic circuit 19 of the judgment result. Here, as mentioned above, the status flag register 63 is a register for storing a status flag indicating whether or not the coprocessor section 14 is executing some arithmetic logic operation. If some arithmetic logic operation is in process in the coprocessor section 14, the operation result request is not accepted in the second control method. Incidentally, when the result of the arithmetic logic operation is in large quantity and can not be accommodated in the operation result register 66, other operation control registers are used for storing part of the operation result. In such cases, the bus master first reads out part of the operation result by means of the reading access to the operation result register 66, and after the reading access to the operation result register 66 is successfully completed, the bus master reads out rest of the operation result by means of the reading access to the operation control registers 33.

As has been explained referring to FIG. 17 and FIG. 18, in the operation parameter writing, the operation start request and the operation result request, there are cases where such coprocessor access is executed according to the aforementioned 'second method' in which the coprocessor section 14 can reject the request for access to the coprocessor section 14.

In the case where the second method is employed in the operation parameter writing or the operation start request, the acceptable/unacceptable of the writing access to the coprocessor section 14 is transmitted to the bus master using the acknowledge packet. In such cases, the acceptable/ unacceptable field of the acknowledge packet is used for indicating whether the writing access can be accepted or not, and the parameter field of the acknowledge packet is used for including information such as the reason for the rejection of the writing access, how long the rejection of writing access will continue, etc. The information concerning the duration of writing access rejection can be obtained as follows. A predicted value of the processing time of the arithmetic logic operation is preliminarily written in the program for the arithmetic logic operation, and the predicted value is written into the processing time register 67 which is provided as one of the operation control registers 33 at the start of the arithmetic logic operation. The value of the processing time register 67 is decremented on every supply of a predetermined number of edges in the clock signal. And the value of the processing time register 67 at the moment of the request for the writing access (ie. the operation parameter writing or the operation start request) is copied to the parameter field of the acknowledge packet, thereby the information concerning the writing access rejection duration can be included in the acknowledge packet.

In the case where the second method is employed in the operation result request, the acceptable/unacceptable of the operation result request to the coprocessor section 14 is transmitted to the bus master by using the acknowledge packet or by using the read data packet. In the case where the acknowledge packet is used, the acceptable/unacceptable field of the acknowledge packet is used for indicating whether the operation result request can be accepted or not, and the parameter field of the acknowledge packet is used for including information such as the reason for the rejection of the operation result request, the duration of the rejection of the operation result request, etc. In the case where the read data packet is used, one particular bit in the read data packet is used for indicating whether the contents of the read data packet is the operation result read out from the operation result register 66 or the information concerning the access rejection. Therefore, the data length of read data in the read data packet is necessitated to be shorter than the packet size of the read data packet by one bit. When the operation result request is rejected, the same information as the above information in the acknowledge packet is included in the read data packet and transmitted.

BUS TIMING IN ACCESSES

Figure 19:
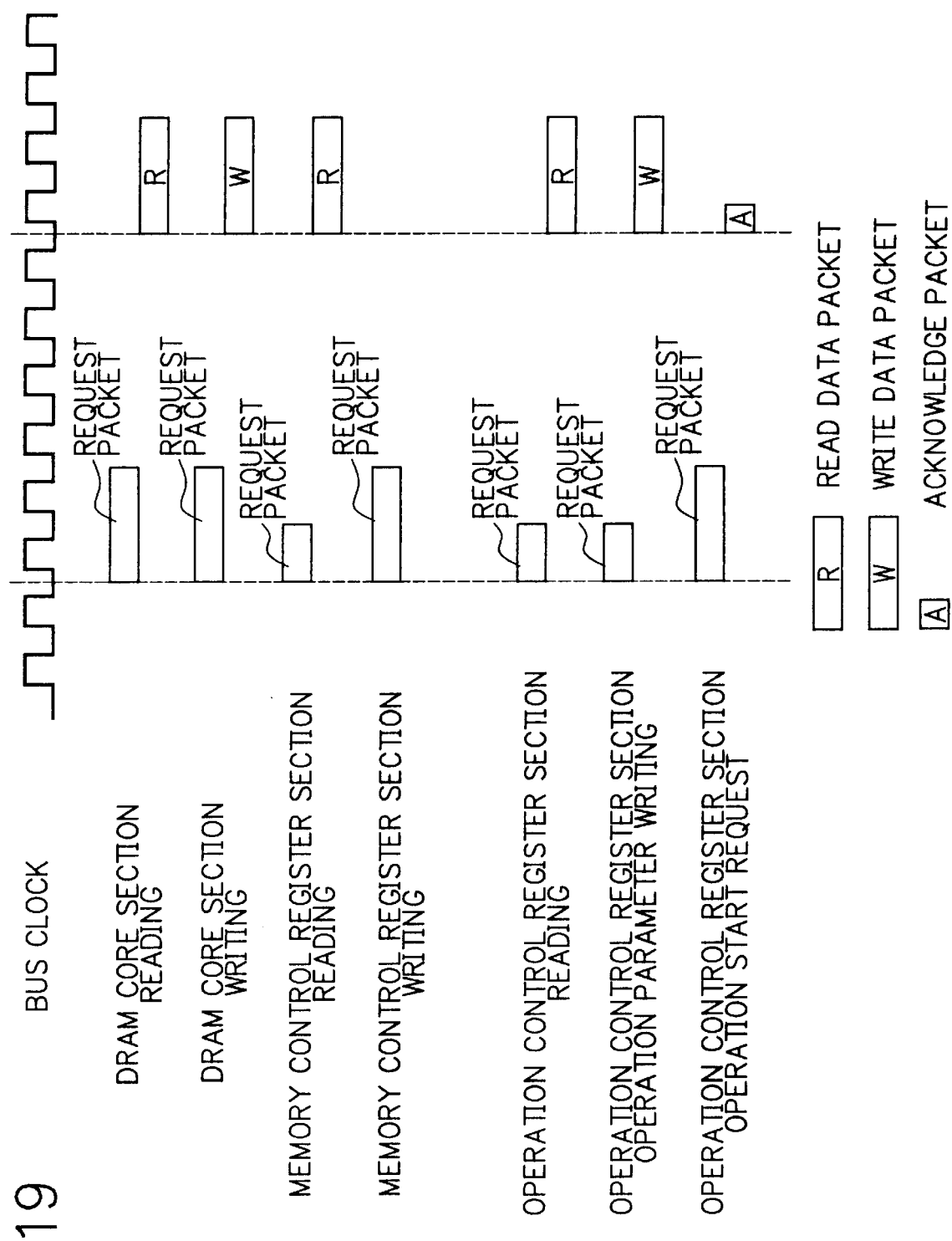
FIG. 19 is a timing chart showing examples of bus timing in accesses executed by the bus master to the coprocessor-integrated packet-type DRAM according to the present invention.

FIG. 19 is a timing chart showing examples of bus timing in accesses executed by the bus master to the coprocessor-integrated packet-type DRAM 1 according to the present invention. With regard to memory access (i.e. access to the DRAM core section 15 or the memory control register section 16), FIG. 19 is showing examples in which the acknowledge packet is not used. With regard to the writing access to the memory control register section 16, FIG. 19 is showing an example in which the write data packet is disused by including the write data in the request packet. In the coprocessor access, with regard to the reading access (including the operation result request and the operation status reading) and the operation parameter writing access to the operation control register section 32, FIG. 19 is showing examples in which the acknowledge packet is not used. Meanwhile, with regard to the operation start request to the operation control register section 32, FIG. 19 is showing an example in which the acknowledge packet is used. In the operation result request in the coprocessor reading access shown in FIG. 19, the acceptable/unacceptable of the operation result request to the coprocessor section 14 is transmitted to the bus master by using the read data packet. For the operation start request, the coprocessor section 14 can inform the bus master of whether the arithmetic logic operation could be actually started or not by transmitting the acknowledge packet. Although the acknowledge packet is not used for the operation parameter writing in FIG. 19, the bus master can execute the operation status reading access to the coprocessor section 14 prior to the operation parameter writing and confirm that arithmetic logic operation by the coprocessor section 14 is finished, thereby correct operation parameter writing to the operation control register section 32 can be guaranteed.

Figure 20:
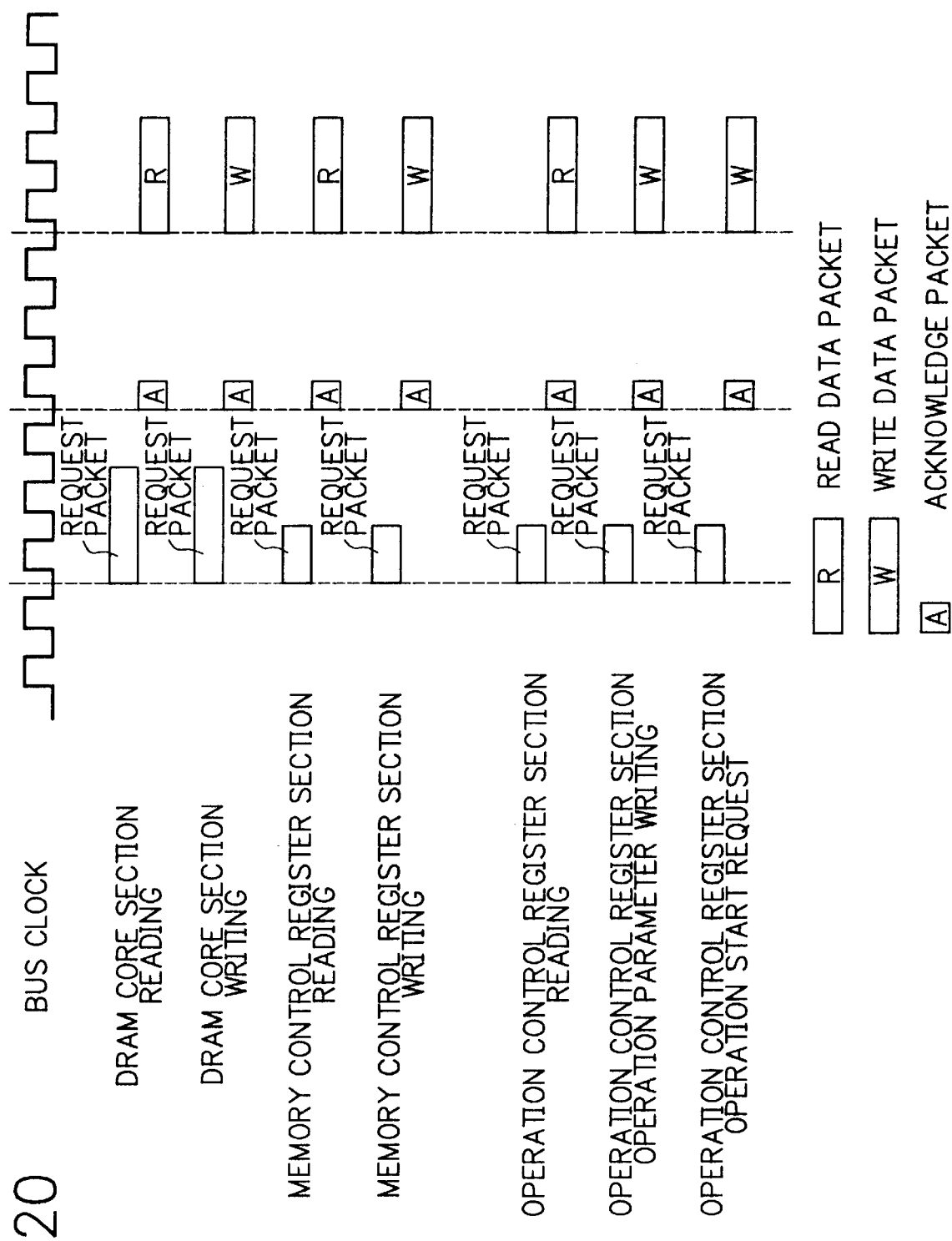
FIG. 20 is a timing chart showing other examples of bus timing in accesses executed by the bus master to the coprocessor-integrated packet-type DRAM according to the present invention.

FIG. 20 is a timing chart showing other examples of bus timing in accesses executed by the bus master to the coprocessor-integrated packet-type DRAM 1 according to the present invention. With regard to memory access (i.e. access to the DRAM core section 15 or the memory control register section 16) and coprocessor access, FIG. 20 is showing examples in which the acknowledge packet is used. In the examples of FIG. 20, the acknowledge packets are used for informing the bus master of whether or not the memory access or the coprocessor access can be accepted.

In the timing charts of FIG. 19 and FIG. 20, the bus timing on the packet-type memory/coprocessor bus 2 is designed to be the same regardless of whether the access is memory access to the memory section 11 or coprocessor access to the coprocessor section 14. In other words, in FIG. 19 which is showing examples in which no acknowledge packet is used for access to the memory section 11, the acknowledge packet which is used for the operation start request to the operation control register section 32 in the coprocessor section 14 is outputted to the packet-type memory/coprocessor bus 2 with the same bus timing after the reception of the request packet as the read data packets and the write data packets. In FIG. 13, bus timing between the request packet and the acknowledge packet is designed to be the same between all types of accesses, and bus timing between the request packet and the read data packet/write data packet is designed to be the same between all types of accesses.

Incidentally, although the coprocessor section 14 shown in FIG. 18 has been assumed to be a programmable coprocessor unit, even in the case where the coprocessor section 14 is a hard-wired coprocessor unit for executing fixed arithmetic logic operation, the arithmetic logic operation by such hard-wired coprocessor sections 14 can also be controlled by the bus master, according to the coprocessor accesses shown FIG. 17. In addition, as mentioned above, the coprocessor section 14 shown in FIG. 18 is designed to read out instructions from the memory section 11, read out data which are necessary for the execution of the instructions from the memory section 11, and write the result of the execution of the instructions into the memory section 11 if necessary. Therefore, as another example of the coprocessor section 14, it is also possible to provide a buffer memory or a cache memory in the coprocessor section 14 and thereby reduce the number of accesses of the coprocessor section 14 to the memory section 11, by letting the coprocessor section 14 make access to the memory section 11 via the buffer memory.

DEVICE ID ASSIGNMENT

Figure 21:
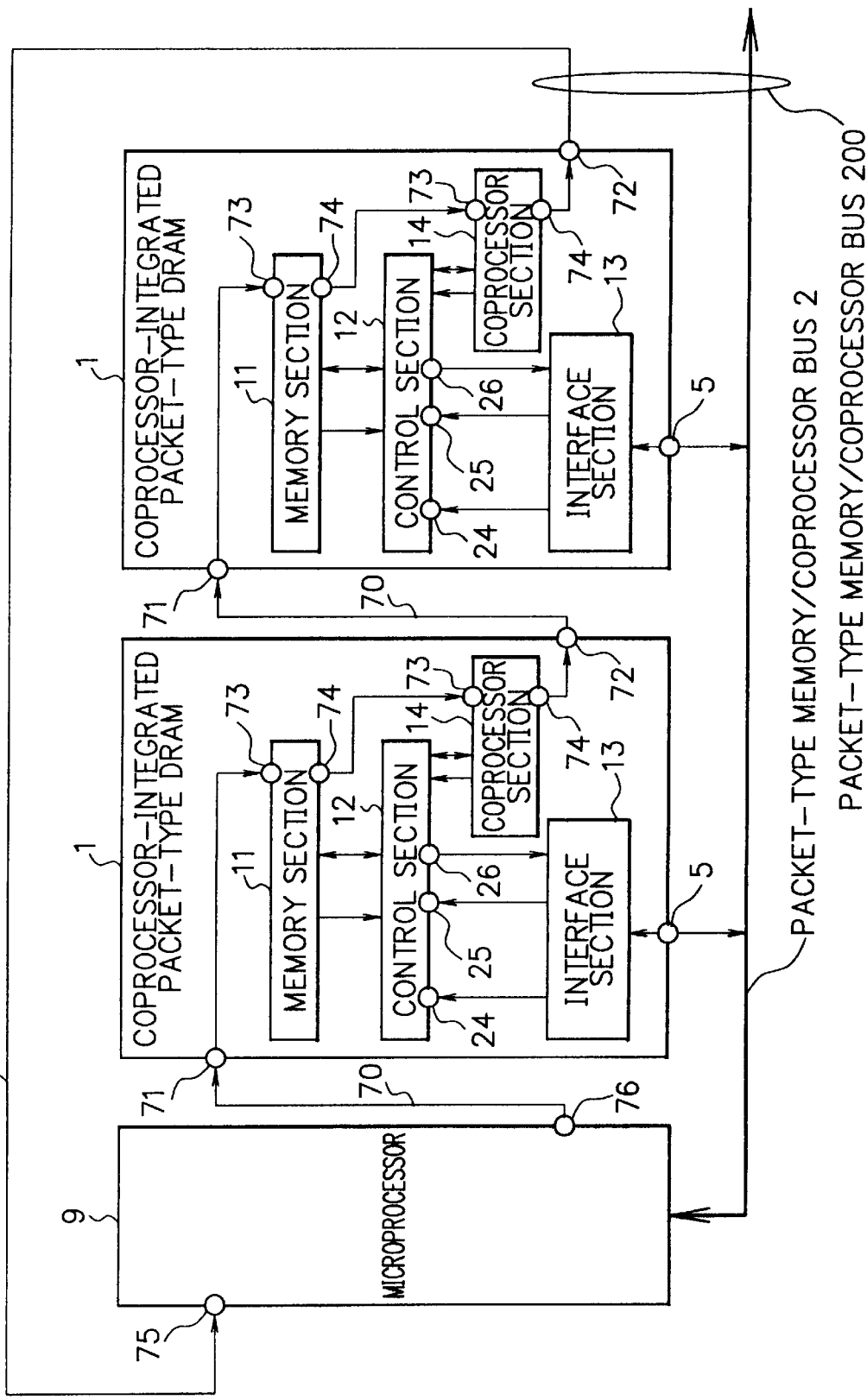
FIG. 21 is a block diagram showing a packet-type memory/coprocessor bus according to another embodiment of the present invention.

FIG. 21 is a block diagram showing a packet-type memory/coprocessor bus 200 according to another embodiment of the present invention, in which the memory device IDs and the coprocessor device IDs can be assigned to the memory sections 11 and the coprocessor sections 14 in the coprocessor-integrated packet-type DRAMs 1 according to the present invention. The packet-type memory/coprocessor bus 200 of FIG. 21 is composed of the packet-type memory/coprocessor bus 2 and a coprocessor-integrated packet-type DRAM chain 70 which connects the bus master microprocessor 9 and the coprocessor-integrated packet-type DRAMs 1 in the shape of a loop. The microprocessor 9 as the bus master of the packet-type memory/coprocessor bus 2 is provided with an external select-in terminal 75 and an external select-out terminal 76, and each of the coprocessor-integrated packet-type DRAMs 1 is provided with an external select-in terminal 71 and an external select-out terminal 72. The coprocessor-integrated packet-type DRAM chain 70 in FIG. 21 connects the external select-out terminal 76 of the bus master microprocessor 9 and the select-in terminal 71 of a coprocessor-integrated packet-type DRAM 1, the external select-out terminal 72 of the coprocessor-integrated packet-type DRAM 1 and the external select-in terminal 71 of the next coprocessor-integrated packet-type DRAM 1, the external select-out terminal 72 of the coprocessor-integrated packet-type DRAM 1 and the external select-in terminal 75 of the bus master microprocessor 9, respectively, in the shape of a loop. In the coprocessor-integrated packet-type DRAM 1, the external select-in terminal 71 is connected to an internal select-in terminal 73 of the memory section 11, and an internal select-out terminal 74 of the memory section 11 is connected to an internal select-in terminal 73 of the coprocessor section 14, and an internal select-out terminal 74 of the coprocessor section 14 is connected to the external select-out terminal 72 of the coprocessor-integrated packet-type DRAM 1. Incidentally, although one memory section 11 and one coprocessor section 14 are included in the coprocessor-integrated packet-type DRAM 1, it is also possible for the coprocessor-integrated packet-type DRAM 1 to include one memory section 11 and a plurality of coprocessor sections 14. In such cases, the memory section 11 and the coprocessor sections 14 are connected together to form a chain of blocks by connecting each internal select-out terminal 74 to a corresponding internal select-in terminal 73 of the next block, and the external select-in terminal 71 of the coprocessor-integrated packet-type DRAM 1 is connected to an internal select-in terminal 73 of the first block (i.e. the memory section 11 or one of the coprocessor sections 14), and an internal select-out terminal 74 of the final block is connected to the external select-out terminal 72 of the coprocessor-integrated packet-type DRAM 1.

Due to such composition known as a daisy chain, the memory device IDs and the coprocessor device IDs can be assigned to each of the memory sections 11 and the coprocessor sections 14 in all of the coprocessor-integrated packet-type DRAMs 1 connected to the packet-type memory/coprocessor bus 200, as follows.

As an initialization process, the memory device IDs and the coprocessor device IDs are set at a predetermined initial value, first. This can be realized, for example, by designing the memory device ID registers 50 in the memory control register sections 16 and the coprocessor device ID registers 51 in the operation control register sections 32 to be set at a predetermined initial value (for example, '111111', '000000', etc. in the case of 6-bit registers) when a reset signal is supplied thereto. Further in the initialization process, all of the internal select-out terminals 74 of the memory sections 11 and the coprocessor sections 14 are set at the logical value '0'. After the initialization process and before the memory device ID or the coprocessor device ID is rewritten, each of the memory sections 11 and the coprocessor sections 14 ignores writing access thereto as long as the logical value '0' is supplied to its internal select-in terminal 73. And if the logical value '1' is supplied to the internal select-in terminal 73, the memory device ID of the memory section 11 or the coprocessor device ID of the coprocessor section 14 is rewritten according to a request for writing access thereto. Each of the memory sections 11 and the coprocessor sections 14 is designed to output the logical value '1' from its internal select-out terminal 74 after the rewriting of the memory device ID or the coprocessor device ID.

In such construction, the microprocessor 9 assigns specific and unique memory device IDs and coprocessor device IDs to all of the memory sections 11 and the coprocessor sections 14 in all the coprocessor-integrated packet-type DRAMs 1 which are connected to the packet-type memory/ coprocessor bus 200, one after another starting from the first block (i.e. a memory section 11 or a coprocessor section 14) in the first coprocessor-integrated packet-type DRAM 1 in the coprocessor-integrated packet-type DRAM chain 70. The microprocessor 9 executes the device ID assigning process by outputting the logical value '1' from its external select-out terminal 76 and executing writing accesses to the blocks one after another. On each of the writing accesses, the predetermined initial value is designated in the device ID field of the request packet and a new device ID is designated in the parameter field of the request packet as the write data, in which the new device ID designated in the parameter field is varied on every writing access, thereby the specific and unique memory device IDs and coprocessor device IDs can be assigned to all of the memory sections 11 and the coprocessor sections 14 in all of the coprocessor-integrated packet-type DRAMs 1 which are connected to the packet-type memory/coprocessor bus 200.

MEMORY CONTROL REGISTER SECTION & OPERATION CONTROL REGISTER SECTION

Figure 22:
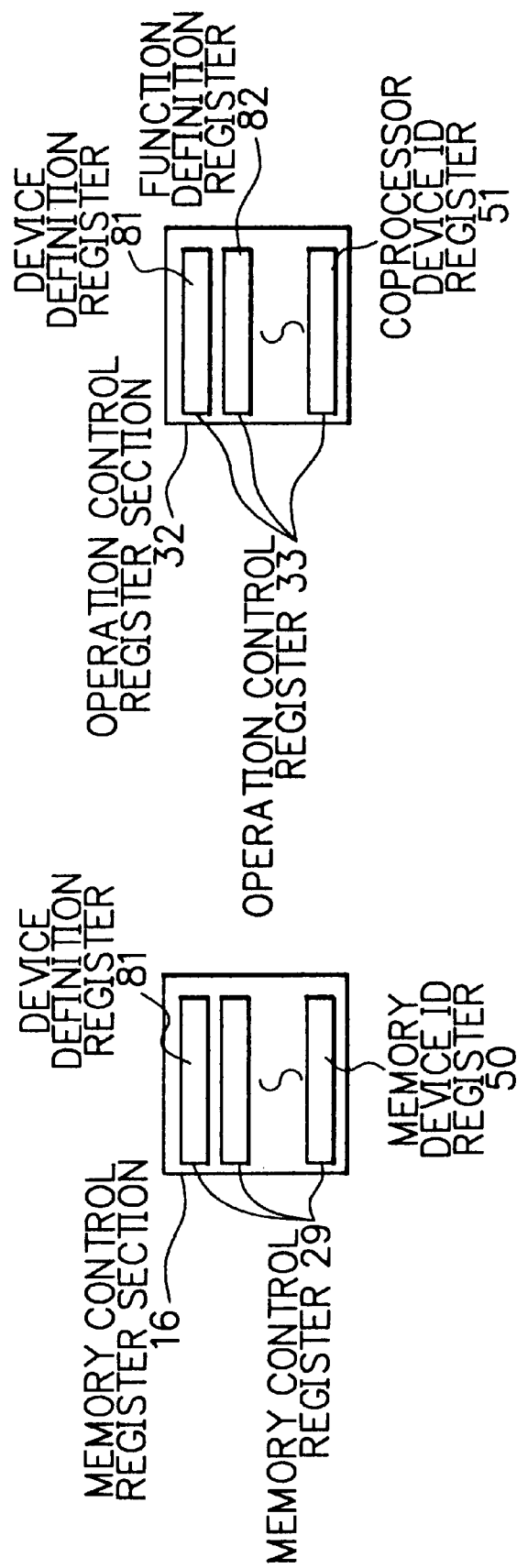
FIG. 22 is a schematic diagram showing examples of a memory control register section and an operation control register section in the coprocessor-integrated packet-type DRAM according to the present invention.

FIG. 22 is a schematic diagram showing examples of the memory control register section 16 and the operation control register section 32 in the coprocessor-integrated packet-type DRAM 1 according to the present invention. In FIG. 22, a device definition register 81 is included in each of the memory control register section 16 and the operation control register section 32. The device definition register 81 is a register for storing device definition information to be used for discriminating between a memory section 11 and a coprocessor section 14. The device definition information is previously written into the device definition register 81, for example, on the production or shipment of the coprocessor-integrated packet-type DRAM 1. The bus master can check whether an arbitrary device ID corresponds to a memory section 11 or a coprocessor section 14, by designating the arbitrary device ID in the request packet and reading out the device definition information from the device definition register 81. As shown in FIG. 22, the device definition register 81 in the memory control register section 16 is provided as one of the memory control registers 29, and the device definition register 81 in the operation control register section 32 is provided as one of the operation control registers 33. And the device definition registers 81 in both sections 16, 32 are provided so as to be designated by the same register number (register No.1 in FIG. 22). Therefore, the bus master can execute the reading of the device definition register 81 without knowing whether the destination of the reading is a memory section 11 or a coprocessor section 14, since both reading access to the device definition register 81 in the memory section 11 and reading access to the device definition register 81 in the coprocessor section 14 can be executed by using request packets which are the same except for the device ID field.

The operation control register section 32 of FIG. 22 further includes a function definition register 82. The function definition register 82 is a register for storing function definition code which classifies the arithmetic logic operation functions of the coprocessor section 14. The function definition code is previously written into the function definition register 82, for example, on the production or shipment of the coprocessor-integrated packet-type DRAM 1. The bus master can check the arithmetic logic operation functions of a coprocessor section 14, by designating the device ID of the coprocessor section 14 in the request packet and reading out the function definition code from the function definition register 82.

As described above, in the embodiments according to the present invention, the following effects can be obtained.

As a 1st effect, a coprocessor-integrated packet-type DRAM can be realized without increasing the number of terminals (signal lines) of the external I/O terminal, compared with the conventional packet-type DRAMs. Concretely, the coprocessor-integrated packet-type DRAM according to the embodiments can be realized with 10 to 30 terminals in the external I/O terminal.

As a 2nd effect, a coprocessor-integrated packet-type DRAM can be realized using exactly the same terminal composition of the external I/O terminal as the conventional packet-type DRAMs. Concretely, the coprocessor-integrated packet-type DRAM according to the embodiments can be realized using exactly the same terminal composition of the external I/O terminal as the packet-type DRAMs of SLDRAM or Rambus, for example.

As a 3rd effect, a coprocessor-integrated packet-type DRAM, which can respond to both the request for memory access to the on-chip memory section and the request for coprocessor access to the on-chip coprocessor section requested via the packet-type memory/coprocessor bus, can be realized.

As a 4th effect, such a packet-type memory/coprocessor bus can be realized using exactly the same bus signal line composition as the conventional packet-type memory buses. Concretely, the packet-type memory/coprocessor bus according to the embodiments can be realized using bus signal line composition of the packet-type memory buses of SLDRAM or Rambus, for example.

As a 5th effect, a coprocessor-integrated packet-type DRAM and a packet-type memory/coprocessor bus, with which memory access to the memory section can be executed without any temporal overhead compared with memory access by the conventional packet-type memory bus and packet-type DRAM, can be realized. Concretely, the memory access to the memory section of the coprocessor-integrated packet-type DRAM according to the embodiments can be realized with exactly the same bus timing as the bus timing of memory access in the techniques of SLDRAM or Rambus, for example.

As a 6th effect, a coprocessor-integrated packet-type DRAM and a packet-type memory/coprocessor bus, with which memory access to the memory section can be executed with exactly the same packet formats and bus protocols as those used in memory access by the conventional packet-type memory buses and packet-type DRAMs, can be realized. Concretely, the memory access to the memory section of the coprocessor-integrated packet-type DRAM according to the embodiments can be realized with exactly the same packet formats and bus protocols as those of SLDRAM or Rambus, for example.

As a 7th effect, in the coprocessor-integrated packet-type DRAM and the packet-type memory/coprocessor bus according to the embodiments, the coprocessor access (i.e. the reading access and the writing access) to the coprocessor sections can be executed by the bus master, and the coprocessor sections can respond to the coprocessor access by transmitting the acknowledge packet or the read data packet, thereby the operation parameter writing, the operation start request, the operation result request, and the operation status reading can be executed by the bus master to the coprocessor sections via the single bus master type packet-type memory/coprocessor bus.

As an 8th effect, in the packet-type memory/coprocessor bus according to the preferred embodiment, bus timing of the read data packet in the memory access, bus timing of the write data packet in the memory access, bus timing of the read data packet in the coprocessor access, bus timing of the write data packet in the coprocessor access, and bus timing of the acknowledge packet in the coprocessor access are all set at the same bus timing with respect to the request packet, thereby bus timing setting executed by the bus master can be considerably simplified. For example, the bus timing of the read data packet, the write data packet and the acknowledge packet with respect to the request packet in the coprocessor access according to the embodiment can be set exactly the same timing as the bus timing of the read data packet and the write data packet with respect to the request packet in the memory access in the SLDRAM technique.

As a 9th effect, in the packet-type memory/coprocessor bus according to the preferred embodiment, bus timing between the request packet and the read data packet/write data packet in the memory access is set at the same timing as that in the coprocessor access, and bus timing between the request packet and the acknowledge packet in the memory access is set at the same timing as that in the coprocessor access, thereby bus timing setting executed by the bus master can be considerably simplified. For example, the bus timing between the request packet and the read data packet/write data packet and the bus timing between the request packet and the acknowledge packet in the coprocessor access according to the embodiment can be set exactly the same as those in the memory access in the Rambus technique.

As a 10th effect, in the coprocessor-integrated packet-type DRAM and the packet-type memory/coprocessor bus according to the preferred embodiment, the control section can employ different decoding methods for decoding the command field of the request packet depending on whether the device ID field of the request packet designates a memory section or a coprocessor section, thereby a command field with a particular bit pattern can designate different commands depending on whether the device ID field designates a memory section or a coprocessor section.

As an 11th effect, in the coprocessor-integrated packet-type DRAM according to the embodiments, the coprocessor section can execute arithmetic logic operations referring to instructions, data, etc. stored in the memory section installed on the same coprocessor-integrated packet-type DRAM chip. Generally, internal data transmission in a chip can be executed with considerably wider data bandwidth compared with external data transmission between chips. For example, the external data transmission bandwidths of high speed DRAMs are approximately 1 GB/sec, meanwhile, data transmission bandwidth of approximately 10 GB/sec can be realized in the internal data transmission. Therefore, in the coprocessor-integrated packet-type DRAM according to the embodiments, high speed arithmetic logic operations can be executed by the coprocessor section, taking advantage of wide bandwidth data/instruction reading and writing against the on-chip memory section.

As a 12th effect, an arbitrary number of conventional packet-type DRAMs and an arbitrary number of the coprocessor-integrated packet-type DRAMs according to the embodiments can be connected in a mixed arrangement to the packet-type memory/coprocessor bus according to the embodiments. And memory access to the conventional packet-type DRAMs, memory access to the coprocessor-integrated packet-type DRAMs, and coprocessor access to the coprocessor sections (i.e. control of the arithmetic logic operation functions of the coprocessor sections) in the coprocessor-integrated packet-type DRAMs can be executed by the bus master via the packet-type memory/coprocessor bus. Incidentally, the conventional packet-type DRAM can be regarded as a case where the number of the coprocessor sections in the coprocessor-integrated packet-type DRAM according to the embodiments is 0.

As a 13th effect, in the packet-type memory/coprocessor bus according to the embodiments to which the coprocessor-integrated packet-type DRAMs and the conventional packet-type DRAMs are connected in a mixed arrangement, memory access to the conventional packet-type DRAM and memory access to the memory section of the coprocessor-integrated packet-type DRAM can be executed using exactly the same bus timing.

As a 14th effect, a coprocessor-integrated memory system which can easily replace conventional memory systems comprising conventional packet-type DRAMs can be realized by use of the coprocessor-integrated packet-type DRAM and the packet-type memory/coprocessor bus according to the embodiments. Therefore, such coprocessor-integrated memory systems according to the embodiments are highly penetrable into conventional processor systems which employ conventional memory systems.

As a 15th effect, in the coprocessor-integrated packet-type DRAM and the packet-type memory/coprocessor bus according to the preferred embodiment, the bus master can assign specific and unique memory device IDs and coprocessor device IDs to the memory sections and the coprocessor sections in all of the coprocessor-integrated packet-type DRAMs connected to the packet-type memory/coprocessor bus, by the initialization process and the successive writing accesses.

As a 16th effect, with the coprocessor-integrated packet-type DRAM according to the preferred embodiment, the bus master can check whether the destination of a request is a memory section or a coprocessor section by executing reading access and reading out the device definition information stored in the device definition registers in the memory sections and the coprocessor sections.

As a 17th effect, with the coprocessor-integrated packet-type DRAM according to the preferred embodiment, the bus master can check arithmetic logic operation functions installed in each of the coprocessor sections by executing reading access and reading out the function definition code stored in the function definition registers in the coprocessor sections. Thanks to the operation function checking, software such as device drivers, arithmetic logic operation libraries, etc. which is suitable for the coprocessor section can be linked with user programs which are executed by the bus master. Thereafter, the user program can utilize the arithmetic logic operation functions of the coprocessor section through such software. Such software can accelerate processing speed of the user program by letting each coprocessor section execute arithmetic logic operations which are suitable for the arithmetic logic operation functions of the coprocessor section. Therefore, a high speed and flexible processor system in which it is possible to alter and optimize hardware construction and software construction at the initialization stage, during operation, etc. can be constructed using the coprocessor-integrated packet-type DRAMs and the packet-type memory/coprocessor bus according to the embodiments.

Incidentally, although above description has been given with regard to the coprocessor-integrated packet-type DRAM which includes a DRAM core section (i.e. a memory core section composed of DRAM), the present invention can of course be generally applied to coprocessor-integrated packet-type memory LSIs which include general memory core sections.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A coprocessor-integrated packet-type memory LSI to be connected to a packet-type memory/coprocessor bus out of the coprocessor-integrated packet-type memory LSI via an external I/O terminal having a desired number of signal terminals, comprising a memory section, a control section, an interface section, and a desired number of coprocessor sections, wherein:

a memory device ID and coprocessor device IDs are assigned to the memory section and the coprocessor sections respectively and are stored in the coprocessor-integrated packet-type memory LSI, in which the memory device ID and the coprocessor device IDs are assigned so that each of them can uniquely designate one memory section or one coprocessor section out of all of the memory sections and the coprocessor sections in all of the coprocessor-integrated packet-type memory LSIs which are connected to the packet-type memory/coprocessor bus.

2. A coprocessor-integrated packet-type memory LSI as claimed in claim 1, wherein:

the memory section includes a memory core section and a memory control register section including a desired number of memory control registers, the coprocessor section includes an operation core section, an operation control section, and an operation control register section including a desired number of operation control registers, the control section and the memory section are connected by an internal memory data bus, and the control section and the coprocessor sections are connected by internal coprocessor data buses.

3. A coprocessor-integrated packet-type memory LSI as claimed in claim 2, wherein the memory core section is composed of dynamic random access memory.

4. A packet-type memory/coprocessor bus for connecting a bus master and a desired number of coprocessor-integrated packet-type memory LSIs of claim 1, 2 or 3 wherein:

the packet-type memory/coprocessor bus is a single bus master type bus needing no arbitration for its bus exclusive ownership to be executed by the bus master when the bus master transmits a packet to the packet-type memory/coprocessor bus, in which two types of packets including a request packet and a write data packet can be transmitted by the bus master to the packet-type memory/coprocessor bus, and a read data packet can be transmitted by the coprocessor-integrated packet-type memory LSI to the packet-type memory/coprocessor bus.

5. A packet-type memory/coprocessor bus for connecting a bus master and a desired number of coprocessor-integrated packet-type memory LSIs of claim 1, 2 or 3, wherein:

the packet-type memory/coprocessor bus is a single bus master type bus needing no arbitration for its bus exclusive ownership to be executed by the bus master when the bus master transmits a packet to the packet-type memory/coprocessor bus, in which two types of packets including a request packet and a write data packet can be transmitted by the bus master to the packet-type memory/coprocessor bus, and two types of packets including a read data packet and an acknowledge packet can be transmitted by the coprocessor-integrated packet-type memory LSI to the packet-type memory/coprocessor bus.

6. A packet-type memory/coprocessor bus as claimed in claim 4, wherein the request packet includes:

a device ID field for designating the destination of the request packet out of all of the memory sections and the coprocessor sections in all of the coprocessor-integrated packet-type memory LSIs which are connected to the packet-type memory/coprocessor bus;

a command field for designating a process which the request packet requests; and a parameter filed for designating parameters which are necessary for the execution of the process which is requested by the request packet.

7. A packet-type memory/coprocessor bus as claimed in claim 5, wherein the request packet includes:

a device ID field for designating the destination of the request packet out of all of the memory sections and the coprocessor sections in all of the coprocessor-integrated packet-type memory LSIs which are connected to the packet-type memory/coprocessor bus;

a command field for designating a process which the request packet requests; and a parameter filed for designating parameters which are necessary for the execution of the process which is requested by the request packet.

8. A packet-type memory/coprocessor bus as claimed in claim 6, wherein the device ID field has a fixed field length regardless of whether the device ID field designates a memory section or a coprocessor section, and the command field also has a fixed field length regardless of whether the device ID field designates a memory section or a coprocessor section.

9. A packet-type memory/coprocessor bus as claimed in claim 7, wherein the device ID field has a fixed field length regardless of whether the device ID field designates a memory section or a coprocessor section, and the command field also has a fixed field length regardless of whether the device ID field designates a memory section or a coprocessor section.

10. A packet-type memory/coprocessor bus as claimed in claim 6, wherein the device ID field has a fixed field length regardless of whether the device ID field designates a memory section or a coprocessor section, and the field length of the command field varies depending on whether the device ID field designates a memory section or a coprocessor section.

11. A packet-type memory/coprocessor bus as claimed in claim 7, wherein the device ID field has a fixed field length regardless of whether the device ID field designates a memory section or a coprocessor section, and the field length of the command field varies depending on whether the device ID field designates a memory section or a coprocessor section.

12. A packet-type memory/coprocessor bus as claimed in claim 8 including:

a control bus which is a unidirectional bus from the bus master to the coprocessor-integrated packet-type memory LSI; and a data bus which is a bidirectional bus between the bus master and the coprocessor-integrated packet-type memory LSI.

13. A packet-type memory/coprocessor bus as claimed in claim 9 including:

a control bus which is a unidirectional bus from the bus master to the coprocessor-integrated packet-type memory LSI; and a data bus which is a bidirectional bus between the bus master and the coprocessor-integrated packet-type memory LSI.

14. A packet-type memory/coprocessor bus as claimed in claim 10 including:

a control bus which is a unidirectional bus from the bus master to the coprocessor-integrated packet-type memory LSI; and a data bus which is a bidirectional bus between the bus master and the coprocessor-integrated packet-type memory LSI.

15. A packet-type memory/coprocessor bus as claimed in claim 11 including:

a control bus which is a unidirectional bus from the bus master to the coprocessor-integrated packet-type memory LSI; and a data bus which is a bidirectional bus between the bus master and the coprocessor-integrated packet-type memory LSI.

16. A packet-type memory/coprocessor bus as claimed in claim 8 including:

a request bus which is a unidirectional bus from the bus master to the coprocessor-integrated packet-type memory LSI; and a response bus which is a unidirectional bus from the coprocessor-integrated packet-type memory LSI to the bus master.

17. A packet-type memory/coprocessor bus as claimed in claim 9 including:

a request bus which is a unidirectional bus from the bus master to the coprocessor-integrated packet-type memory LSI; and a response bus which is a unidirectional bus from the coprocessor-integrated packet-type memory LSI to the bus master.

18. A packet-type memory/coprocessor bus as claimed in claim 10 including:

a request bus which is a unidirectional bus from the bus master to the coprocessor-integrated packet-type memory LSI; and a response bus which is a unidirectional bus from the coprocessor-integrated packet-type memory LSI to the bus master.

19. A packet-type memory/coprocessor bus as claimed in claim 11 including:

a request bus which is a unidirectional bus from the bus master to the coprocessor-integrated packet-type memory LSI; and a response bus which is a unidirectional bus from the coprocessor-integrated packet-type memory LSI to the bus master.

20. A method for controlling the coprocessor-integrated packet-type memory LSI of claim 1, 2 or 3, comprising the steps of:

a reception step in which the interface section receives the request packet from the packet-type memory/coprocessor bus of claim 6 or 7 via the external I/O terminal;

a verification step in which the control section verifies the device ID field in the request packet against the memory device ID and the coprocessor device IDs stored in the coprocessor-integrated packet-type memory LSI;

a decoding step in which the control section decodes the command field in the request packet, only in the case where the device ID field designates any of the memory device ID and the coprocessor device IDs stored in the coprocessor-integrated packet-type memory LSI; and an instruction step in which the control section instructs the memory section or the coprocessor section designated by the device ID field to execute the process which is requested by the request packet.

21. A coprocessor-integrated packet-type memory LSI as claimed in claim 1, wherein the coprocessor-integrated packet-type memory LSI is controlled by the method of claim 20, and the coprocessor-integrated packet-type memory LSI further comprises:

a memory device ID register for storing the memory device ID of the memory section;

one or more coprocessor device ID registers for storing the coprocessor device IDs of the coprocessor sections respectively; and a memory/coprocessor device ID verification circuit connected with the memory device ID register and the coprocessor device ID registers, for parallelly executing the verification of the device ID field in the request packet against the memory device ID stored in the memory device ID register and the verification of the device ID field in the request packet against the coprocessor device IDs stored in the coprocessor device ID registers respectively, and thereby judging whether or not the device ID field designates each of the memory section and the coprocessor sections in the coprocessor-integrated packet-type memory LSI.

22. A coprocessor-integrated packet-type memory LSI as claimed in claim 2, wherein the coprocessor-integrated packet-type memory LSI is controlled by the method of claim 20, and the coprocessor-integrated packet-type memory LSI further comprises:

a memory device ID register for storing the memory device ID of the memory section;

one or more coprocessor device ID registers for storing the coprocessor device IDs of the coprocessor sections respectively; and a memory/coprocessor device ID verification circuit connected with the memory device ID register and the coprocessor device ID registers, for parallelly executing the verification of the device ID field in the request packet against the memory device ID stored in the memory device ID register and the verification of the device ID field in the request packet against the coprocessor device IDs stored in the coprocessor device ID registers respectively, and thereby judging whether or not the device ID field designates each of the memory section and the coprocessor sections in the coprocessor-integrated packet-type memory LSI.

23. A coprocessor-integrated packet-type memory LSI as claimed in claim 3, wherein the coprocessor-integrated packet-type memory LSI is controlled by the method of claim 20, and the coprocessor-integrated packet-type memory LSI further comprises:

a memory device ID register for storing the memory device ID of the memory section;

one or more coprocessor device ID registers for storing the coprocessor device IDs of the coprocessor sections respectively; and a memory/coprocessor device ID verification circuit connected with the memory device ID register and the coprocessor device ID registers, for parallelly executing the verification of the device ID field in the request packet against the memory device ID stored in the memory device ID register and the verification of the device ID field in the request packet against the coprocessor device IDs stored in the coprocessor device ID registers respectively, and thereby judging whether or not the device ID field designates each of the memory section and the coprocessor sections in the coprocessor-integrated packet-type memory LSI.

24. A coprocessor-integrated packet-type memory LSI as claimed in claim 22, wherein the memory device ID register is provided as one of the memory control registers in the memory control register section of the memory section, and the coprocessor device ID register is provided as one of the operation control registers in the operation control register section of the coprocessor section.

25. A method as claimed in claim 20, wherein in the decoding step, the control section employs different decoding methods for decoding the command field depending on whether the device ID field of the request packet designates a memory section or a coprocessor section, in which a command field with a particular bit pattern can designate different process requests depending on whether the device ID field designates a memory section or a coprocessor section.

26. A method as claimed in claim 20, wherein in the case where the device ID field in the request packet designated the memory section, the control section decodes the command field of the request packet, and instructs the memory section to execute writing access or reading access to the memory core section or the memory control register section in the memory section according to the result of the decoding.

27. A method as claimed in claim 20, wherein in the case where the device ID field in the request packet designated the memory section, the control section decodes the command field of the request packet, judges whether the memory section can execute writing access or reading access requested by the request packet or not according to the result of the decoding, transmits the judgment result to the packet-type memory/coprocessor bus as the acknowledge packet, and instructs the memory section to execute the writing access or the reading access to the memory core section or the memory control register section in the memory section if the memory section has been judged to be able to execute the access.

28. A method as claimed in claim 20, wherein in the case where the device ID field in the request packet designated one of the coprocessor sections, the control section decodes the command field of the request packet, and instructs the designated coprocessor section to execute writing access or reading access to the operation control register section in the coprocessor section according to the result of the decoding.

29. A method as claimed in claim 20, wherein in the case where the device ID field in the request packet designated one of the coprocessor sections, the control section decodes the command field of the request packet, judges whether the designated coprocessor section can execute writing access or reading access requested by the request packet or not according to the result of the decoding, transmits the judgment result to the packet-type memory/coprocessor bus as the acknowledge packet, and instructs the designated coprocessor section to execute the writing access or the reading access to the operation control register section in the coprocessor section if the coprocessor section has been judged to be able to execute the access.

30. A method as claimed in claim 20, wherein:
in the case where the device ID field in the request packet designated the memory section, the control section decodes the command field of the request packet, and instructs the memory section to execute writing access or reading access to the memory core section or the memory control register section in the memory section according to the result of the decoding, and
in the case where the device ID field in the request packet designated one of the coprocessor sections, the control section decodes the command field of the request packet, judges whether the designated coprocessor section can execute writing access or reading access requested by the request packet or not according to the result of the decoding, transmits the judgment result to the packet-type memory/coprocessor bus as the acknowledge packet, and instructs the designated coprocessor section to execute the writing access or the reading access to the operation control register section in the coprocessor section if the coprocessor section has been judged to be able to execute the access.

31. A method as claimed in claim 20, wherein:
in the case where the device ID field in the request packet designated the memory section, the control section decodes the command field of the request packet, and instructs the memory section to execute writing access or reading access to the memory core section or the memory control register section in the memory section according to the result of the decoding, and
in the case where the device ID field in the request packet designated one of the coprocessor sections, the control section decodes the command field of the request packet, and then,
if the decoded command field instructed writing access to the operation control register section, the control section judges whether the designated coprocessor section can execute the writing access or not, transmits the judgment result to the packet-type memory/coprocessor bus as the acknowledge packet, and instructs the designated coprocessor section to execute the writing access to the operation control register section in the coprocessor section if the coprocessor section has been judged to be able to execute the access, and
if the decoded command field instructed reading access to the operation control register section, the control section instructs the designated coprocessor section to execute the reading access to the operation control register section in the coprocessor section.

32. A method as claimed in claim 26, wherein in the execution of the writing access to the memory core section, the memory section receives write data which has been included in the write data packet which the control section received from the packet-type memory/coprocessor bus via the interface section, and writes the write data into the memory core section using a memory address which is designated by the parameter field of the request packet.

33. A method as claimed in claim 27, wherein in the execution of the writing access to the memory core section, the memory section receives write data which has been included in the write data packet which the control section received from the packet-type memory/coprocessor bus via the interface section, and writes the write data into the memory core section using a memory address which is designated by the parameter field of the request packet.

34. A method as claimed in claim 30, wherein in the execution of the writing access to the memory core section, the memory section receives write data which has been included in the write data packet which the control section received from the packet-type memory/coprocessor bus via the interface section, and writes the write data into the memory core section using a memory address which is designated by the parameter field of the request packet.

35. A method as claimed in claim 31, wherein in the execution of the writing access to the memory core section, the memory section receives write data which has been included in the write data packet which the control section received from the packet-type memory/coprocessor bus via the interface section, and writes the write data into the memory core section using a memory address which is designated by the parameter field of the request packet.

36. A method as claimed in claim 26, wherein in the execution of the writing access to the memory control register section, the memory section receives write data which has been included in the write data packet which the control section received from the packet-type memory/coprocessor bus via the interface section, and writes the write data into the memory control register which is designated by the parameter field of the request packet.

37. A method as claimed in claim 27, wherein in the execution of the writing access to the memory control register section, the memory section receives write data which has been included in the write data packet which the control section received from the packet-type memory/coprocessor bus via the interface section, and writes the write data into the memory control register which is designated by the parameter field of the request packet.

38. A method as claimed in claim 30, wherein in the execution of the writing access to the memory control register section, the memory section receives write data which has been included in the write data packet which the control section received from the packet-type memory/coprocessor bus via the interface section, and writes the write data into the memory control register which is designated by the parameter field of the request packet.

39. A method as claimed in claim 31, wherein in the execution of the writing access to the memory control register section, the memory section receives write data which has been included in the write data packet which the control section received from the packet-type memory/coprocessor bus via the interface section, and writes the write data into the memory control register which is designated by the parameter field of the request packet.

40. A method as claimed in claim 26, wherein in the execution of the writing access to the memory control register section, the memory section receives write data which has been included in part of the parameter field of the request packet from the control section, and writes the write data into the memory control register which is designated by part of the parameter field of the request packet.

41. A method as claimed in claim 27, wherein in the execution of the writing access to the memory control register section, the memory section receives write data which has been included in part of the parameter field of the request packet from the control section, and writes the write data into the memory control register which is designated by part of the parameter field of the request packet.

42. A method as claimed in claim 30, wherein in the execution of the writing access to the memory control register section, the memory section receives write data which has been included in part of the parameter field of the request packet from the control section, and writes the write data into the memory control register which is designated by part of the parameter field of the request packet.

43. A method as claimed in claim 31, wherein in the execution of the writing access to the memory control register section, the memory section receives write data which has been included in part of the parameter field of the request packet from the control section, and writes the write data into the memory control register which is designated by part of the parameter field of the request packet.

44. A method as claimed in claim 26, wherein in the execution of the reading access to the memory core section or the memory control register section, the memory section reads data out of the memory core section or the memory control register section according to the designation by the parameter field in the request packet and supplies the data to the control section, and the control section assembles the read data packet including the data, and the interface section transmits the read data packet to the packet-type memory/coprocessor bus via the external I/O terminal.

45. A method as claimed in claim 27, wherein in the execution of the reading access to the memory core section or the memory control register section, the memory section reads data out of the memory core section or the memory control register section according to the designation by the parameter field in the request packet and supplies the data to the control section, and the control section assembles the read data packet including the data, and the interface section transmits the read data packet to the packet-type memory/coprocessor bus via the external I/O terminal.

46. A method as claimed in claim 30, wherein in the execution of the reading access to the memory core section or the memory control register section, the memory section reads data out of the memory core section or the memory control register section according to the designation by the parameter field in the request packet and supplies the data to the control section, and the control section assembles the read data packet including the data, and the interface section transmits the read data packet to the packet-type memory/coprocessor bus via the external I/O terminal.

47. A method as claimed in claim 31, wherein in the execution of the reading access to the memory core section or the memory control register section, the memory section reads data out of the memory core section or the memory control register section according to the designation by the parameter field in the request packet and supplies the data to the control section, and the control section assembles the read data packet including the data, and the interface section transmits the read data packet to the packet-type memory/coprocessor bus via the external I/O terminal.

48. A method as claimed in claim 28, wherein in the execution of the writing access to the operation control register section, the coprocessor section receives write data which has been included in the write data packet which the control section received from the packet-type memory/coprocessor bus via the interface section, and writes the write data into the operation control register which is designated by the parameter field of the request packet.

49. A method as claimed in claim 29, wherein in the execution of the writing access to the operation control register section, the coprocessor section receives write data which has been included in the write data packet which the control section received from the packet-type memory/coprocessor bus via the interface section, and writes the write data into the operation control register which is designated by the parameter field of the request packet.

50. A method as claimed in claim 30, wherein in the execution of the writing access to the operation control register section, the coprocessor section receives write data which has been included in the write data packet which the control section received from the packet-type memory/ coprocessor bus via the interface section, and writes the write data into the operation control register which is designated by the parameter field of the request packet.

51. A method as claimed in claim 31, wherein in the execution of the writing access to the operation control register section, the coprocessor section receives write data which has been included in the write data packet which the control section received from the packet-type memory/ coprocessor bus via the interface section, and writes the write data into the operation control register which is designated by the parameter field of the request packet.

52. A method as claimed in claim 28, wherein in the execution of the writing access to the operation control register section, the coprocessor section receives write data which has been included in part of the parameter field of the request packet from the control section, and writes the write data into the operation control register which is designated by part of the parameter field of the request packet.

53. A method as claimed in claim 29, wherein in the execution of the writing access to the operation control register section, the coprocessor section receives write data which has been included in part of the parameter field of the request packet from the control section, and writes the write data into the operation control register which is designated by part of the parameter field of the request packet.

54. A method as claimed in claim 30, wherein in the execution of the writing access to the operation control register section, the coprocessor section receives write data which has been included in part of the parameter field of the request packet from the control section, and writes the write data into the operation control register which is designated by part of the parameter field of the request packet.

55. A method as claimed in claim 31, wherein in the execution of the writing access to the operation control register section, the coprocessor section receives write data which has been included in part of the parameter field of the request packet from the control section, and writes the write data into the operation control register which is designated by part of the parameter field of the request packet.

56. A method as claimed in claim 28, wherein in the execution of the reading access to the operation control register section, the coprocessor section reads data out of the operation control register which is designated by the parameter field of the request packet and supplies the data to the control section, and the control section assembles the read data packet including the data, and the interface section transmits the read data packet to the packet-type memory/ coprocessor bus via the external I/O terminal.

57. A method as claimed in claim 29, wherein in the execution of the reading access to the operation control register section, the coprocessor section reads data out of the operation control register which is designated by the parameter field of the request packet and supplies the data to the control section, and the control section assembles the read data packet including the data, and the interface section transmits the read data packet to the packet-type memory/ coprocessor bus via the external I/O terminal.

58. A method as claimed in claim 30, wherein in the execution of the reading access to the operation control register section, the coprocessor section reads data out of the operation control register which is designated by the parameter field of the request packet and supplies the data to the control section, and the control section assembles the read data packet including the data, and the interface section transmits the read data packet to the packet-type memory/ coprocessor bus via the external I/O terminal.

59. A method as claimed in claim 31, wherein in the execution of the reading access to the operation control register section, the coprocessor section reads data out of the operation control register which is designated by the parameter field of the request packet and supplies the data to the control section, and the control section assembles the read data packet including the data, and the interface section transmits the read data packet to the packet-type memory/ coprocessor bus via the external I/O terminal.

60. A method as claimed in claim 31, wherein:
in the reading access to the memory core section, the memory control register section or the operation control register section, the coprocessor-integrated packet-type memory LSI transmits the read data packet to the packet-type memory/coprocessor bus with predetermined bus timing after the reception of the request packet, and in the writing access to the operation control register section, the coprocessor-integrated packet-type memory LSI transmits the acknowledge packet to the packet-type memory/coprocessor bus with the same predetermined bus timing after the reception of the request packet.

61. A method as claimed in claim 28, wherein an operation start register is provided in the operation control register section so that the coprocessor section can refer to the operation start register when the coprocessor section starts execution of an arithmetic logic operation, and in the case where writing access to the operation start register is designated by the command field and the parameter field in the request packet, write data included in the parameter field of the request packet or write data included in the write data packet is used as a program pointer indicating an address of the first instruction in an arithmetic logic operation program to be executed, and the coprocessor section starts the execution of the arithmetic logic operation using the program pointer when the program pointer is written into the operation start register.

62. A method as claimed in claim 29, wherein an operation start register is provided in the operation control register section so that the coprocessor section can refer to the operation start register when the coprocessor section starts execution of an arithmetic logic operation, and in the case where writing access to the operation start register is designated by the command field and the parameter field in the request packet, write data included in the parameter field of the request packet or write data included in the write data packet is used as a program pointer indicating an address of the first instruction in an arithmetic logic operation program to be executed, and the coprocessor section starts the execution of the arithmetic logic operation using the program pointer when the program pointer is written into the operation start register.

63. A method as claimed in claim 30, wherein an operation start register is provided in the operation control register section so that the coprocessor section can refer to the operation start register when the coprocessor section starts execution of an arithmetic logic operation, and in the case where writing access to the operation start register is designated by the command field and the parameter field in the request packet, write data included in the parameter field of the request packet or write data included in the write data packet is used as a program pointer indicating an address of the first instruction in an arithmetic logic operation program to be executed, and the coprocessor section starts the execution of the arithmetic logic operation using the program pointer when the program pointer is written into the operation start register.

64. A method as claimed in claim 31, wherein an operation start register is provided in the operation control register section so that the coprocessor section can refer to the operation start register when the coprocessor section starts execution of an arithmetic logic operation, and in the case where writing access to the operation start register is designated by the command field and the parameter field in the request packet, write data included in the parameter field of the request packet or write data included in the write data packet is used as a program pointer indicating an address of the first instruction in an arithmetic logic operation program to be executed, and the coprocessor section starts the execution of the arithmetic logic operation using the program pointer when the program pointer is written into the operation start register.

65. A method as claimed in claim 61, wherein in the case where writing access to the operation start register is designated by the request packet, information indicating whether the coprocessor section can execute the designated arithmetic logic operation or not is transmitted as the acknowledge packet to the packet-type memory/coprocessor bus and the arithmetic logic operation is executed by the coprocessor section only when the execution of the designated arithmetic logic operation by the coprocessor section is possible.

66. A method as claimed in claim 62, wherein in the case where writing access to the operation start register is designated by the request packet, information indicating whether the coprocessor section can execute the designated arithmetic logic operation or not is transmitted as the acknowledge packet to the packet-type memory/coprocessor bus and the arithmetic logic operation is executed by the coprocessor section only when the execution of the designated arithmetic logic operation by the coprocessor section is possible.

67. A method as claimed in claim 63, wherein in the case where writing access to the operation start register is designated by the request packet, information indicating whether the coprocessor section can execute the designated arithmetic logic operation or not is transmitted as the acknowledge packet to the packet-type memory/coprocessor bus and the arithmetic logic operation is executed by the coprocessor section only when the execution of the designated arithmetic logic operation by the coprocessor section is possible.

68. A method as claimed in claim 64, wherein in the case where writing access to the operation start register is designated by the request packet, information indicating whether the coprocessor section can execute the designated arithmetic logic operation or not is transmitted as the acknowledge packet to the packet-type memory/coprocessor bus and the arithmetic logic operation is executed by the coprocessor section only when the execution of the designated arithmetic logic operation by the coprocessor section is possible.

69. A method as claimed in claim 56, wherein an operation result register is provided as one of the operation control registers so that the coprocessor section can write the result of an arithmetic logic operation into the operation result register, and in the case where reading access to the operation result register is designated by the command field and the parameter field in the request packet, data stored in the operation result register is read out and assembled as the read data packet and the read data packet is transmitted to the packet-type memory/coprocessor bus.

70. A method as claimed in claim 57, wherein an operation result register is provided as one of the operation control registers so that the coprocessor section can write the result of an arithmetic logic operation into the operation result register, and in the case where reading access to the operation result register is designated by the command field and the parameter field in the request packet, data stored in the operation result register is read out and assembled as the read data packet and the read data packet is transmitted to the packet-type memory/coprocessor bus.

71. A method as claimed in claim 58, wherein an operation result register is provided as one of the operation control registers so that the coprocessor section can write the result of an arithmetic logic operation into the operation result register, and in the case where reading access to the operation result register is designated by the command field and the parameter field in the request packet, data stored in the operation result register is read out and assembled as the read data packet and the read data packet is transmitted to the packet-type memory/coprocessor bus.

72. A method as claimed in claim 59, wherein an operation result register is provided as one of the operation control registers so that the coprocessor section can write the result of an arithmetic logic operation into the operation result register, and in the case where reading access to the operation result register is designated by the command field and the parameter field in the request packet, data stored in the operation result register is read out and assembled as the read data packet and the read data packet is transmitted to the packet-type memory/coprocessor bus.

73. A method as claimed in claim 69, wherein in the case where reading access to the operation result register is designated by the request packet, information indicating whether the result of the arithmetic logic operation has already been written in the designated operation result register or not is transmitted as the acknowledge packet to the packet-type memory/coprocessor bus and the reading access to the operation result register is executed only when the result of the arithmetic logic operation has already been written in the operation result register.

74. A method as claimed in claim 70, wherein in the case where reading access to the operation result register is designated by the request packet, information indicating whether the result of the arithmetic logic operation has already been written in the designated operation result register or not is transmitted as the acknowledge packet to the packet-type memory/coprocessor bus and the reading access to the operation result register is executed only when the result of the arithmetic logic operation has already been written in the operation result register.

75. A method as claimed in claim 71, wherein in the case where reading access to the operation result register is designated by the request packet, information indicating whether the result of the arithmetic logic operation has already been written in the designated operation result register or not is transmitted as the acknowledge packet to the packet-type memory/coprocessor bus and the reading access to the operation result register is executed only when the result of the arithmetic logic operation has already been written in the operation result register.

76. A method as claimed in claim 72, wherein in the case where reading access to the operation result register is designated by the request packet, information indicating whether the result of the arithmetic logic operation has already been written in the designated operation result register or not is transmitted as the acknowledge packet to the packet-type memory/coprocessor bus and the reading access to the operation result register is executed only when the result of the arithmetic logic operation has already been written in the operation result register.

77. A method as claimed in claim 69, wherein in the case where reading access to the operation result register is designated by the request packet, information indicating whether the result of the arithmetic logic operation has already been written in the designated operation result register or not is transmitted included in the read data packet to the packet-type memory/coprocessor bus.

78. A method as claimed in claim 70, wherein in the case where reading access to the operation result register is designated by the request packet, information indicating whether the result of the arithmetic logic operation has already been written in the designated operation result register or not is transmitted included in the read data packet to the packet-type memory/coprocessor bus.

79. A method as claimed in claim 71, wherein in the case where reading access to the operation result register is designated by the request packet, information indicating whether the result of the arithmetic logic operation has already been written in the designated operation result register or not is transmitted included in the read data packet to the packet-type memory/coprocessor bus.

80. A method as claimed in claim 72, wherein in the case where reading access to the operation result register is designated by the request packet, information indicating whether the result of the arithmetic logic operation has already been written in the designated operation result register or not is transmitted included in the read data packet to the packet-type memory/coprocessor bus.

81. A method as claimed in claim 61, wherein the coprocessor section starts the execution of the arithmetic logic operation according to the writing access to the operation start register, after parameters which are needed by the coprocessor section for executing the arithmetic logic operation have been written into a desired number of the operation control registers by means of the writing access to the operation control registers, and the coprocessor section carries out the arithmetic logic operation referring to the parameters stored in the operation control registers.

82. A method as claimed in claim 62, wherein the coprocessor section starts the execution of the arithmetic logic operation according to the writing access to the operation start register, after parameters which are needed by the coprocessor section for executing the arithmetic logic operation have been written into a desired number of the operation control registers by means of the writing access to the operation control registers, and the coprocessor section carries out the arithmetic logic operation referring to the parameters stored in the operation control registers.

83. A method as claimed in claim 63, wherein the coprocessor section starts the execution of the arithmetic logic operation according to the writing access to the operation start register, after parameters which are needed by the coprocessor section for executing the arithmetic logic operation have been written into a desired number of the operation control registers by means of the writing access to the operation control registers, and the coprocessor section carries out the arithmetic logic operation referring to the parameters stored in the operation control registers.

84. A method as claimed in claim 64, wherein the coprocessor section starts the execution of the arithmetic logic operation according to the writing access to the operation start register, after parameters which are needed by the coprocessor section for executing the arithmetic logic operation have been written into a desired number of the operation control registers by means of the writing access to the operation control registers, and the coprocessor section carries out the arithmetic logic operation referring to the parameters stored in the operation control registers.

85. A method as claimed in claim 69, wherein a desired number of the operation control registers are also used for storing part of the result of the arithmetic logic operation when the result can not be accommodated in the operation result register, and the result is read out from the coprocessor section by means of reading access to the operation control registers after part of the result is successfully read out by means of the reading access to the operation result register.

86. A method as claimed in claim 70, wherein a desired number of the operation control registers are also used for storing part of the result of the arithmetic logic operation when the result can not be accommodated in the operation result register, and the result is read out from the coprocessor section by means of reading access to the operation control registers after part of the result is successfully read out by means of the reading access to the operation result register.

87. A method as claimed in claim 71, wherein a desired number of the operation control registers are also used for storing part of the result of the arithmetic logic operation when the result can not be accommodated in the operation result register, and the result is read out from the coprocessor section by means of reading access to the operation control registers after part of the result is successfully read out by means of the reading access to the operation result register.

88. A method as claimed in claim 72, wherein a desired number of the operation control registers are also used for storing part of the result of the arithmetic logic operation when the result can not be accommodated in the operation result register, and the result is read out from the coprocessor section by means of reading access to the operation control registers after part of the result is successfully read out by means of the reading access to the operation result register.

89. A method as claimed in claim 56, wherein a desired number of the operation control registers are used for storing intermediate data which are generated during execution of an arithmetic logic operation by the coprocessor section, and in the case where reading access to one of the operation control registers storing the intermediate data is designated by the command field and the parameter field in the request packet, the intermediate data stored in the operation control register is read out and assembled as the read data packet and the read data packet is transmitted to the packet-type memory/coprocessor bus.

90. A method as claimed in claim 57, wherein a desired number of the operation control registers are used for storing intermediate data which are generated during execution of an arithmetic logic operation by the coprocessor section, and in the case where reading access to one of the operation control registers storing the intermediate data is designated by the command field and the parameter field in the request packet, the intermediate data stored in the operation control register is read out and assembled as the read data packet and the read data packet is transmitted to the packet-type memory/coprocessor bus.

91. A method as claimed in claim 58, wherein a desired number of the operation control registers are used for storing intermediate data which are generated during execution of an arithmetic logic operation by the coprocessor section, and in the case where reading access to one of the operation control registers storing the intermediate data is designated by the command field and the parameter field in the request packet, the intermediate data stored in the operation control register is read out and assembled as the read data packet and the read data packet is transmitted to the packet-type memory/coprocessor bus.

92. A method as claimed in claim 59, wherein a desired number of the operation control registers are used for storing intermediate data which are generated during execution of an arithmetic logic operation by the coprocessor section, and in the case where reading access to one of the operation control registers storing the intermediate data is designated by the command field and the parameter field in the request packet, the intermediate data stored in the operation control register is read out and assembled as the read data packet and the read data packet is transmitted to the packet-type memory/coprocessor bus.

93. A coprocessor-integrated packet-type memory LSI as claimed in claim 21, wherein:
the coprocessor-integrated packet-type memory LSI is provided with an external select-in terminal and an external select-out terminal,
each of the memory section and the coprocessor sections is provided with an internal select-in terminal and an internal select-out terminal,
a memory section/coprocessor section chain is formed by connecting the internal select-out terminals with corresponding internal select-in terminals and connecting all of the memory section and the coprocessor sections into a chain,
the external select-in terminal of the coprocessor-integrated packet-type memory LSI is connected to the internal select-in terminal of the first block of the memory section/coprocessor section chain, and
the internal select-out terminal of the final block of the memory section/coprocessor section chain is connected to the external select-out terminal of the coprocessor-integrated packet-type memory LSI.

94. A method for controlling the coprocessor-integrated packet-type memory LSI of claim 93, in which:
as an initialization process, the memory device ID and the coprocessor device IDs of the memory section and the coprocessor sections in the coprocessor-integrated packet-type memory LSI are set at a predetermined initial value and all of the internal select-out terminals of the memory section and the coprocessor sections are set at the logical value '0', and
after the initialization process, each of the memory section and the coprocessor sections whose memory device ID and the coprocessor device IDs have been set at the initial value ignores writing access thereto and keeps on outputting the logical value '0' from its internal select-out terminal as long as the logical values '0' is supplied to its internal select-in terminal, and
each of the memory section and the coprocessor sections accepts the writing access thereto and outputs the logical value '1' from its internal select-out terminal as long as the logical value '1' is supplied to its internal select-in terminal, and thereby the memory device ID or the coprocessor device ID designated by the parameter field of the request packet is written into the memory device ID register or the coprocessor device ID register thereof according to the writing access thereto.

95. A packet-type memory/coprocessor bus as claimed in claim 4, wherein:
a coprocessor-integrated packet-type memory LSI chain is formed by connecting a desired number of the coprocessor-integrated packet-type memory LSIs of claim 93 into a chain by connecting the external select-out terminals and corresponding external select-in terminals,
the bus master is provided with an external select-in terminal and an external select-out terminal,
the external select-out terminal of the bus master is connected to the external select-in terminal of the first coprocessor-integrated packet-type memory LSI in the coprocessor-integrated packet-type memory LSI chain, and
the external select-out terminal of the final coprocessor-integrated packet-type memory LSI in the coprocessor-integrated packet-type memory LSI chain is connected to the external select-in terminal of the bus master.

96. A packet-type memory/coprocessor bus as claimed in claim 5, wherein:
a coprocessor-integrated packet-type memory LSI chain is formed by connecting a desired number of the coprocessor-integrated packet-type memory LSIs of claim 93 into a chain by connecting the external select-out terminals and corresponding external select-in terminals,
the bus master is provided with an external select-in terminal and an external select-out terminal,
the external select-out terminal of the bus master is connected to the external select-in terminal of the first coprocessor-integrated packet-type memory LSI in the coprocessor-integrated packet-type memory LSI chain, and
the external select-out terminal of the final coprocessor-integrated packet-type memory LSI in the coprocessor-integrated packet-type memory LSI chain is connected to the external select-in terminal of the bus master.

97. A method for controlling the packet-type memory/coprocessor bus of claim 95 or 96, in which:
as an initialization process, the memory device IDs and the coprocessor device IDs of all of the memory sections and the coprocessor sections in all of the coprocessor-integrated packet-type memory LSI connected to the packet-type memory/coprocessor bus are set at a predetermined initial value and all of the internal select-out terminals of the memory sections and the coprocessor sections are set at the logical value '0', and
after the initialization process, the bus master varies the logical value of its external select-out terminal from '0' to '1' and transmits a request packet designating the initial value in the device ID field of the request packet and designating a new memory device ID or a new coprocessor device ID in the parameter field of the request packet, thereby the new memory device ID or the new coprocessor device ID is assigned to the first block in the memory section/coprocessor section chain in the first coprocessor-integrated packet-type memory LSI in the coprocessor-integrated packet-type memory LSI chain, and
thereafter, the bus master repeats transmitting request packets designating the initial value in the device ID field of the request packet and designating a new memory device ID or a new coprocessor device ID in the parameter field of the request packet, thereby specific and unique memory device IDs and coprocessor device IDs are assigned to the memory sections and the coprocessor sections in the coprocessor-integrated packet-type memory LSI chain one after another according to the transmission of the logical value '1' through the blocks in the coprocessor-integrated packet-type memory LSI chain.

98. A coprocessor-integrated packet-type memory LSI as claimed in claim 2, wherein:
the memory section includes a device definition register as one of the memory control registers, for prestoring device definition information to be used for discriminating between a memory section and a coprocessor section, and each of the coprocessor sections includes a device definition register as one of the operation control registers, for prestoring device definition information to be used for discriminating between a memory section and a coprocessor section.

99. A method for controlling the coprocessor-integrated packet-type memory LSI of claim 98, in which the bus master checks whether a particular device ID has been assigned to a memory section or a coprocessor section, by obtaining the device definition information by executing reading access designating the particular device ID to the device definition register in the memory control register section or the operation control register section.

100. A method as claimed in claim 99, wherein request packets which are the same except for designation of the device ID field are used by the bus master for the reading accesses to the device definition registers, regardless of whether the destination of the reading access is in a memory section or in a coprocessor section.

101. A coprocessor-integrated packet-type memory LSI as claimed in claim 2, wherein the operation control register section includes a function definition register as one of the operation control registers, for prestoring function definition code which classifies the arithmetic logic operation functions of the coprocessor section.

102. A method for controlling the coprocessor-integrated packet-type memory LSI of claim 101, in which the bus master checks arithmetic logic operation functions of a coprocessor section which corresponds to a particular device ID, by obtaining the function definition code by executing reading access designating the particular device ID to the function definition register in the operation control register section.

* * * * *